US012236616B2

(12) United States Patent
Kwon et al.

(10) Patent No.: US 12,236,616 B2
(45) Date of Patent: Feb. 25, 2025

(54) METHOD AND SYSTEM FOR AUTOMATIC EXTRACTION OF VIRTUAL ON-BODY INERTIAL MEASUREMENT UNITS

(71) Applicant: Georgia Tech Research Corporation, Atlanta, GA (US)

(72) Inventors: Hyeokhyen Kwon, Atlanta, GA (US); Gregory D. Abowd, Atlanta, GA (US); Harish Kashyap Haresamudram, Atlanta, GA (US); Thomas Ploetz, Atlanta, GA (US); Eu Gen Catherine Tong, London (GB); Yan Gao, Oxford (GB); Nicholas Lane, Cambridge (GB)

(73) Assignee: Georgia Tech Research Corporation, Atlanta, GA (US)

( * ) Notice: Subject to any disclaimer, the term of this patent is extended or adjusted under 35 U.S.C. 154(b) by 640 days.

(21) Appl. No.: 17/464,488

(22) Filed: Sep. 1, 2021

(65) Prior Publication Data

US 2022/0066544 A1   Mar. 3, 2022

Related U.S. Application Data

(60) Provisional application No. 63/073,009, filed on Sep. 1, 2020.

(51) Int. Cl.
   *G06T 7/246*   (2017.01)
   *G06T 7/20*    (2017.01)
   *G06V 40/20*   (2022.01)

(52) U.S. Cl.
   CPC ........... *G06T 7/251* (2017.01); *G06T 7/20* (2013.01); *G06V 40/23* (2022.01); *G06T 2207/30196* (2013.01)

(58) Field of Classification Search
   CPC ........... G06T 7/20; G06T 7/246; G06T 7/248; G06T 7/251; G06T 7/292;
(Continued)

(56) References Cited

U.S. PATENT DOCUMENTS

| 2015/0092980 A1* | 4/2015 | Folmer | G06V 40/165 382/103 |
| 2018/0070864 A1* | 3/2018 | Schuster | G16H 40/63 |

OTHER PUBLICATIONS

Rey, Vitor Fortes, et al. "Let there be IMU data: generating training data for wearable, motion sensor based activity recognition from monocular RGB videos." Adjunct proceedings of the 2019 ACM international joint conference on pervasive and ubiquitous computing . . . 2019. (Year: 2019).*
(Continued)

*Primary Examiner* — Geoffrey E Summers
(74) *Attorney, Agent, or Firm* — Meunier Carlin & Curfman LLC

(57) ABSTRACT

An exemplary virtual IMU extraction system and method are disclosed for human activity recognition (HAR) or classifier system that can estimate inertial measurement units (IMU) of a person in video data extracted from public repositories of video data having weakly labeled video content. The exemplary virtual IMU extraction system and method of the human activity recognition (HAR) or classifier system employ an automated processing pipeline (also referred to herein as "IMUTube") that integrates computer vision and signal processing operations to convert video data of human activity into virtual streams of IMU data that represents accelerometer, gyroscope, or other inertial measurement unit estimation that can measure acceleration, inertia, motion, orientation, force, velocity, etc. at a different location on the body. In other embodiments, the automated processing pipeline can be used to generate high-quality virtual accelerometer data from a camera sensor.

20 Claims, 12 Drawing Sheets
(9 of 12 Drawing Sheet(s) Filed in Color)

(58) Field of Classification Search
CPC . G06T 2207/30004; G06T 2207/30196; G06T 2207/20081; G06T 2207/20084; G06V 40/23; G06V 40/25; G06V 10/82; G06V 40/20–28; G06N 3/02–0985; G06N 20/20
See application file for complete search history.

(56) References Cited

OTHER PUBLICATIONS

Elhayek, Ahmed, et al. "Fully automatic multi-person human motion capture for vr applications." Virtual Reality and Augmented Reality: 15th EuroVR International Conference, EuroVR 2018, London, UK, Oct. 22-23, 2018, Proceedings 15. Springer International Publishing, 2018. (Year: 2018).*
Chen, Yen-Lin, and Jinxiang Chai. "3d reconstruction of human motion and skeleton from uncalibrated monocular video." Asian Conference on Computer Vision. Berlin, Heidelberg: Springer Berlin Heidelberg, 2009. (Year: 2009).*
Mundt, Marion, et al. "Estimation of gait mechanics based on simulated and measured IMU data using an artificial neural network." Frontiers in bioengineering and biotechnology 8 (2020): 41. (Year: 2020).*
Huang, Yinghao, et al. "Deep inertial poser: Learning to reconstruct human pose from sparse inertial measurements in real time." ACM Transactions on Graphics (TOG) 37.6 (2018): 1-15. (Year: 2018).*
A. Bewley, Z. Ge, L. Ott, F. Ramos, and B. Upcroft. 2016. Simple online and realtime tracking. In 2016 IEEE International Conference on Image Processing (ICIP). 3464-3468.
A. Bulling, U. Blanke, and B. Schiele. 2014. A tutorial on human activity recognition using body-worn inertial sensors. ACM CSUR 46, 3 (2014), 33.
A. Gordon, H. Li, R. Jonschkowski, and A. Angelova. 2019. Depth From Videos in the Wild: Unsupervised Monocular Depth Learning From Unknown Cameras. In 2019 IEEE/CVF International Conference on Computer Vision (ICCV). IEEE.
A. Kanazawa, M. Black, D. Jacobs, and J. Malik. 2018. End-to-end recovery of human shape and pose. In Proceedings of the IEEE Conference on Computer Vision and Pattern Recognition. 7122-7131.
A. Le Guennec, S. Malinowski, and R. Tavenard. 2016. Data Augmentation for Time Series Classification using Convolutional Neural Networks. In ECML/PKDD Workshop on Advanced Analytics and Learning on Temporal Data.
A. Mathur, T. Zhang, S. Bhattacharya, P. Velickovic, L. Joffe, N. Lane, F. Kawsar, and P. Lió. 2018. Using deep data augmentation training to address software and hardware heterogeneities in wearable and smartphone sensing devices. In IEEE International Conference on Information Processing in Sensor Networks (IPSN). IEEE, 200-211.
A. Muhammad Sayem, S. Hon Teay, H. Shahariar, P. Fink, and A. Albarbar. 2020. Review on Smart Electro-Clothing Systems (SeCSs). Sensors 20, 3 (2020), 587.
A. Newell, K. Yang, and J. Deng. 2016. Stacked hourglass networks for human pose estimation. In European conference on computer vision. Springer, 483-499.
A. Oord, S. Dieleman, H. Zen, K. Simonyan, O. Vinyals, A. Graves, N. Kalchbrenner, A. Senior, and K. Kavukcuoglu. 2016. Wavenet: A generative model for raw audio. arXiv preprint arXiv:1609.03499 (2016).
A. Reiss and D. Stricker. 2012. Introducing a new benchmarked dataset for activity monitoring. In 2012 16th International Symposium on Wearable Computers. IEEE, 108-109.
A. Reiss and D. Stricker. 2013. Personalized mobile physical activity recognition. In Proceedings of the 2013 international symposium on wearable computers. 25-28.
A. Vaswani, N. Shazeer, N. Parmar, J. Uszkoreit, L. Jones, A. N. Gomez, L. Kaiser, and I. Polosukhin. 2017. Attention is all you need. arXiv:1706.03762 (2017).

A. Young, M. Ling, and D. Arvind. 2011. IMUSim: A simulation environment for inertial sensing algorithm design and evaluation. In Proceedings of the 10th International Conference on Information Processing in Sensor Networks, IPSN 2011, Apr. 12-14, 2011, Chicago, IL, USA. IEEE, 199-210.
Aaqib Saeed, Tanir Ozcelebi, and Johan Lukkien. 2019. Multi-task Self-Supervised Learning for Human Activity Detection. Proceedings of the ACM on Interactive, Mobile, Wearable and Ubiquitous Technologies 3, 2 (2019), 1-30.
Alberto Fernández, Salvador Garcia, Francisco Herrera, and Nitesh V Chawla. 2018. SMOTE for learning from imbalanced data: progress and challenges, marking the 15-year anniversary. Journal of artificial intelligence research 61 (2018), 863-905.
Alexey Dosovitskiy, Philipp Fischer, Eddy Ilg, Philip Hausser, Caner Hazirbas, Vladimir Golkov, Patrick Van Der Smagt, Daniel Cremers, and Thomas Brox. 2015. Flownet: Learning optical flow with convolutional networks. In Proceedings of the IEEE international conference on computer vision. 2758-2766.
Andreas Geiger, Philip Lenz, and Raquel Urtasun. 2012. Are we ready for Autonomous Driving? The KITTI Vision Benchmark Suite. In Conference on Computer Vision and Pattern Recognition (CVPR).
Angela Yao, Dominique Uebersax, Juergen Gall, and Luc Van Gool. 2010. Tracking people in broadcast sports. In Joint Pattern Recognition Symposium. Springer, 151-161.
Augustus Odena, Vincent Dumoulin, and Chris Olah. 2016. Deconvolution and checkerboard artifacts. Distill 1, 10 (2016), e3.
Ofli, R. Chaudhry, G. Kurillo, R. Vidal, and R. Bajcsy. 2013. Berkeley mhad: A comprehensive multimodal human action database. In 2013 IEEE Workshop on Applications of Computer Vision (WACV). IEEE, 53-60.
B. Caprile and V. Torre. 1990. Using vanishing points for camera calibration. International Journal of Computer Vision 4, 2 (Mar. 1990), 127-139.
Bharath Hariharan, Pablo Arbeláez, Ross Girshick, and Jitendra Malik. 2014. Simultaneous detection and segmentation. In European Conference on Computer Vision. Springer, 297-312.
Bharath Hariharan, Pablo Arbelaez, Ross Girshick, and Jitendra Malik. 2015. Hypercolumns for object segmentation and fine-grained localization. In Proceedings of the IEEE conference on computer vision and pattern recognition. 447-456.
Bingke Zhu, Yingying Chen, Ming Tang, and Jinqiao Wang. 2018. Progressive cognitive human parsing. In Proceedings of the AAAI Conference on Artificial Intelligence, vol. 32.
Blender Online Community. 2018. Blender—a 3D modelling and rendering package. Blender Foundation, Stichting Blender Foundation, Amsterdam. http://www.blender.org.
C. Chelba, T. Mikolov, M. Schuster, Q. Ge, T. Brants, P. Koehn, and T. Robinson. 2013. One-billion-word benchmark for measuring progress in statistical language modeling. arXiv preprint arXiv:1312.3005 (2013).
C. Gu, C. Sun, D. Ross, C. Vondrick, C. Pantofaru, Y. Li, S. Vijayanarasimhan, G. Toderici, S. Ricco, R. Sukthankar, C. Schmid, and J. Malik. 2018. Ava: A video dataset of spatio-temporally localized atomic visual actions. In Proceedings of the IEEE Conference on Computer Vision and Pattern Recognition. 6047-6056.
C. Kang, H. Jung, and Y. Lee. 2019. Towards Machine Learning with Zero Real-World Data. In The 5th ACM Workshop on Wearable Systems and Applications. 41-46.
C. Shorten and T. Khoshgoftaar. 2019. A survey on image data augmentation for deep learning. Journal of Big Data 6, 1 (2019), 60.
Carnegie Mellon Graphics Lab. 2008. Carnegie Mellon Motion Capture Database. http://mocap.cs.cmu.edu/.
Carnegie Mellon Motion Capture Database. Retrieved Apr. 25, 2020 from http://mocap.cs.cmu.edu/.
Chaowei Xiao, Jun-Yan Zhu, Bo Li, Warren He, Mingyan Liu, and Dawn Song. 2018. Spatially transformed adversarial examples. arXiv preprint arXiv:1801.02612 (2018).
D. Figo, P. C. Diniz, D. R. Ferreira, and J. M. Cardoso. 2010. Preprocessing techniques for context recognition from accelerometer data. Pers. Ubiquitous Comput. 14, 7 (2010), 645-662.
D. Liaqat, M. Abdalla, Pegah Abed-Esfahani, Moshe Gabel, Tatiana Son, Robert Wu, Andrea Gershon, Frank Rudzicz, and Eyal De

(56) References Cited

OTHER PUBLICATIONS

Lara. 2019. WearBreathing: Real World Respiratory Rate Monitoring Using Smartwatches. Proceedings of the ACM on Interactive, Mobile, Wearable and Ubiquitous Technologies 3, 2 (2019), 1-22.

D. Mehta, O. Sotnychenko, F. Mueller, W. Xu, M. Elgharib, P. Fua, H. Seidel, H. Rhodin, G. Pons-Moll, and C. Theobalt. 2020. XNect: Real-Time Multi-Person 3D Motion Capture with a Single RGB Camera. ToG. 39, 4, Article 82 (Jul. 2020), 17 pages.

D. Pavllo, C. Feichtenhofer, D. Grangier, and M. Auli. 2019. 3D human pose estimation in video with temporal convolutions and semi-supervised training. In Proceedings of the IEEE Conference on Computer Vision and Pattern Recognition. 7753-7762.

D. Strömbäck, S. Huang, and V. Radu. 2020. MM-Fit: Multimodal Deep Learning for Automatic Exercise Logging across Sensing Devices. IMWUT 4, 4, Article 168 (Dec. 2020), 22 pages.

Dan Morris, T Scott Saponas, Andrew Guillory, and Ilya Kelner. 2014. RecoFit: using a wearable sensor to find, recognize, and count repetitive exercises. In Proceedings of the SIGCHI Conference on Human Factors in Computing Systems. 3225-3234.

Daniel J. Rough and Aaron Quigley. 2020. End-User Development of Experience Sampling Smartphone Apps -Recommendations and Requirements. IMWUT 4, 2, Article 56 (Jun. 2020), 19 pages.

Deepak Pathak, Philipp Krahenbuhl, Jeff Donahue, Trevor Darrell, and Alexei A Efros. 2016. Context encoders: Feature learning by inpainting. In Proceedings of the IEEE conference on computer vision and pattern recognition. 2536-2544.

Deqing Sun, Xiaodong Yang, Ming-Yu Liu, and Jan Kautz. 2018. Pwc-net: Cnns for optical flow using pyramid, warping, and cost vol. In Proceedings of the IEEE conference on computer vision and pattern recognition. 8934-8943.

Diederik P Kingma and Jimmy Ba. 2014. Adam: A method for stochastic optimization. arXiv preprint arXiv:1412.6980 (2014).

E. Thomaz, I. Essa, and G. Abowd. 2015. A practical approach for recognizing eating moments with wrist-mounted inertial sensing. In Proceedings of the 2015 ACM International Joint Conference on Pervasive and Ubiquitous Computing. 1029-1040.

E. Wilson. 1927. Probable inference, the law of succession, and statistical inference. J. Amer. Statist. Assoc. 22, 158 (1927), 209-212.

Eddy Ilg, Nikolaus Mayer, Tonmoy Saikia, Margret Keuper, Alexey Dosovitskiy, and Thomas Brox. 2017. Flownet 2.0: Evolution of optical flow estimation with deep networks. In Proceedings of the IEEE conference on computer vision and pattern recognition. 2462-2470.

F. Caba Heilbron, V. Escorcia, B. Ghanem, and J. Carlos Niebles. 2015. Activitynet: A large-scale video benchmark for human activity understanding. In Proceedings of the IEEE conference on computer vision and pattern recognition. 961-970.

F. J. Ordóñez and D. Roggen. 2016. Deep convolutional and lstm recurrent neural networks for multimodal wearable activity recognition. Sensors 16, 1 (2016), 115.

F. Pomerleau, F. Colas, and R. Siegwart. 2015. A Review of Point Cloud Registration Algorithms for Mobile Robotics. Found. Trends Robot 4, 1 (May 2015), 1âŞ104.

F. Xiao, L. Pei, L. Chu, D. Zou, W. Yu, Y. Zhu, and T. Li. 2020. A Deep Learning Method for Complex Human Activity Recognition Using Virtual Wearable Sensors. arXiv preprint arXiv:2003.01874 (2020).

G. Batista, E. J. Keogh, O. M. Tataw, and V. De Souza. 2014. CID: an efficient complexity-invariant distance for time series. Data Mining and Knowledge Discovery 28, 3 (2014), 634-669.

G. Laput and C. Harrison. 2019. Sensing Fine-Grained Hand Activity with Smartwatches. In Proceedings of the 2019 CHI Conference on Human Factors in Computing Systems. 1-13.

G. Pons-Moll, J. Romero, N. Mahmood, and M> Black. 2015. Dyna: A model of dynamic human shape in motion. ACM Transactions on Graphics (TOG) 34, 4 (2015), 1-14.

G. Pons-Moll, S. Pujades, S. Hu, and M. Black. 2017. ClothCap: Seamless 4D clothing capture and retargeting. ACM Transactions on Graphics (TOG) 36, 4 (2017), 1-15.

G. Sigurdsson, G. Varol, X. Wang, I. Laptev, A. Farhadi, and A. Gupta. 2016. Hollywood in Homes: Crowdsourcing Data Collection for Activity Understanding. ArXiv e-prints (2016). arXiv:1604.01753 http://arxiv.org/abs/1604.01753.

Geoffrey Hinton, Li Deng, Dong Yu, George E Dahl, Abdel-rahman Mohamed, Navdeep Jaitly, Andrew Senior, Vincent Vanhoucke, Patrick Nguyen, Tara N Sainath, et al. 2012. Deep neural networks for acoustic modeling in speech recognition: The shared views of four research groups. IEEE Signal processing magazine 29, 6 (2012), 82-97.

George Papandreou, Tyler Zhu, Liang-Chieh Chen, Spyros Gidaris, Jonathan Tompson, and Kevin Murphy. 2018. Personlab: Person pose estimation and instance segmentation with a bottom-up, part-based, geometric embedding model. In Proceedings of the European Conference on Computer Vision (ECCV). 269-286.

Giorgia Ramponi, Pavlos Protopapas, Marco Brambilla, and Ryan Janssen. 2018. T-cgan: Conditional generative adversarial network for data augmentation in noisy time series with irregular sampling. arXiv preprint arXiv:1811.08295 (2018).

G Van Horn and Pietro Perona. 2017. The devil is in the tails: Fine-grained classification in the wild. arXiv preprint arXiv:1709.01450 2 (2017).

H. Fawaz, G. Forestier, J.Weber, L. Idoumghar, and P. Muller. 2018. Data augmentation using synthetic data for time series classification with deep residual networks. arXiv preprint arXiv:1808.02455 (2018).

H. Haresamudram, D. Anderson, and T. Plötz. 2019. On the role of features in human activity recognition. In Proceedings of the 23rd International Symposium on Wearable Computers. 78-88.

H. Huang, Y. Sun, and M. Liu. 2019. Reliable Monocular Ego-Motion Estimation System in Rainy Urban Environments. In 2019 IEEE Intelligent Transportation Systems Conference (ITSC). 1290-1297. https://doi.org/10.1109/ITSC.2019.8916977.

H. Koskimäki and P. Siirtola. 2014. Recognizing gym exercises using acceleration data from wearable sensors. In 2014 IEEE Symposium on Computational Intelligence and Data Mining (CIDM). 321-328. https://doi.org/10.1109/CIDM.2014.7008685.

H. Koskimäki, P. Siirtola, and J. Röning. 2017. MyoGym: Introducing an Open Gym Data Set for Activity Recognition Collected Using Myo Armband. In Proceedings of the 2017 ACM International Joint Conference on Pervasive and Ubiquitous Computing and Proceedings of the 2017 ACM International Symposium on Wearable Computers. ACM, 537-546.

H. Kuehne, H. Jhuang, E. Garrote, T. Poggio, and T. Serre. 2011. HMDB: a large video database for human motion recognition. In 2011 International Conference on Computer Vision. IEEE, 2556-2563.

H. Kwon, C. Tong, H. Haresamudram, Y. Gao, G. D. Abowd, N. D. Lane, and T. Plötz. 2020. IMUTube: Automatic Extraction of Virtual on-Body Accelerometry from Video for Human Activity Recognition. Proc. ACM Interact. Mob. Wearable Ubiquitous Technol. 4, 3, Article 87 (Sep. 2020), 29 pages.

H. Zhuang. 1995. A self-calibration approach to extrinsic parameter estimation of stereo cameras. Robotics and Autonomous Systems 15, 3 (Aug. 1995), 189-197.

Hao-Shu Fang, Shuqin Xie, Yu-Wing Tai, and Cewu Lu. 2017. RMPE: Regional Multi-person Pose Estimation. In ICCV.

Haoyu He, Jing Zhang, Qiming Zhang, and Dacheng Tao. 2020. Grapy-ML: Graph Pyramid Mutual Learning for Cross-dataset Human Parsing. In Proceedings of the AAAI Conference on Artificial Intelligence.

Hyeokhyen Kwon, Gregory D. Abowd, and Thomas Plötz. 2019. Handling Annotation Uncertainty in Human Activity Recognition. In Proceedings of the 23rd International Symposium on Wearable Computers (ISWC'19). ACM, 109-117.

I. Goodfellow, J. Pouget-Abadie, M. Mirza, B. Xu, D. Warde-Farley, S. Ozair, A. Courville, and Y. Bengio. 2014. Generative adversarial nets. In Advances in neural information processing systems. 2672-2680.

I. Goodfellow, J. Pouget-Abadie, M. Mirza, B. Xu, D. Warde-Farley, S. Ozair, A. Courville, and Y. Bengio. 2014. Generative adversaria networks. arXiv preprint arXiv:1406.2661 (2014).

(56) References Cited

OTHER PUBLICATIONS

Hesch Joel, A.and Stergios. 2011. A Direct Least-Squares (DLS) method for PnP. In 2011 International Conference on Computer Vision. IEEE.

J Yu Jason, Adam W Harley, and Konstantinos G Derpanis. 2016. Back to basics: Unsupervised learning of optical flow via brightness constancy and motion smoothness. In European Conference on Computer Vision. Springer, 3-10.

J. Carreira, E. Noland, C. Hillier, and A. Zisserman. 2019. A short note on the kinetics-700 human action dataset. arXiv preprintarXiv:1907. 06987 (2019).

J. Carreira, P. Agrawal, K. Fragkiadaki, and J. Malik. 2016. Human pose estimation with iterative error feedback. In Proceedings of the IEEE conference on computer vision and pattern recognition. 4733-4742.

J. Deng, W. Dong, R. Socher, L. Li, K. Li, and L. Fei-Fei. 2009. Imagenet: A large-scale hierarchical image database. In 2009 IEEE conference on computer vision and pattern recognition. IEEE, 248-255.

J. Devlin, M. Chang, K. Lee, and K. Toutanova. 2018. Bert: Pre-training of deep bidirectional transformers for language understanding. arXiv preprint arXiv:1810.04805 (2018).

J. Liu, A. Shahroudy, M. Perez, G. Wang, L. Duan, and A. Kot. 2019. NTU RGB+D 120: A Large-Scale Benchmark for 3D Human Activity Understanding. IEEE Transactions on Pattern Analysis and Machine Intelligence (2019). https://doi.org/10.1109/TPAMI.2019. 2916873.

J. Martinez, R. Hossain, J. Romero, and J. Little. 2017. A simple yet effective baseline for 3d human pose estimation. In IEEE International Conference on Computer Vision (ICCV). 2640-2649.

J. Park, Q. Zhou, and V. Koltun. 2017. Colored Point Cloud Registration Revisited. In 2017 IEEE International Conference on Computer Vision (ICCV). 143-152.

J. Sturm, N. Engelhard, F. Endres, W. Burgard, and D. Cremers. 2012. A Benchmark for the Evaluation of RGB-D SLAM Systems. In Proc. of the International Conference on Intelligent Robot Systems (IROS).

J. Yu and R. Ramamoorthi. 2019. Robust Video Stabilization by Optimization in CNN Weight Space. In Proceedings of the IEEE Conference on Computer Vision and Pattern Recognition. 3800-3808.

Jason Yosinski, Jeff Clune, Yoshua Bengio, and Hod Lipson. 2014. How transferable are features in deep neural networks?. In Advances in neural information processing systems. 3320-3328.

Jifeng Dai, Kaiming He, and Jian Sun. 2015. Convolutional feature masking for joint object and stuff segmentation. In Proceedings of the IEEE conference on computer vision and pattern recognition. 3992-4000.

Jifeng Dai, Kaiming He, Yi Li, Shaoqing Ren, and Jian Sun. 2016. Instance- sensitive fully convolutional networks. In European Conference on Computer Vision. Springer, 534-549.

Jinshan Pan, Haoran Bai, and Jinhui Tang. 2020. Cascaded Deep Video Deblurring Using Temporal Sharpness Prior. In IEEE/CVF Conference on Computer Vision and Pattern Recognition (CVPR).

Joel Janai, Fatma Guney, Anurag Ranjan, Michael Black, and Andreas Geiger. 2018. Unsupervised learning of multi-frame optical flow with occlusions. In Proceedings of the European Conference on Computer Vision (ECCV). 690-706.

John K Haas. 2014. A history of the unity game engine. (2014).

Joseph Redmon and Ali Farhadi. 2018. YOLOv3: An Incremental Improvement. arXiv (2018).

Junhwa Hur and Stefan Roth. 2019. Iterative residual refinement for joint optical flow and occlusion estimation. In Proceedings of the IEEE/CVF Conference on Computer Vision and Pattern Recognition. 5754-5763.

K. He, X. Zhang, S. Ren, and J. Sun. 2016. Deep residual learning for image recognition. In Proceedings of the IEEE conference on computer vision and pattern recognition. 770-778.

K. Hovsepian, M. Al'Absi, E. Ertin, T. Kamarck, M. Nakajima, and S. Kumar. 2015. cStress: towards a gold standard for continuous stress assessment in the mobile environment. In Proceedings of the 2015 ACM international joint conference on pervasive and ubiquitous computing. 493-504.

K. Shoemake. 1985. Animating rotation with quaternion curves. In Proceedings of the 12th annual conference on Computer graphics and interactive techniques. 245-254.

K. Simonyan and A. Zisserman. 2014. Very deep convolutional networks for large-scale image recognition. arXiv:1409.1556 (2014).

K. Soomro, A. Zamir, and M. Shah. 2012. UCF101: A dataset of 101 human actions classes from videos in the wild. arXiv preprint arXiv:1212.0402 (2012).

Kaihao Zhang, Wenhan Luo, Yiran Zhong, Lin Ma, Wei Liu, and Hongdong Li. 2018. Adversarial spatio-temporal learning for video deblurring. IEEE Transactions on Image Processing 28, 1 (2018), 291-301.

Kaiming He, Georgia Gkioxari, Piotr Dollár, and Ross Girshick. 2017. Mask r-cnn. In Proceedings of the IEEE international conference on computer vision. 2961-2969.

Kaiyang Zhou, Yongxin Yang, Andrea Cavallaro, and Tao Xiang. 2019. Omni-Scale Feature Learning for Person Re-Identification. In ICCV. 3702-3712.

Ke Gong, Xiaodan Liang, Yicheng Li, Yimin Chen, Ming Yang, and Liang Lin. 2018. Instance-level human parsing via part grouping network. In Proceedings of the European Conference on Computer Vision (ECCV). 770-785.

Ke Gong, Yiming Gao, Xiaodan Liang, Xiaohui Shen, Meng Wang, and Liang Lin. 2019. Graphonomy: Universal human parsing via graph transfer learning. In Proceedings of the IEEE/CVF Conference on Computer Vision and Pattern Recognition. 7450-7459.

Khandakar M Rashid and Joseph Louis. 2019. Times-series data augmentation and deep learning for construction equipment activity recognition. Advanced Engineering Informatics 42 (2019), 100944.

L. Pei, S. Xia, L. Chu, F. Xiao, Q. Wu, W. Yu, and R. Qiu. 2021. MARS: Mixed Virtual and Real Wearable Sensors for Human Activity Recognition with Multi-Domain Deep Learning Model. IEEE Internet of Things Journal (2021).

L. Pishchulin, E. Insafutdinov, S. Tang, B. Andres, M. Andriluka, P. Gehler, and B. Schiele. 2016. Deepcut: Joint subset partition and labeling for multi person pose estimation. In Proceedings of the IEEE conference on computer vision and pattern recognition. 4929-4937.

Larry Chan, Vedant Das Swain, Christina Kelley, Kaya de Barbaro, Gregory D. Abowd, and Lauren Wilcox. 2018. Students' Experienceswith Ecological Momentary Assessment Tools to Report on Emotional Well-Being. IMWUT 2, 1, Article 3 (Mar. 2018), 20 pages.

Liang Liu, Jiangning Zhang, Ruifei He, Yong Liu, Yabiao Wang, Ying Tai, Donghao Luo, Chengjie Wang, Jilin Li, and Feiyue Huang. 2020. Learning by Analogy: Reliable Supervision from Transformations for Unsupervised Optical Flow Estimation. In IEEE Conference on Computer Vision and Pattern Recognition(CVPR).

M. Andriluka, L. Pishchulin, P. Gehler, and B. Schiele. 2014. 2D Human Pose Estimation: New Benchmark and State of the Art Analysis. In IEEE Conference on Computer Vision and Pattern Recognition (CVPR).

M. Bächlin, M. Plotnik, and G. Tröster. 2010. Wearable assistant for Parkinson's disease patients with the freezing of gait symptom. IEEE Trans. Inf. Technol. Biomed. 14, 2 (2010), 436-446.

M. Christ, A. W. Kempa-Liehr, and M. Feindt. 2016. Distributed and parallel time series feature extraction for industrial big data applications. https://tsfresh.readthedocs.io. arXiv preprint arXiv:1610. 07717 (2016).

M. Loper, N. Mahmood, J. Romero, G. Pons-Moll, and M. Black. 2015. SMPL: A skinned multi-person linear model. ACM transactions on graphics (TOG) 34, 6 (2015), 1-16.

M. Rosca, B. Lakshminarayanan, and S. Mohamed. 2018. Distribution matching in variational inference. arXiv preprint arXiv:1802. 06847 (2018).

M. Zhang and A. A. Sawchuk. 2012. USC-HAD: a daily activity dataset for ubiquitous activity recognition using wearable sensors. In Proceedings of the International Conference on Ubiquitous Computing. 1036-1043.

(56) References Cited

OTHER PUBLICATIONS

Madhu Vankadari, Sourav Garg, Anima Majumder, Swagat Kumar, and Ardhendu Behera. 2020. Unsupervised monocular depth estimation for night-time images using adversarial domain feature adaptation. In European Conference on Computer Vision. Springer, 443-459.
Matt Trumble, Andrew Gilbert, Charles Malleson, Adrian Hilton, and John Collomosse. 2017. Total Capture: 3D Human Pose Estimation Fusing Video and Inertial Sensors. In 2017 British Machine Vision Conference (BMVC).
N. Hammerla, R. Kirkham, P. Andras, and T. Ploetz. 2013. On preserving statistical characteristics of accelerometry data using their empirical cumulative distribution. In Proceedings of the 2013 international symposium on wearable computers. 65-68.
N. Mahmood, N. Ghorbani, N. Troje, G. Pons-Moll, and M. Black. 2019. AMASS: Archive of motion capture as surface shapes. In Proceedings of the IEEE International Conference on Computer Vision. 5442-5451.
N. Y. Hammerla, S. Halloran, and T. Plötz. 2016. Deep, convolutional, and recurrent models for human activity recognition using wearables . . . In IJCAI. AAAI Press, 1533-1540.
Nicholas D. Lane, Ye Xu, Hong Lu, Shaohan Hu, Tanzeem Choudhury, Andrew T. Campbell, and Feng Zhao. 2011. Enabling Large-Scale Human Activity Inference on Smartphones Using Community Similarity Networks (Csn). In Proceedings of the 13th International Conference on Ubiquitous Computing (Beijing, China) (UbiComp âĂŹ11). Association for Computing Machinery, New York, NY, USA, 355âĂŞ364. https://doi.org/10.1145/2030112.2030160.
Niels van Berkel, Jorge Goncalves, Simo Hosio, and Vassilis Kostakos. 2017. Gamification of Mobile Experience Sampling Improves Data Quality and Quantity. IMWUT 1, 3, Article 107 (Sep. 2017), 21 pages.
Nikolaus Mayer, Eddy Ilg, Philip Hausser, Philipp Fischer, Daniel Cremers, Alexey Dosovitskiy, and Thomas Brox. 2016. A large dataset to train convolutional networks for disparity, optical flow, and scene flow estimation. In Proceedings of the IEEE conference on computer vision and pattern recognition. 4040-4048.
O. Bogdan, V. Eckstein, F. Rameau, and J. Bazin. 2018. DeepCalib: a deep learning approach for automatic intrinsic calibration of wide field-of-view cameras. In Proceedings of the ACM SIGGRAPH European Conference on Visual Media Production. ACM, 6:1-6:10.
O. D. Lara and M. A Labrador. 2012. A survey on human activity recognition using wearable sensors. IEEE communications surveys & tutorials 15, 3 (2012), 1192-1209.
Odongo Steven Eyobu and Dong Seog Han. 2018. Feature representation and data augmentation for human activity classification based on wearable IMU sensor data using a deep LSTM neural network. Sensors 18, 9 (2018), 2892.
P. Asare, R. Dickerson, X. Wu, J. Lach, and J. Stankovic. 2013. BodySim: A Multi-Domain Modeling and Simulation Framework for Body Sensor Networks Research and Design. ICST.
P. Karlsson, B. Lo, and G. Z. Yang. 2014. Inertial sensing simulations using modified motion capture data. In Proceedings of the 11$^{th}$ International Conference on Wearable and Implantable Body Sensor Networks (BSN 2014), ETH Zurich, Switzerland. 16-19.
P. M. Scholl, M. Wille, and K. Van Laerhoven. 2015. Wearables in the wet lab: a laboratory system for capturing and guiding experiments. In Proceedings of the International Conference on Ubiquitous Computing. ACM, 589-599.
P.J. Besl and N. Mckay. 1992. A method for registration of 3-D shapes. IEEE Transactions on Pattern Analysis and Machine Intelligence 14, 2 (Feb. 1992), 239-256.
Pengpeng Liu, Irwin King, Michael R Lyu, and Jia Xu. 2019. Ddflow: Learning optical flow with unlabeled data distillation. In Proceedings of the AAAI Conference on Artificial Intelligence, vol. 33. 8770-8777.
Pengpeng Liu, Michael Lyu, Irwin King, and Jia Xu. 2019. Selflow: Self-supervised learning of optical flow. In Proceedings of the IEEE/CVF Conference on Computer Vision and Pattern Recognition. 4571-4580.

Q. Zhang and R. Pless. [n.d.]. Extrinsic calibration of a camera and laser range finder (improves camera calibration). In 2004 IEEE/RSJ International Conference on Intelligent Robots and Systems (IROS) (IEEE Cat. No. 04CH37566). IEEE.
Qizhe Xie, Zihang Dai, Eduard Hovy, Minh-Thang Luong, and Quoc V Le. 2019. Unsupervised data augmentation for consistency training. arXiv preprint arXiv:1904.12848 (2019).
R. Chavarriaga, H. Sagha, and D. Roggen. 2013. The Opportunity challenge: A benchmark database for on- body sensor-based activity recognition. Pattern Recognition Letter 34, 15 (2013), 2033-2042.
R. I. Hartley and A. Zisserman. 2004. Multiple View Geometry in Computer Vision (second ed.). Cambridge University Press, ISBN: 0521540518.
Ross Girshick, Forrest Iandola, Trevor Darrell, and Jitendra Malik. 2015. Deformable part models are convolutional neural networks. In Proceedings of the IEEE conference on Computer Vision and Pattern Recognition. 437-446.
S. Consolvo and M. Walker. 2003. Using the experience sampling method to evaluate ubicomp applications. IEEE Pervasive Computing 2, 2 (2003), 24-31. https://doi.org/10.1109/MPRV.2003.1203750.
S. Haradal, H. Hayashi, and S. Uchida. 2018. Biosignal data augmentation based on generative adversarial networks. In Annual International Conference of the IEEE Engineering in Medicine and Biology Society (EMBC). IEEE, 368-371.
S. Kang, H. Choi, H. Park, B. Choi, H. Im, D. Shin, Y. Jung, J. Lee, H. Park, S. Park, and J. Roh. 2017. The development of an IMU integrated clothes for postural monitoring using conductive yarn and interconnecting technology. Sensors 17, 11 (2017), 2560.
S. Rusinkiewicz and M. Levoy. [n.d.]. Efficient variants of the ICP algorithm. In Proceedings Third International Conference on 3-D Digital Imaging and Modeling. IEEE Comput. Soc.
S. Shah and J.K. Aggarwal. 1996. Intrinsic parameter calibration procedure for a (high-distortion) fish-eye lens camera with distortion model and accuracy estimation. Pattern Recognition 29, 11 (Nov. 1996), 1775-1788.
S. Suh, H. Lee, J. Jo, P. Lukowicz, and Y. Lee. 2019. Generative oversampling method for imbalanced data on bearing fault detection and diagnosis. Applied Sciences 9, 4 (2019), 746.
S. Takeda, T. Okita, P. Lago, and S. Inoue. 2018. A multi-sensor setting activity recognition simulation tool. In Proceedings of the 2018 ACM International Joint Conference and 2018 International Symposium on Pervasive and Ubiquitous Computing and Wearable Computers. 1444-1448.
S. Yao, Y. Zhao, H. Shao, C. Zhang, A. Zhang, S. Hu, D. Liu, S. Liu, Lu Su, and T. Abdelzaher. 2018. Sensegan: Enabling deep learning for internet of things with a semi-supervised framework. Proceedings of the ACM on interactive, mobile, wearable and ubiquitous technologies (IMWUT) 2, 3 (2018), 1-21.
Saypraseuth Mounsaveng, David Vazquez, Ismail Ben Ayed, and Marco Pedersoli. 2019. Adversarial learning of general transformations for data augmentation. arXiv preprint arXiv:1909.09801 (2019).
Sergey Ioffe and Christian Szegedy. 2015. Batch normalization: Accelerating deep network training by reducing internal covariate shift. arXiv preprint arXiv:1502.03167 (2015).
Shu Liu, Jiaya Jia, Sanja Fidler, and Raquel Urtasun. 2017. Sgn: Sequential grouping networks for instance segmentation. In Proceedings of the IEEE International Conference on Computer Vision. 3496-3504.
Shuosen Guan, Haoxin Li, and Wei-Shi Zheng. 2019. Unsupervised learning for optical flow estimation using pyramid convolution lstm. In 2019 IEEE International Conference on Multimedia and Expo (ICME). IEEE, 181-186.
Simon Meister, Junhwa Hur, and Stefan Roth. 2018. Unflow: Unsupervised learning of optical flow with a bidirectional census loss. In Proceedings of the AAAI Conference on Artificial Intelligence, vol. 32.
Siwei Feng and Marco F Duarte. 2019. Few-shot learning-based human activity recognition. Expert Systems with Applications 138 (2019), 112782.
Song-Hai Zhang, Ruilong Li, Xin Dong, Paul Rosin, Zixi Cai, Xi Han, Dingcheng Yang, Haozhi Huang, and Shi-Min Hu. 2019.

(56) References Cited

OTHER PUBLICATIONS

Pose2seg: Detection free human instance segmentation. In Proceedings of the IEEE/CVF Conference on Computer Vision and Pattern Recognition. 889-898.

Subarna Tripathi, Maxwell Collins, Matthew Brown, and Serge Belongie. 2017. Pose2instance: Harnessing keypoints for person instance segmentation. arXiv preprint arXiv:1704.01152 (2017).

T. Alldieck, M. Magnor, B. Bhatnagar, C. Theobalt, and G. Pons-Moll. 2019. Learning to reconstruct people in clothing from a single RGB camera. In Proceedings of the IEEE Conference on Computer Vision and Pattern Recognition. 1175-1186.

T. Phm and Y. Suh. 2018. Spline Function Simulation Data Generation for Walking Motion Using Foot-Mounted Inertial Sensors. In Sensors. Electronics, 199-210.

T. Plotz, C. Chen, N. Hammerla, and G. Abowd. 2012. Automatic synchronization of wearable sensors and video-cameras for ground truth annotation-a practical approach. In 2012 16th international symposium on wearable computers. IEEE, 100-103.

T. Schreiber and A. Schmitz. 1997. Discrimination power of measures for nonlinearity in a time series. Physical Review E 55, 5 (1997), 5443.

T. Sztyler and H. Stuckenschmidt. 2016. On-body localization of wearable devices: An investigation of position-aware activity recognition. In 2016 IEEE International Conference on Pervasive Computing and Communications (PerCom). IEEE, 1-9.

T. Um, F. Pfister, D. Pichler, S. Endo, M. Lang, S. Hirche, U. Fietzek, and D. Kulić. 2017. Data augmentation of wearable sensor data for parkinson's disease monitoring using convolutional neural networks. In Proceedings of the ACM International Conference on Multimodal Interaction. 216-220.

T. Zhou, M. Brown, Noah S., and D. Lowe. 2017. Unsupervised learning of depth and ego-motion from video. In Proceedings of the IEEE Conference on Computer Vision and Pattern Recognition. 1851-1858.

Tae Hyun Kim, Kyoung Mu Lee, Bernhard Scholkopf, and Michael Hirsch. 2017. Online video deblurring via dynamic temporal blending network. In Proceedings of the IEEE International Conference on Computer Vision. 4038-4047.

Terry Taewoong Um, Vahid Babakeshizadeh, and Dana Kulić. 2017. Exercise motion classification from large-scale wearable sensor data using convolutional neural networks. In 2017 IEEE/RSJ International Conference on Intelligent Robots and Systems (IROS). IEEE, 2385-2390.

Tete Xiao, Yingcheng Liu, Bolei Zhou, Yuning Jiang, and Jian Sun. 2018. Unified perceptual parsing for scene understanding. In Proceedings of the European Conference on Computer Vision (ECCV). 418-434.

Tobias Gruber, Mario Bijelic, Felix Heide, Werner Ritter, and Klaus Dietmayer. 2019. Pixel-accurate depth evaluation in realistic driving scenarios. In 2019 International Conference on 3D Vision (3DV). IEEE, 95-105.

V. Rey, P. Hevesi, O. Kovalenko, and P. Lukowicz. 2019. Let there be IMU data: generating training data for wearable, motion sensor based activity recognition from monocular RGB videos. In Adjunct Proceedings of the ACM International Joint Conference on Pervasive and Ubiquitous Computing and Proceedings of the ACM International Symposium on Wearable Computers. 699-708.

Vinod Nair and Geoffrey E Hinton. 2010. Rectified linear units improve restricted boltzmann machines. In Proceedings of the 27th international conference on machine learning (ICML-10). 807-814.

Vitor Fortes Rey, Kamalveer Kaur Garewal, and Paul Lukowicz. 2020. Yet it moves: Learning from Generic Motions to Generate IMU data from YouTube videos. arXiv e-prints (2020), arXiv-2011.

W. Conover and R. Iman. 1981. Rank transformations as a bridge between parametric and nonparametric statistics. The American Statistician 35, 3 (1981), 124-129.

W. Li, Z. Zhang, and Z. Liu. 2010. Action recognition based on a bag of 3D points. In 2010 IEEE Computer Society Conference on Computer Vision and Pattern Recognition—Workshops. 9-14.

Wang Zhao, Shaohui Liu, Yezhi Shu, and Yong-Jin Liu. 2020. Towards Better Generalization: Joint Depth-Pose Learning without PoseNet. In Proceedings of IEEE Conference on Computer Vision and Pattern Recognition (CVPR).

X. Li, J. Luo, and R. Younes. 2020. ActivityGAN: Generative Adversarial Networks for Data Augmentation in Sensor-Based Human Activity Recognition (UbiComp-ISWC '20). ACM, 249-254.

Xiao-Jiao Mao, Chunhua Shen, and Yu-Bin Yang. 2016. Image restoration using very deep convolutional encoder-decoder networks with symmetric skip connections. arXiv preprint arXiv:1603.09056 (2016).

Xintao Wang, Kelvin CK Chan, Ke Yu, Chao Dong, and Chen Change Loy. 2019. Edvr: Video restoration with enhanced deformable convolutional networks. In Proceedings of the IEEE/CVF Conference on Computer Vision and Pattern Recognition Workshops. 0-0.

Xuecheng Nie, Jiashi Feng, and Shuicheng Yan. 2018. Mutual Learning to Adapt for Joint Human Parsing and Pose Estimation. In Proceedings of the European Conference on Computer Vision (ECCV).

Yang Wang, Yi Yang, Zhenheng Yang, Liang Zhao, Peng Wang, and Wei Xu. 2018. Occlusion aware unsupervised learning of optical flow. In Proceedings of the IEEE Conference on Computer Vision and Pattern Recognition. 4884-4893.

Yi Li, Haozhi Qi, Jifeng Dai, Xiangyang Ji, and Yichen Wei. 2017. Fully convolutional instance-aware semantic segmentation. In Proceedings of the IEEE conference on computer vision and pattern recognition. 2359-2367.

Yu Guan and Thomas Plötz. 2017. Ensembles of deep lstm learners for activity recognition using wearables. Proceedings of the ACM on Interactive, Mobile, Wearable and Ubiquitous Technologies 1, 2 (2017), 1-28.

Yuliang Zou, Zelun Luo, and Jia-Bin Huang. 2018. Df-net: Unsupervised joint learning of depth and flow using cross-task consistency.

Z. Cao, G. Hidalgo Martinez, T. Simon, S. Wei, and Y. A. Sheikh. 2019. OpenPose: Realtime Multi-Person 2D Pose Estimation using Part Affinity Fields. IEEE Transactions on Pattern Analysis and Machine Intelligence (2019).

Z. Cao, T. Simon, S. Wei, and Y. Sheikh. 2017. Realtime multi-person 2d pose estimation using part affinity fields. In Proceedings of the IEEE Conference on Computer Vision and Pattern Recognition. 7291-7299.

Z. Shen, W. Wang, X. Lu, J. Shen, H. Ling, T. Xu, and L. Shao. 2019. Human- Aware Motion Deblurring. In Proceedings of the IEEE International Conference on Computer Vision. 5572-5581.

Z. Zhao, Y. Chen, J. Liu, Z. Shen, and M. Liu. 2011. Cross-people mobile-phone based activity recognition. In Twenty-second international joint conference on artificial intelligence.

Zhichao Yin and Jianping Shi. 2018. Geonet: Unsupervised learning of dense depth, optical flow and camera pose. In Proceedings of the IEEE conference on computer vision and pattern recognition. 1983-1992.

Ziwei Liu, Zhongqi Miao, Xiaohang Zhan, Jiayun Wang, Boqing Gong, and Stella X Yu. 2019. Large-scale long-tailed recognition in an open world. In Proceedings of the IEEE/CVF Conference on Computer Vision and Pattern Recognition. 2537-2546.

\* cited by examiner

METHOD AND SYSTEM FOR AUTOMATIC EXTRACTION OF VIRTUAL ON-BODY INERTIAL MEASUREMENT UNITS

RELATED APPLICATION

This application claims priority to, and the benefit of, U.S. Provisional Patent Application No. 63/073,009, filed Sep. 1, 2021, entitled, "Method and System for Automatic Extraction of Virtual Body Accelerometry," which is incorporated by reference herein in its entirety.

BACKGROUND

On-body sensor-based human activity recognition (HAR) is widely utilized for behavioral analysis, such as user authentication, healthcare, and tracking everyday activities. Regardless of its utility, the HAR field has yet to experience significant improvements in recognition accuracy, in contrast to the breakthroughs in other fields, such as speech recognition, natural language processing, and computer vision. In those domains, it is possible to collect huge amounts of labeled data, the key for deriving robust recognition models that strongly generalize across application boundaries.

Collecting large-scale, labeled data sets has so far been limited in sensor-based human activity recognition. Labeled data in human activity recognition is scarce, as sensor data collection can be expensive, and the annotation can be time-consuming and sometimes even impossible for privacy or other practical reasons. A model derived from such sparse datasets is not likely to generalize well. Despite the numerous efforts in improving human activity dataset collection, the scale of typical dataset collection remains small and only covers limited sets of activities.

There is a benefit to improve on-body sensor-based human activity recognition.

SUMMARY

An exemplary virtual IMU extraction system and method are disclosed for human activity recognition (HAR) or classifier system that can estimate inertial measurement units (IMU) of a person in video data extracted from public repositories of video data having weakly labeled video content. The exemplary virtual IMU extraction system and method of the human activity recognition (HAR) or classifier system employ an automated processing pipeline (also referred to herein as "IMUTube") that integrates computer vision and signal processing operations to convert video data of human activity into virtual streams of IMU data that represents accelerometer, gyroscope, or other inertial measurement unit estimation that can measure acceleration, inertia, motion, orientation, force, velocity, etc. at a different location on the body. The exemplary virtual IMU extraction system and method can use video data and weakly labeled information associated with the video data to generate camera-based IMU data, e.g., for the training of deep learning systems, addressing the shortage of labeled sample data by leveraging video content from publicly available social media repositories such as YouTube, TikTok, Facebook, and the like.

The term "weakly labeled data" refers to video data having associated unstructured textual information that was generated for entertainment or the sharing of information that can both be repurposed and extracted for use in machine learning. Examples of weakly labeled data include videos on websites such as YouTube, TikTok, Facebook, and the like and the description of the video on such sites.

The exemplary virtual IMU extraction system and method and associated HAR or classifier system have been evaluated in several studies, (i) a first study that shows proof-of-concept of generating IMU data (e.g., accelerometer) at a different location on the body using video data and (ii) a second study that shows that the exemplary virtual IMU extraction system and method of the human activity recognition (HAR) or classifier system can generate high-quality virtual IMU data from weakly labeled video data set collected in an automated manner (i.e., without intervention or supervision by a user) for a number of real-world and practical analysis tasks. The two studies confirm the exemplary virtual IMU extraction can be scaled to practical use. The exemplary virtual IMU extraction system and method can be configured with noisy pose filtering, occlusion handling, and foreground and background motion detection to generate high-quality IMU data in the presence of common artifacts in unrestricted online videos, including various forms of video noise, non-human poses, body part occlusions, and extreme camera, and human motion.

In a first-class of applications, the exemplary virtual IMU extraction system and method can be used to train or supplement the training of a machine learning classifier for human activity recognition. From the noted studies, it is observed that the virtually-generated IMU data of the exemplary can effectively replace the acquisition of real IMU data for training in which only some real data are acquired for calibration, substantially reducing the cost and effort associated with the data collection aspect of developing new HAR system. In some embodiments, sensor information from other sources can be used for the calibration. It is also observed that the virtual IMU data set can be used in combination with real IMU data to improve the performance of a variety of models on HAR datasets, including known HAR datasets. The study showed that the HAR systems trained with the virtual IMU data and real IMU data could significantly outperform baseline models trained only with real IMU data. The exemplary real IMU data system and method and/or subsequently trained HAR system may be used in a collective approach of computer vision, signal processing, and activity recognition to provide on-body, sensor-based HAR. Likely, because videos of people performing tasks on social media websites can vary in skill and conditions, the virtual IMU data set generated from such real-world videos and scenarios can provide substantial intra-class variability for a given HAR application. This variability in the input data can thus support the training of more general activity recognizers that can have substantially increased classification performance to real-world scenarios and applications as compared to a state-of-the-art system that employs only real IMU data.

Because virtual IMU data can be generated by the exemplary virtual IMU extraction with virtually no manual researcher effort, the exemplary virtual IMU extraction system and method (and subsequently generated HAR system) is a paradigm change for collecting training data for human activity recognition and the resulting HAR system generated from them. Activity videos can be queried and collected from public video repositories such as YouTube with straightforward queries. The search terms themselves serve as a weak label of the searched videos that can both be used as training data. The collection can also address practical and privacy-related constraints associated with data collection. Because only a small amount of real IMU data is sufficient for supervised calibration, very effective activity recognition systems can be derived, as demonstrated in the experimental evaluation provided herein.

In another class of applications, the exemplary HAR or classifier system and method can be used to generate accelerometer, inertia, motion data set or other IMU data as described herein for the training or evaluation of wearable sensors and devices. Notably, the exemplary HAR or classifier system and method can be used to provide large training and/or validation data set for wearable sensors and devices development and evaluation as well as AI systems for such devices. In some embodiments, the exemplary virtual IMU extraction system and method can be configured as a query system that can provide queryable databases from social media websites to generate large training data sets of virtual IMU data sets, e.g., for HAR. The query can be query-able based on classes of human activity as well as for specific body locations of the virtual IMU data.

In yet another class of applications, the computer vision and signal processing operations of the disclosed exemplary virtual IMU extraction system and method can be used to generate (i) virtual IMU data set associated with accelerometer, inertia, or other IMU data set, and (ii) pose of a person from video data. The virtual IMU data set (or subsequent trained HAR system) can be used to evaluate or characterize the performance of athletes and performers in terms of their form and pose as well as for speed analysis and performance testing.

The exemplary virtual IMU extraction system can be used to generate training data of machine learning algorithms for everyday life scenarios and their sub-categories, such as eating, sitting, exercising, working, climbing, sleeping, walking, shopping, bicycling, skating, jumping, dancing, acting, and the like.

In an aspect, a system is disclosed comprising an automated processing pipeline comprising a two-dimensional skeletal estimator configured to determine skeletal-associated points of a body of a person in a plurality of frames of a video data set; a three-dimensional skeletal estimator configured to generate 3D motion estimation of 3D joints of the skeletal-associated points; an IMU extractor configured to determine motion values at one or more 3D joints of the skeletal-associated points; and a sensor emulator configured to modify the determine motion values at one or more 3D joints of the skeletal-associated points according to an IMU sensor profile to generate virtual IMU sensor values, wherein the virtual IMU sensor values are outputted for the one or more 3D joints of the skeletal-associated points.

In some embodiments, the virtual IMU sensor values are used to train a human activity recognition classifier.

In some embodiments, the system further includes a three-dimensional skeletal calibrator configured to determine and apply a translation factor and a rotation factor using determined camera intrinsic parameters of a scene and estimated perspective projection.

In some embodiments, the system further includes a camera ego-motion estimator configured to reconstruct a 3D scene reconstruction by generating a 3D point cloud of a scene and determining a depth map of objects in the scene, the camera ego-motion estimator being configured to determine camera ego-motion between two consecutive frame point clouds.

In some embodiments, the system further includes a three-dimensional skeletal calibration filter configured to exclude frames, provided to the IMU extractor, determined to include changes in the rotation factor or the translation factor that exceeds a threshold.

In some embodiments, the system further includes a two-dimensional skeletal filter configured to interpolate and smooth the determined skeletal-associated points to add missing skeletal-associated points to each frame.

In some embodiments, the system further includes a two-dimensional skeletal tracker configured to establish and maintain correspondences of each person, including the person and a second person, across frames.

In some embodiments, the system further includes a noisy pose filter configured to detect the person in the plurality of frames of the video data set prior and to exclude a frame, provided to the IMU extractor, of the video data set from the two-dimensional skeletal estimator prior to the determining of the skeletal-associated points.

In some embodiments, the system further includes an occlusion detector configured (i) to identify a mask of a segmented human instance and (ii) exclude a frame, provided to the three-dimensional skeletal estimator if an on-body sensor location overlaps with an occluded body part segment of a person or a mask associated with a second person.

In some embodiments, the system further includes a foreground motion filter configured to determine local joint motions, global motion measurements, and changes of a bounding box across frames of the video data set and excluding a frame, provided to the three-dimensional skeletal estimator, if the determined local joint motions, global motion measurements, or changes of a bounding box exceeds a predefined threshold.

In some embodiments, the system further includes a motion intensity filter configured to (i) estimate pixel displacement associated parameters, (ii) determine a background motion measure of the estimated pixel displacement, and (iii) exclude a frame having the background motion measure exceeding a pre-defined threshold value.

In some embodiments, the system further includes a motion translator configured to translate the determined motion values at the one or more 3D joints to a body coordinate system.

In some embodiments, the virtual IMU sensor values comprise tri-axial IMU data.

In some embodiments, the video data set is obtained from an online video-sharing website for a given activity defined by a description of the online video-sharing website of the video data set.

In some embodiments, the system further includes a deep neural network configured to receive and train using (i) virtual IMU sensor values generated from video data set are obtained from an online video sharing website and (ii) a label associated with given activity defined by the description of the online video-sharing website of the video data set.

In some embodiments, the system further includes a query configured to receive a request comprising (i) a queryable activity and (ii) a queryable body location for the virtual IMU sensor values, wherein the queryable activity comprises a search string to apply to an online video-sharing website.

In some embodiments, the system further includes a deep neural network configured to receive and train using (i) virtual IMU sensor values generated from video data set are obtained from an online video sharing website and (ii) a label associated with given activity defined by the description of the online video-sharing website of the video data set.

In some embodiments, the virtual IMU sensor values are used to analyze and evaluate the performance of an IMU sensor for the one or more 3D joints.

In another aspect, a method is disclosed of operating an automated processing pipeline comprising determining, via a two-dimensional skeletal estimator, skeletal-associated points of a body of a person in a plurality of frames of a video data set; generating, via a three-dimensional skeletal estimator, 3D motion estimation of 3D joints of the skeletal-associated points; determining, via an IMU extractor, motion values at one or more 3D joints of the skeletal-associated points; modifying, via a sensor emulator, the determine motion values at one or more 3D joints of the skeletal-associated points according to an IMU sensor profile to generate virtual IMU sensor values; and outputting the virtual IMU sensor values for the one or more 3D joints of the skeletal-associated points.

In another aspect, a non-transitory computer-readable medium is disclosed having instructions stored thereon, wherein execution of the instructions by a processor, cause the processor to determine skeletal-associated points of a body of a person in a plurality of frames of a video data set; generate 3D motion estimation of 3D joints of the skeletal-associated points; determine motion values at one or more 3D joints of the skeletal-associated points; modify the determined motion values at one or more 3D joints of the skeletal-associated points according to an IMU sensor profile to generate virtual IMU sensor values; and output the virtual IMU sensor values for the one or more 3D joints of the skeletal-associated points.

BRIEF DESCRIPTION OF DRAWINGS

The patent or application file contains at least one drawing executed in color. This application is directed to the evaluation of the field of view of a person. Evaluative scenes and results, as presented in color, may be necessary for the understanding of the claims. Copies of this patent or patent application publication with color drawing(s) will be provided by the Office upon request and payment of the necessary fee.

Embodiments of the present invention may be better understood from the following detailed description when read in conjunction with the accompanying drawings. Such embodiments, which are for illustrative purposes only, depict novel and non-obvious aspects of the invention. The drawings include the following figures.

DETAILED SPECIFICATION

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the nth reference in the reference list. For example, Ref. [1] refers to the $1^{st}$ reference in the list. All references cited and discussed in this specification are incorporated herein by reference in their entireties and to the same extent as if each reference was individually incorporated by reference.

EXAMPLE SYSTEM AND METHOD OF OPERATIONS

Figure 1A:
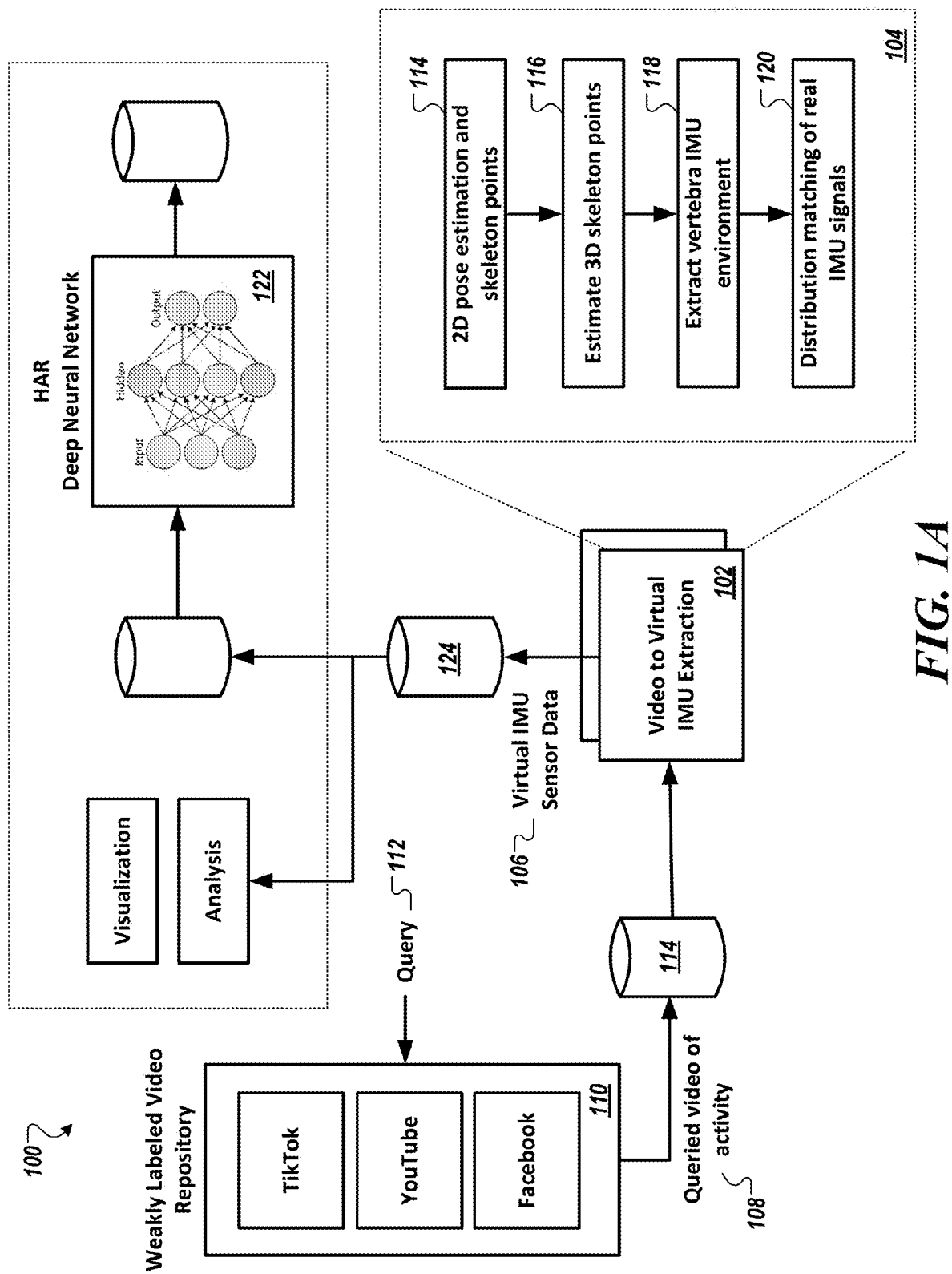
FIG. 1A shows an example human activity recognition (HAR) system configured to generate/determine virtual inertial measurement unit (IMU) sensor data from video data in accordance with an illustrative embodiment.
Figure 1B:
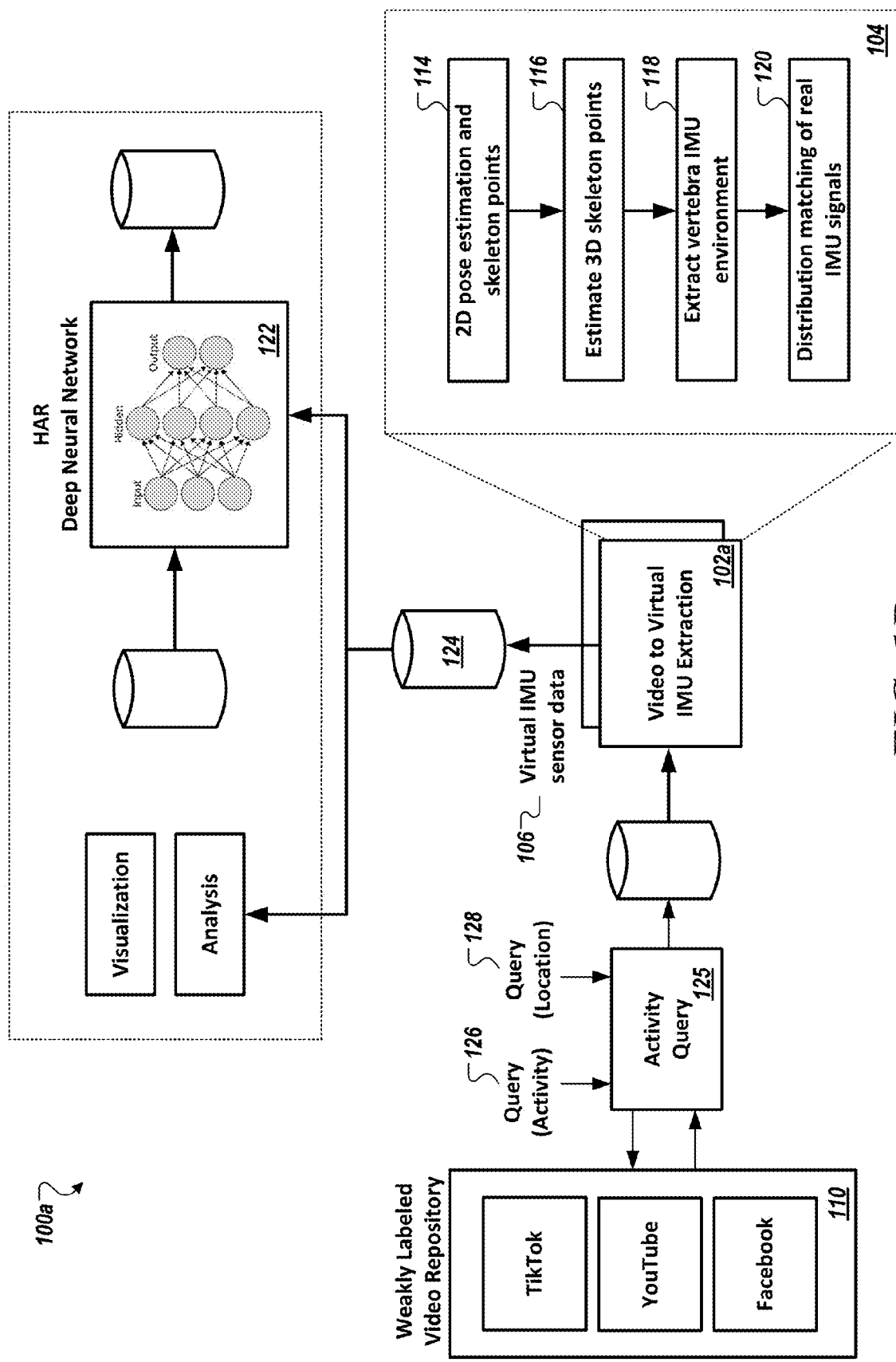
FIG. 1B shows an example queryable human activity recognition (HAR) system configured to generate/determine virtual inertial measurement unit (IMU) sensor data from queried video data in accordance with an illustrative embodiment.
Figure 1C:
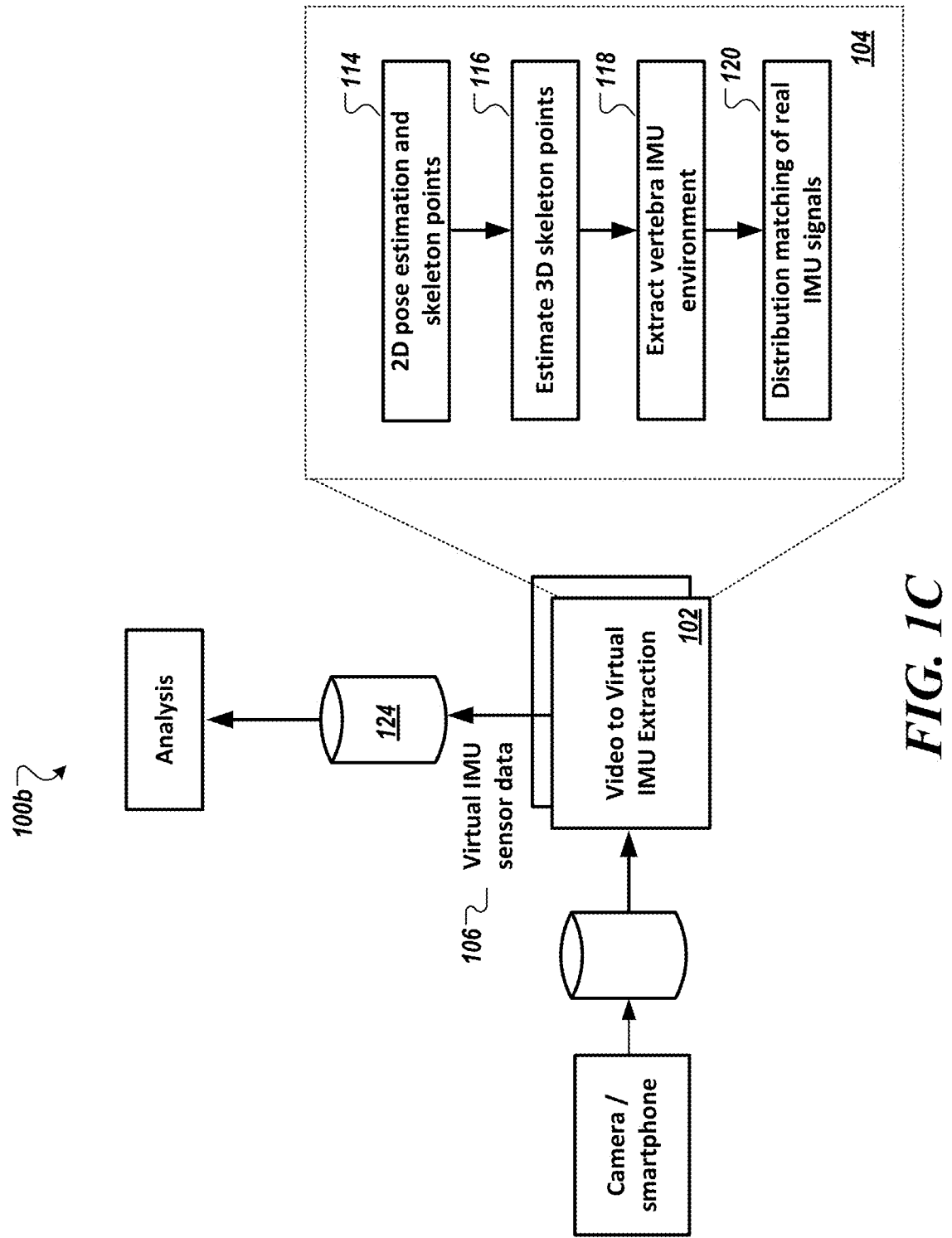
FIG. 1C shows another example human activity recognition (HAR) system configured to generate/determine virtual inertial measurement unit (IMU) sensor data from video data in accordance with an illustrative embodiment.

FIG. 1A shows a diagram of an example human activity recognition (HAR) system 100 that include a virtual IMU extraction system 102 (shown as "Video to Virtual IMU Extraction" 102) configured, with a video pipeline analysis engine 104, to generate/determine virtual inertial measurement unit (IMU) sensor data 106 (e.g., local 3D joint motion, e.g., tri-axial accelerometer data) from queried video data 108 of human activity from an online video sharing website 110. The virtual IMU extraction system 102 can search the online video sharing website 110 for a query 112 to directly access and capture video of a target activity of interest. Online video sharing website 110 can provide a virtually unlimited supply of labeled video that can be extracted by the virtual IMU extraction system 102 to use for training sensor-based HAR applications. Once the video data 108 are retrieved, the video pipeline analysis engine 104 can then extract the virtual IMU sensor data 106. FIG. 1B shows a diagram of the example human activity recognition (HAR) system 100a that includes a query-able virtual IMU extraction system 102 (shown as 102a). FIG. 1C shows a diagram of a system 100b that includes the virtual IMU extraction system 102 comprising the video pipeline analysis engine 104 configured to extract virtual IMU sensor data 106 from video data of a camera device.

Referring to FIG. 1A, the video pipeline analysis engine 104 includes a computer vision pipeline configured with (i) a 2D skeletal estimator (114) of key skeletal-associated points/joints of the body and limb of the person using the queried video data 108, (ii) a 3D skeletal estimator (116) that provides motion estimation for 3D joints of the 2D skeletal-associated points, (iii) IMU extractor (118) that tracks and extracts individual joints of the vertebrae and limb to generate IMU sensor data (e.g., acceleration or other IMU described herein) at the individual joints, and (iv) perform post-processed to match the target application domain via distribution matching (120) to real-IMU signals.

Figure 2A:
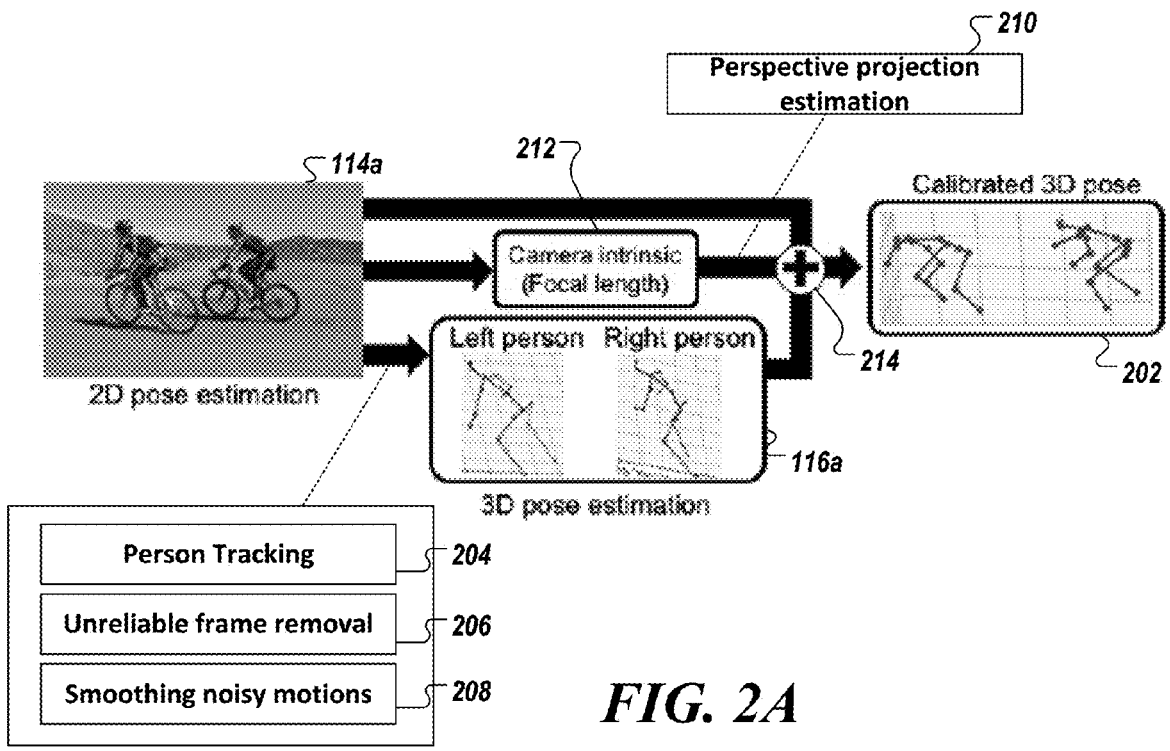
FIG. 2A shows an example implementation of a 3D joint orientation estimation and pose calibration module to provide motion estimation for 3D joints of each person in a frame of the video data in accordance with an illustrative embodiment.

FIG. 2A shows an example 3D joint orientation estimation (shown as "3D Pose Estimation" 304) and pose calibration (shown as "3D Pose Calibration" 310) to provide motion estimation for 3D joints of each person in a frame of the video data 108 (shown as 108a). For a given video, parameters of local joint rotations for the human in the scene can be estimated through 2D pose estimation [6B, 17B], which are then lifted to 3D poses [78B].

Figure 2B:
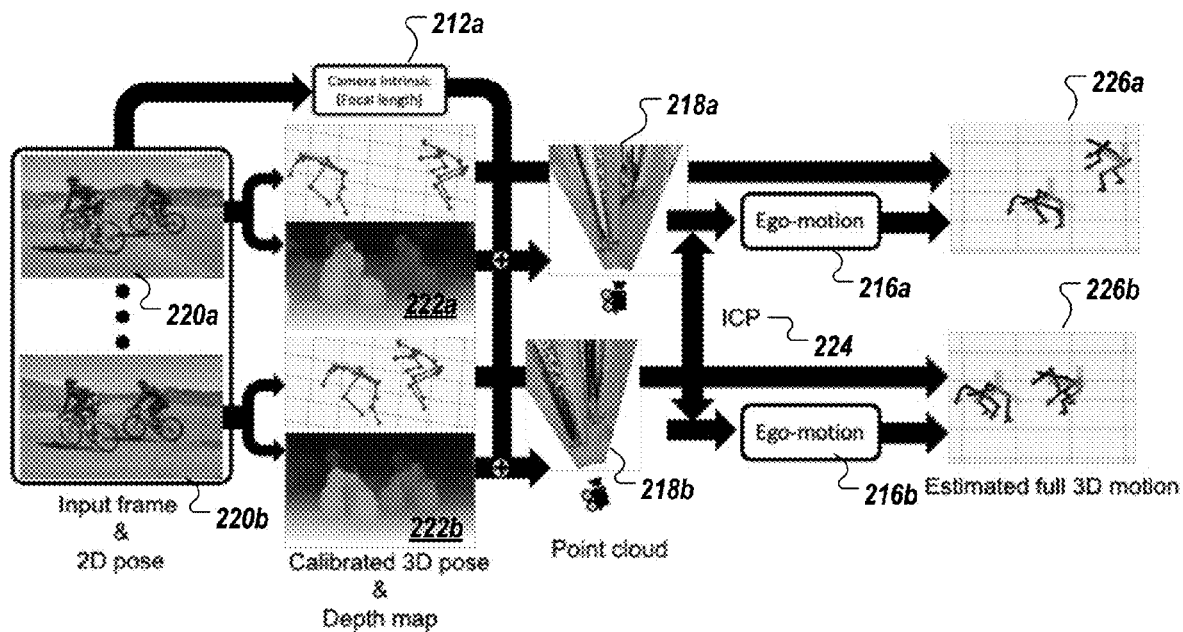
FIG. 2B shows an example implementation of a global body tracking module to extract global 3D scene information from the 2D video to track and adjust based on camera ego-motion a person's movement in a scene in accordance with an illustrative embodiment.
Figure 3A:
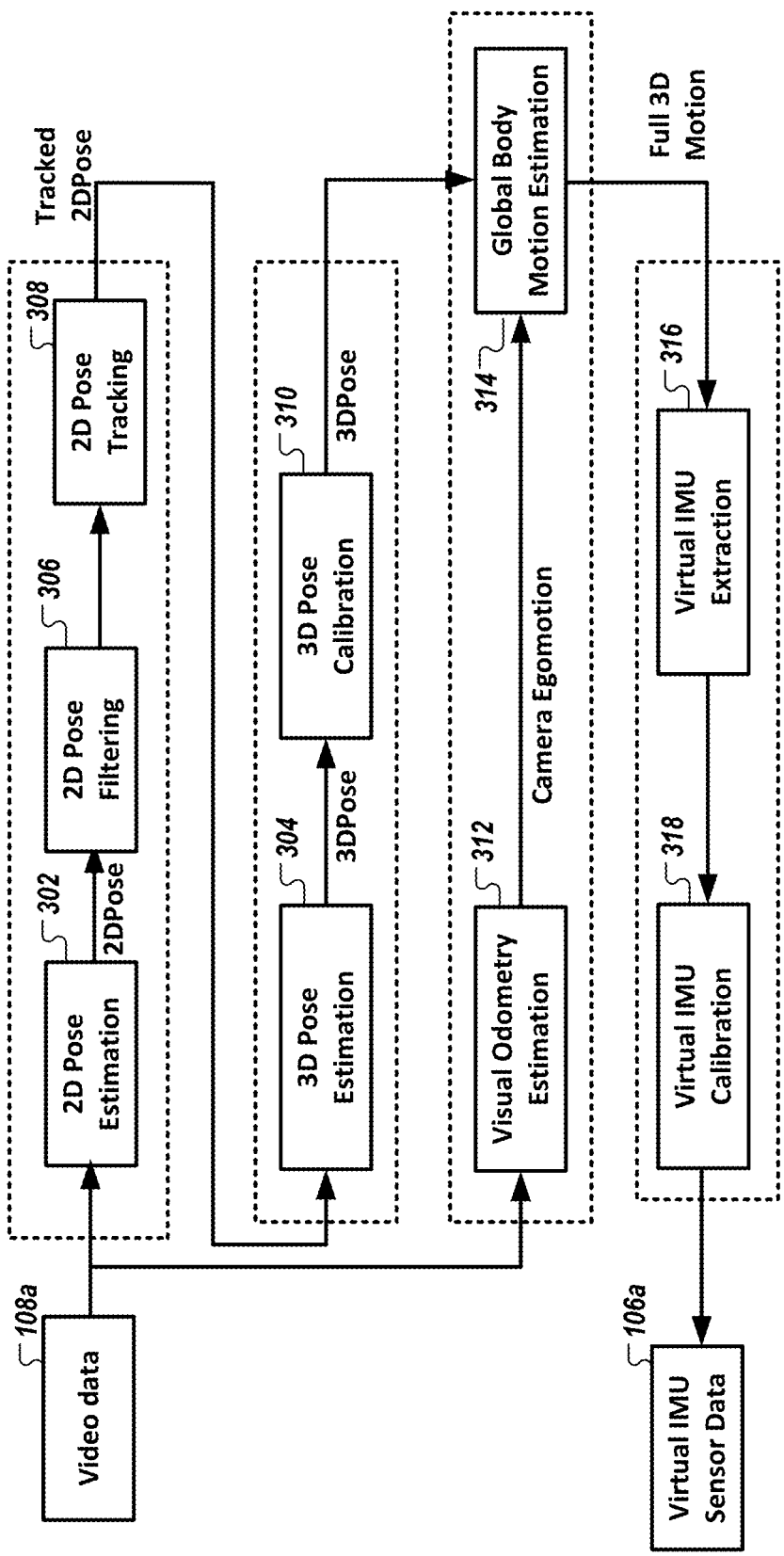
FIG. 3A shows an implementation of the video pipeline analysis engine of FIGS. 2A and 2B in accordance with an illustrative embodiment.

FIG. 2B shows global body tracking (shown as "Global Body Motion Estimation" 314) in 3D to extract global 3D scene information from the 2D video (e.g., 108a) to track a person's movement in the whole scene by compensating for camera ego-motion (shown determined by "Visual Odometry Estimation" 312). FIG. 3A shows an implementation of the video pipeline analysis engine 104 of FIGS. 2A and 2B in accordance with an illustrative embodiment. To estimate the global body movement for an entire video scene, the exemplary virtual IMU extraction system (e.g., 102) can estimate camera ego-motion through 3D scene reconstruction [116B]. Firstly, the 3D location and orientation of each person in a frame are tracked [3B, 117B], and a 3D pose calibration model is applied [45B]. Subsequently, the results of person tracking are compensated at frame level for camera ego-motion such that full global movements can be tracked across frames. Once the full human motion has been tracked, virtual IMU data (e.g., accelerometer and gyroscope, etc.) [112B] are extracted from any (virtual) on-body location through forward kinematics [11B]. Finally, to handle the domain gap between virtual IMU and real IMU data, the generated virtual IMU data is calibrated with (few) real IMU samples collected from the sensor for deployment [12B]. It was demonstrated that virtual IMU data was useful for the analysis of both locomotion [9B, 94B] and more complex activities [82B].

More specifically, in the example of FIG. 2A, the 2D skeletal estimator 114 (e.g., "2D Pose" 302) and the 3D skeletal estimator 116 (e.g., "3D Estimation" 304) employ state-of-the-art pose extractor (shown as 114a) and a pose3D model (shown as 116a), namely OpenPose software [10] and VideoPose3D [56], respectively, to generate an initial 2D skeletal-associated points/joints of the body and limb and to lift the 2D skeletal-associated points/joints to a 3D skeletal-associated points/joints for each video frame. Description of the pose extractor, Openpose (also referred to herein as "Pose2D") and Pose3D model can be found in Z. Cao, T. Simon, S. Wei, and Y. Sheikh, "Realtime multi-person 2d pose estimation using part affinity fields," In Proceedings of the IEEE Conference on Computer Vision and Pattern Recognition. 7291-7299 (2017) (referenced as [10]), and D. Pavllo, C. Feichtenhofer, D. Grangier, and M. Auli, "3D human pose estimation in video with temporal convolutions and semi-supervised training," In Proceedings of the IEEE Conference on Computer Vision and Pattern Recognition. 7753-7762 (2019) (referenced as [56]), respectively, each of which is incorporated by reference herein in its entirety.

In the example shown in FIG. 2A, the video pipeline analysis engine 104 can also assume all people in a scene are performing the same activity. The video pipeline analysis engine 104 can include tracking operation (shown as "Person Tracking" 204) (e.g., "2D Pose Filter" 308) to establish and maintain person correspondences across frames. An example tracking operation is the SORT tracking algorithm [7] that can track each person across the video sequence using a bipartite graph that can match with the edge weights as the intersection-over-union (IOU) distance between boundary boxes of people from consecutive frames. The boundary boxes can be derived as tight boxes, including the 2D keypoints for each person. To increase the reliability of the 2D pose detection and tracking, the video pipeline analysis engine 104 can remove (shown as "Unreliable frame removal" 206) 2D poses where over half of the joints are missing and also drop sequences that are shorter than one second. For each sequence of a tracked person, the video pipeline analysis engine 104 can also interpolate and smooth (208) (e.g., "2D Pose Filtering" 306) missing or noisy keypoints in each frame, e.g., using a Kalman filter. Finally, each 2D pose sequence is lifted to a 3D pose by employing the VideoPose3D model [56]. Capturing the inherent smooth transition of 2D poses across the frame encourages more natural 3D motion in the final estimated (lifted) 3D pose.

From the initial 2D skeletal-associated points/joints of the body and limb and 3D skeletal-associated points/joints generated by 2D pose estimation (114a) and 3d pose estimation (116a) of each video frame, the video pipeline analysis engine 104 is configured to calibrate the orientation and translation in the 3D scene for each frame (collectively shown as "Calibrated 3D Pose" 202) using estimations of the camera intrinsic parameters.

As noted above, FIG. 2B shows global body tracking in 3D to extract global 3D scene information from the 2D video to track a person's movement in the whole scene by compensating for camera ego-motion. The operation facilitates the estimation of virtual inertial measurement units, e.g., acceleration, of the global body movement in 3D as well as the IMU, e.g., acceleration, of local joint motions in 3D.

To localize the global 3D position and orientation of the pose in the scene, the video pipeline analysis engine 104 is configured to determine i) 3D localization in each 2D frame and ii) the camera viewpoint changes (ego-motion) between subsequent 3D scenes. To do so, the video pipeline analysis engine 104 can map the 3D pose of a frame to the corresponding position within the whole 3D scene in the video, compensating for the camera viewpoint of the frame. The sequence of the location and orientation of the 3D pose is the global body movement in the whole 3D space. For the virtual sensor, the global IMU, e.g., global acceleration, from the tracked sequence will be extracted along with local joint IMU.

3D Pose Calibration. First, the video pipeline analysis engine 104 can estimate (116a) the 3D rotation and translation of the 3D pose within a frame, as shown in FIG. 2A. For each frame, the video pipeline analysis engine 104 can calibrate (e.g., "3D Pose Calibration" 310) each 3D pose from a previously estimated 3D joint (from a prior frame) according to the perspective projection between corresponding 3D and 2D keypoints. The perspective projection (210) can be estimated with the Perspective-n-point (Pnp) algorithm [33].

The Pnp algorithm requires the camera intrinsic parameters for the projection, including focal length, image center, and lens distortion parameters [11, 70]. Because arbitrary online videos do not include EXIF metadata, the video pipeline analysis engine 104 can estimate (212) camera intrinsic parameters from the video, e.g., using the Deep-Calib model [8]. The DeepCalib model is a frame-based model that calculates intrinsic camera parameters for a single image at a time. The DeepCalib model can be performed for each of the frames to determine changes across the frame according to its scene structure. The video pipeline analysis engine 104 can aggregate the intrinsic parameter predictions by taking the average from all the frames per Equation 1.

$$c^{int} = \frac{1}{T}\sum_{t=1}^{T} c_t^{int} \qquad \text{(Eq. 1)}$$

In Equation 1, $c^{int}=[f, p, d]$ is the averaged camera intrinsic parameters from each frame, $x_t$ at time t, predictions, $c^{int}_t$=DeepCalib($x_t$). The parameter $f=[f_x, f_y]$ is the focal length and $p=[p_x, p_y]$ is optical center for x and y-axis, and d denotes the lens distortion. Once the camera intrinsic parameters are calculated (212), the video pipeline analysis engine 104 can employ the Pnp algorithm to regress global pose rotation and translation by minimizing the objective function of Equation 2.

$$\{R^{calib}, T^{calib}\} = \arg\min_{R,T} \sum_{i=1}^{N} \left\| p_2^i - \frac{1}{s} c^{int}(Rp_3^i + T) \right\| \qquad \text{(Eq. 2)}$$

subject to $R^T R = I_3$, $\det(R) = 1$

In Equation 2, $p_2 \in R^2$ and $p_3 \in R^3$ are corresponding 2D and 3D keypoints. $R^{calib} \in R^{3\times3}$ is the extrinsic rotation matrix, $T^{calib} \in R^3$ is the extrinsic translation vector, and $s \in R$ denotes the scaling factor [86, 89]. For the temporally smooth rotation and translation of a 3D pose across frames, the video pipeline analysis engine 104 can initialize the extrinsic parameter, R and T, with the result from the previous frame. The 3D pose (202) for each person, $p_3 \in R^{3\times N}$, at each frame can be calibrated (or localized) (214) with the estimated corresponding extrinsic parameter per Equation 3.

$$p_3^{calib} = R^{calib} p_3 + T^{calib} \qquad \text{(Eq. 3)}$$

From the calibrated 3D poses, $p^{calib}_3 \in R^{3\times N}$, the video pipeline analysis engine 104 can remove people considered as the background (e.g., bystanders). To effectively collect 3D pose and motion that belongs to a target activity, the video pipeline analysis engine 104 can remove bystanders in the (estimated) background. The video pipeline analysis engine 104 can first calculate the pose variation across the frames as the summation of the variance of each joint location across time. Subsequently, the video pipeline analysis engine 104 can only keep those people with the pose variation larger than the median of all people.

Estimation of Camera Egomotion. In an arbitrary video, the camera can move around the scene freely in relation to the person. The video pipeline analysis engine 104 can correct the 3D pose data for camera ego-motion prior to generating the virtual sensor data. To estimate camera ego-motion (shown as 216a, 216b) (shown as "Visual Odometry Estimation" 312) from one viewpoint to another, video pipeline analysis engine 104 can first generate 3D point clouds (shown as 218a and 218b) of both scenes (220a, 220b), e.g., as described in [6, 59, 67]. To generate a 3D point cloud (218a, 218b) of the scene, video pipeline analysis engine 104 can (i) determine the depth map (shown as 222a, 222b) and (ii) use the camera intrinsic parameters from operation 212 (shown as 212a). The depth map (222a, 222b) is the distances of pixels in the 2D scene from a given camera center, which the video pipeline analysis engine 104 can estimate, e.g., with the DepthWild model [22] for each frame. Once the video pipeline analysis engine 104 has obtained the depth map (222a, 222b) and the camera intrinsic parameters (212a), the video pipeline analysis engine 104 can geometrically inverse the mapping of each pixel in the image to the 3D point cloud of the original 3D scene. With basic trigonometry, the point cloud can be derived from the depth map using the previously estimated camera intrinsic parameter (212a), $c^{int}=[f_x, f_y, p_x, p_y, d]$. For a depth value Z at image position (x,y), the point cloud value, [X,Y,Z], can be expressed per Equation 4.

$$[X, Y, Z] = \left| \frac{(x-p_x)\cdot Z}{f_x}, \frac{(y-p_y)}{f_y}, Z \right| \qquad \text{(Eq. 4)}$$

Once the point clouds (218a, 218b) are calculated across frames, the video pipeline analysis engine 104 can derive the camera ego-motion (216a, 216b), including rotation and translations parameters between two consecutive frames of the point cloud. An example method for registering groups (224) of point clouds is the Iterative Closest Points (ICP) algorithm [6, 59, 67]. Fixing a point cloud as a reference, ICP can iteratively find the closest point pairs between two-point clouds and estimate the rotation and translation for the other point cloud that can minimize the positional error between matched points [6]. Because the video pipeline analysis engine 104 can extract color point cloud from video frames, Park et al.'s variant of the ICP algorithm [55] can be adopted, which considers color matching between matched points in addition to the surface normal to enhance color consistency after registration. More specifically, the video pipeline analysis engine 104 can utilize the background point cloud instead of the entire point cloud from a scene because the observational changes for the stationary background objects in the scene are more relevant to the camera movement. The video pipeline analysis engine 104 can consider humans in the scene as foreground objects and remove points that belong to human bounding boxes from 2D pose detection because foreground objects, such as humans, can lead to the ICP algorithm confusing movements of moving objects, i.e., the humans, and of the camera. With the background point cloud, the system can apply the color ICP algorithm [55] between point clouds at time t−1 and t, $q_{t-1}$ and $q_t$, respectively, to iteratively solves Equation 5.

$$\{R_t^{ego}, T_t^{ego}\} = \qquad \text{(Eq. 5)}$$
$$\arg\min_{R,T} \sum_{(q_{t-1}, q_t) \in K} (1-\delta) \left\| C_{q_{t-1}}(f(Rq_t + T)) - C(q_{t-1}) \right\| +$$
$$\delta \left\| (Rq_t + T - q_{t-1}) \cdot n_{q_{t-1}} \right\|$$

In Equation 5, C(q) is the color of point q, and $n_q$ is the normal of point q. K is the correspondence set between $q_{t-1}$ and $q_t$, and $R^{ego}_t \in R^{3\times3}$ and $T^{ego}_t \in R^3$ are fitted rotation and translation vectors in the current iteration. $\delta \in [0, 1]$ is the weight parameter for the balance between positional and color matches.

The estimated sequence of translation and rotation of a point cloud represents the resulting ego-motion (216a, 216b) of the camera. As the last step, the video pipeline analysis engine 104 can integrate the calibrated 3D pose and ego-motion across the video to fully track 3D human motion (shown as 226a, 226b) (e.g., "Global Body Motion Estimation 314). Previously calibrated 3D pose sequences, $p^{calib}_{3}$, can be rotated and translated according to their ego-motion at frame t per Equation 6.

$$p_{3_t}^{track} = R_t^{ego} p_{3_t}^{calib} T_t^{ego} \qquad \text{(Eq. 6)}$$

In Equation 6, $p^{track}_3 \in R^{T \times N \times 3}$ is the resulting 3D human pose and motion tracked in the scene for the video, and T is the number of frames, and N is the number of joint keypoints.

Generating Virtual Sensor Data (316). Referring to FIG. 1A, once full 3D motion information has been extracted for each person in a video, the video pipeline analysis engine 104 can extract (118) virtual IMU sensor streams from specific body locations. The estimated 3D motion tracks the locations of joint keypoints, i.e., those dedicated joints that are part of the 3D skeleton, as it has been determined by the pose estimation process. To track a virtual IMU sensor that is attached to such joints rotates while the person is moving, the video pipeline analysis engine 104 also tracks the orientation change of that local joint. The video pipeline analysis engine 104 can perform the tracking from the perspective of the body coordinates. The local joint orientation changes can be calculated through forward kinematics based on the body center, e.g., hip, to each joint. The video pipeline analysis engine 104 can utilize state-of-the-art 3D animation software, e.g., Blender, to estimate and track these orientation changes. Using the orientation derived from forward kinematics, the video pipeline analysis engine 104 can transform the IMU (e.g., acceleration or other IMU described herein) of joint movements in the world coordinate system into the local sensor coordinate system. The video pipeline analysis engine 104 can calculate the angular velocity of the sensor (gyroscope) by tracking the orientation changes of the sensor.

Distribution Mapping for Virtual Sensor Data (318). As noted above, the video pipeline analysis engine 104 can employ the instant video processing pipeline on raw 2D videos that can readily be retrieved through, for example, querying public repositories such as YouTube, and subsequent curation. The pipeline produced virtual IMU, for example, tri-axial accelerometer data. This data effectively captures the recorded activities, yet the characteristics of the generated sensor data, such as MEMS noise, differ from real IMU data. To compensate for this mismatch, the video pipeline analysis engine 104 can employ the Imusim [83] model to apply realistic sensor behavior for each on-body location. The Imusim model can estimate sensor output by considering the mechanical and electronic components in the device, as well as the changes of a simulated magnetic field in the environment to provide more realistic IMU data [4, 37, 57].

While the extracted sensor stream may capture the core temporal patterns of the target activity in the estimated 3D motion, the intrinsic characteristics of the virtual sensor can still be far from that of the actual physical sensor used for the activity recognition. As the last step before using a virtual sensor dataset for HAR model training, the video pipeline analysis engine 104 can apply (120) the inertial measurement unit (IMU) sensor profile by transferring the distribution of the virtual sensor to that of the target sensor. For computational efficiency, the video pipeline analysis engine 104 can use the rank transformation approach [15] per Equation 7.

$$x_r = G^{-1}(F(X \le x_v)) \qquad \text{(Eq. 7)}$$

In Equation 7, functions $$G(X \le x_r) = \int_{-\infty}^{x_r} g(x) dx \text{ and } F(X \le x_v) = \int_{-\infty}^{x_r} g(x) dx$$

are cumulative density functions for real, $x_r$, and virtual, $x_v$, sensor samples, respectively. In the experiments, it can be shown that only a few seconds to minutes of real sensor data is sufficient to transfer the virtual sensor effectively for successful activity recognition.

In alternative embodiments to domain adaptation techniques, sophisticated techniques like Generative Adversarial Networks [21, 66] can be used to carry over such characteristic sensor noise to the virtual IMU data.

Indeed, the exemplary HAR system and method can be used to replace the conventional data collection procedure that is typically employed for the development of sensor-based human activity recognition (HAR) systems by making existing, large-scale video repositories accessible for the HAR domain, leading to training datasets of sensor data, such as IMUs, that are potentially multiple orders of magnitude larger than what is standard today. With such a massively increased volume of real movement data—in contrast to simulated or generated samples that often do not exhibit the required quality nor variability—it will become possible to develop substantially more complex and more robust activity recognition systems with potentially much broader scope than the state-of-the-art in the field.

Referring to FIG. 1A, the virtual IMU extraction system 102 can be used to train activity recognition classifier 122 using the generated virtual IMU data set 106. The output 106 of the virtual IMU extraction system 102 can be stored, e.g., in a storage area network (SAN) 124 to be accessed or distributed for the training of an activity recognition classifier 122. In other embodiments, the output 106 of the virtual IMU extraction system 102 can be used for analysis or visualization of IMU information of the human body. Activity recognition classifier 122 can include deep neural networks or other AI or machine learning systems such as convolutional neural networks (CNN), Long short-term memory (LSTM), random forest, decision tree, k-nearest neighbors (KNN), Support vector machines (SVM) described or referenced herein.

FIG. 1B shows a query-able virtual IMU extraction system 102 (shown as 102a) configured, with the video pipeline analysis engine 104, to generate/determine virtual inertial measurement unit (IMU) sensor data 106 (e.g., local 3D joint motion, e.g., tri-axial accelerometer data) from queried video data 108 of human activity from an online video sharing website 110. The query-able virtual IMU extraction system 102a includes an action query module 125 that can receive queries from a user interface. The queries can include an activity query 126 and a body location query 128. The query module 125 can receive classes of human activity that can be applied to a search string to the video repository 110. The user interface can display provide return results to be reviewed and accepted by the user prior to being provided to the video pipeline analysis engine 104. The body location query 128 can display available 3D joint motion keypoints for selection by the user. In some embodiments, module 128 allows the user to select body locations that are not on the 3D joint motion keypoints. The virtual IMU extraction system (e.g., 102) can calculate the IMU data for the 3D joint motion based on the available 3D joint motion keypoints.

FIG. 1C shows the virtual IMU extraction system 102 comprising the video pipeline analysis engine 104 to generate IMU data, specifically, from a camera or a smartphone. The IMU data can be used to analyze or characterize performance, e.g., of athletes and performers, in terms of their form and pose as well as for speed analysis and performance testing.

Scalable Video Pipeline Analysis Engine

Videos from public repositories are frequently recorded under non-ideal computer-vision processing conditions for motion tracking, including insufficient lighting conditions, complex background, moving or vibrating camera viewpoint, and potentially rapidly moving person of interest. To improve on the video capture, the video pipeline analysis engine 104 can be configured with one or more additional computer vision operations to perform (i) 3D human motion estimation and tracking, (ii) 3D scene understanding and tracking, (iii) realistic inertial measurement from virtual human motion, and/or (iv) feature representation for the adaptation between the virtual and real IMU domains to adaptively select video samples with sufficient quality such that the resulting virtual IMU data can be used effectively to support model training for HAR applications.

Video pipeline analysis engine 104 can employ video motion deblurring, human instance segmentation, and parsing to detect occlusion and self-occlusion, respectively, and optical flow estimation for detecting background motion. The adaptive selection can be performed, e.g., automatically through the example workflow shown in FIG. 3B. A second study was conducted, and through our extensive experimental evaluation, determined that the artifact handling operation can generate high-quality data for the representative and realistic assessment task of classifying complex human activity. In the second study discussed below, the human activity of free-weight gym exercises was evaluated. The study showed these improvements could significantly improve the accuracy of virtual IMU data, as well as improve the performance of training models that uses the virtual IMU data.

Figure 3B:
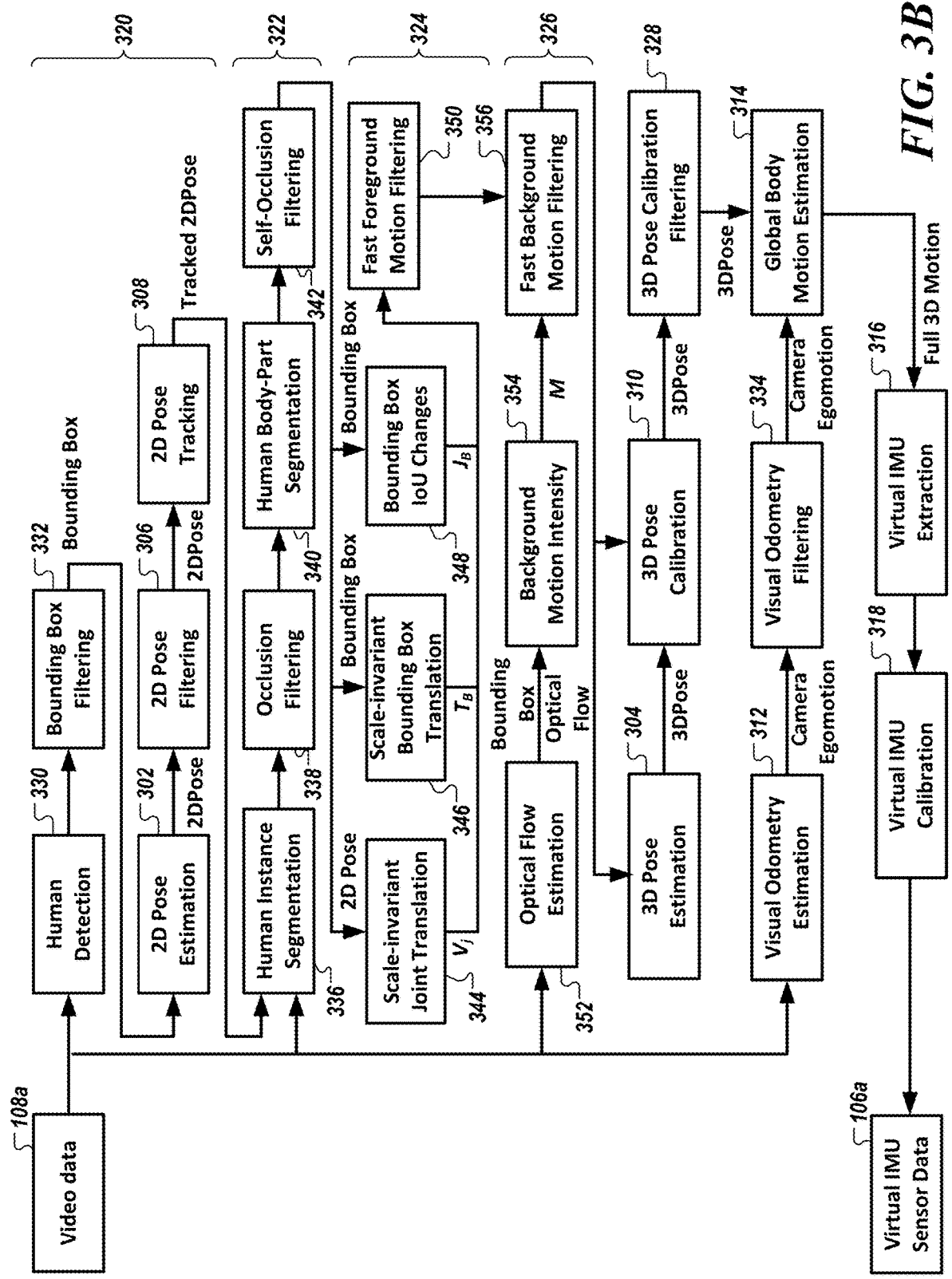
FIG. 3B shows an example implementation of a scalable video pipeline analysis engine in accordance with an illustrative embodiment.

In the example of FIG. 3B, the video pipeline analysis engine 104 is shown configured with noisy pose filtering operation(s) (shown as 320) to remove potentially erroneous results of person detection and inaccurate human pose detection through top-down 2D human pose estimation. In the example, the video pipeline analysis engine 104 also includes occlusion detection operation(s) (shown as 322) to detects occlusions, including self-occlusions, of body parts with human instance segmentation and parsing models to reduce pose depth estimation distortion. In the example, the video pipeline analysis engine 104 also includes foreground (human) motion detection operation(s) (shown as 324) to detect and eliminate blur-inducing fast motions of humans in a scene, which can degrade 2D pose estimation and 3D pose calibration. In the example, the video pipeline analysis engine 104 also includes background (camera) motion detection operation(s) (shown as 326) to detects and eliminates camera motions irrelevant to human motions, such as shaky frames, which can reduce the accuracy of 3D scene estimation. The video pipeline analysis engine 104 can perform additional 3D pose estimation calibration and filtering operation(s) (shown as 328). The video pipeline analysis engine 104 can perform a visual odometry filtering operation (shown as 334). Each of these modules may be implemented individually or in combination and are each discussed herein.

Noisy Pose Filtering (320). In the example of FIG. 3B, the noisy pose filtering operation 320 of the video pipeline analysis engine 104 is shown configured with a human detection module 330 to first detect humans in human bounding boxes, e.g., using a visual person detector [81B], and then detecting keypoints inside the bounding box region to generate the corresponding 2D skeleton, e.g., as described in [7B, 17B, 71B].

2D pose estimation module 302 and 2D pose tracking module 308, e.g., performed by Openpose [68], can generate 2D human skeletons from 2D keypoints that are detected from multiple people in a frame in a bottom-up approach. These modules (e.g., 302, 306, 308) can generate 2D points when keypoints are erroneously detected from overlapping people or non-human objects. For a bottom-up 2D pose estimator, it is also difficult to determine if the estimated pose belongs to a human in the scene if the local keypoint region from a non-human object visually resembles a human body part [6B]. Performing the human detection module 330 first can address these issues.

Human detection module 330 can implement state-of-the-art human detectors such as the YOLO human detector [81B] and the AlphaPose [17B] model that can estimate 2D poses from detected human bounding boxes, which can then be tracked, e.g., with the Human-ReID tracker [117B]. AlphaPose [17B] and YOLO [81B] can also provide confidence scores for detected keypoints as well as for person predictions. Based on these scores, bounding-box filtering operation 332 can perform threshold filtering to suppress erroneous detections. The bounding-box filtering operation 332 can identify outliers in the process of detecting humans in a scene and discard such frames. Human-ReID [117B] can predict the occurrence of a person even if, in reality, a non-human object is detected. Higher threshold value makes noisy pose filtering (332) more selective and increases the data quality, which at the same time decreases the amount of the collected virtual IMU dataset by also rejecting real human detections. To determine the optimal threshold value, cross-validating on the training video datasets can be performed that requires at least a single person in the frame.

Occlusions and Overlaps Detection (322). In the example of FIG. 3B, the video pipeline analysis engine 104 is configured with occlusion detection operation(s) 322 that includes human instance segmentation module 336, a corresponding occlusion filtering module 338, a human body-part segmentation module 340, and a corresponding self-occlusion filtering module 342.

Figure 4A:
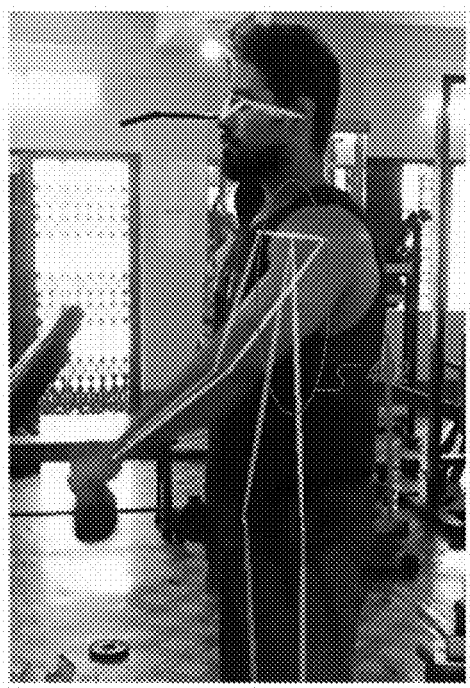
FIGS. 4A-4B each shows examples of occlusion and self-occlusion instances in a video data set.
Figure 4A:
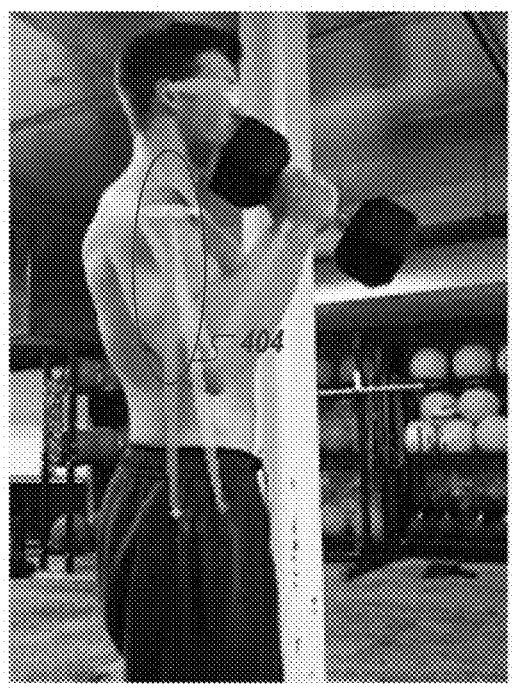
Figure 4B:

Occlusions in the video data 108a can occur when on-body sensor locations of interest are occluded (blocked) or out of the scene in the video data. Occlusions can cause a 2D pose estimator to either miss joint keypoints or providing erroneous estimations, e.g., considering two arms are moving together. Detection of 2D poses in scenes that capture multiple, overlapping people can cause errors. Certain 2D pose estimation when employing a bottom-up approach for detecting 2D human poses—first detects all potential human body keypoints in a video frame and then generates 2D human skeleton graphs based on the local context for neighboring keypoints [6B, 75B, 80B]. Although useful for detecting 2D poses that are captured in a scene, the bottom-up approach may fail to generate an accurate skeleton when detected keypoints are shared by multiple people, which effectively results in occlusions. FIG. 4B shows example keypoints from two people overlap that results in a distorted pose (see circled region 406) for the person in the front who actually performs the exercise of interest. Multi-person occlusion can lead to confusion during keypoint extraction that erroneously merges multiple persons into a single person prediction.

Self-occlusion can occur when the camera viewpoint results in parts of the human body occluding another body part. FIG. 4A shows examples of self-occlusion of an arm from the side-view of a dumbbell activity (see circled regions 402, 404). Self-occlusions (of body parts) in a scene may lead to degraded 2D pose estimation.

Human instance segmentation module 336 can directly detect occlusions between multiple people by utilizing human instance segmentation described in [115B] and parsing models [35B]. In an example, human instance segmentation module 336 aims at detecting all pixels in a video frame that belong to a person. The human instance segmentation module 336 can employ a parsing model that detects the exact contour of multiple people by considering the regions occluded by objects or other people. The human parsing model can detect pixel regions that belong to each body part (e.g., right or left arm) of a person. Given the 2D keypoints of a person, occlusion filtering operation 338 can detect occlusions by checking if an on-body sensor location belongs to the body part segment of a person or others. Occlusion filtering operation 338 can exclude frames when such occlusions are detected.

Human instance segmentation module 336 can utilize a multi-stage approach, which first finds bounding boxes around persons in a frame and then applies semantic segmentation [15B, 22B, 32B, 33B]. Alternatively, human instance segmentation module 336 can employ methods that simultaneously learn detection and segmentation models [14B, 36B, 55B, 60B]. Human instance segmentation module 336 can incorporate more recent work that exploits the results of human pose estimation for human instance segmentation [75B, 96B, 115B]. For example, the Pose2seg model very effectively recognizes occlusions in human segments by harnessing human pose estimation inputs [115B]. The human parsing model further segments the body into pixels belonging to each body part. Some work utilizes the hierarchical structure of the human body for learning the semantics of each body part [24B, 72B, 118B]. Furthermore, approaches exist that have significantly improved segmentation performance by learning models from multiple datasets with different annotation granularities, ranging from body parts to garments the person is wearing [23B, 107B]. Graphy-ML [35B] is a multi-human parsing method with a graph pyramid module that makes use of the hierarchical and multi-granularity structure of the human body along with transfer learning between multiple datasets.

The human body-part segmentation module 340 can evaluate the presence of self-occlusion by checking if keypoints are located at the correct body part segment (e.g., right wrist on right arm). By comparing the detected keypoints with a segmentation mask, the human body-part segmentation module 340 can determine if the keypoints are in the foreground or not. The human body-part segmentation module 340 can test the portions of body parts that are related to the on-body sensor location and ongoing activity for occlusion. The human body-part segmentation module 340 does not need visibility on all joints of a person and is configured to accept frames if at least the subset of limbs or joints is visible that are involved in the target actions. The visibility of the limb parts can be detected by comparing the joint keypoints and human body part parsing results, e.g., as described in (Grapy-ML [35B]).

Figure 4C:
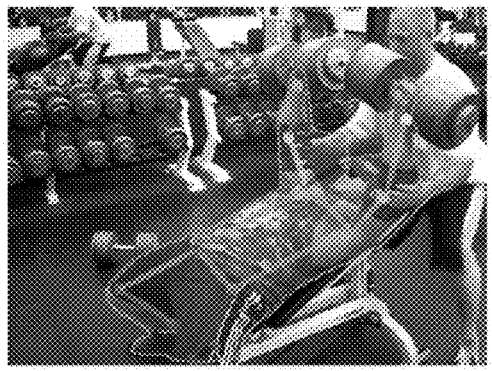
FIGS. 4C and 4D each illustrates successful correction of occlusion detection in accordance with an illustrative embodiment.
Figure 4C:
Figure 4D:
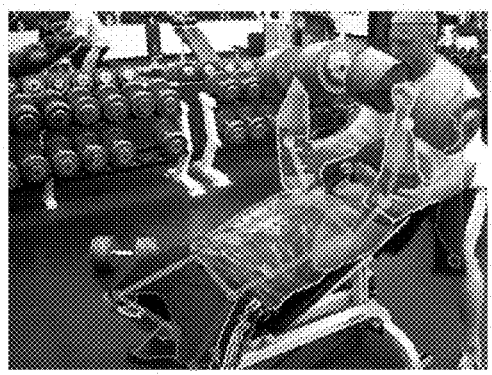
Figure 4D:

After detecting occluded 2D poses, occlusion filtering module 338 and self-occlusion filtering module 342 can re-segment the whole sequence into unoccluded 2D pose clips (thereby removing the detected occlude portion) in which each clip is passed on to further analysis. Occlusion filtering module 338 and self-occlusion filtering module 342 do not need to interpolate the discarded poses from neighboring frames, which can introduce interpolation errors. Rather, occlusion filtering module 338 and self-occlusion filtering module 342 can pass the confidently occlusion-filtered estimated 2D poses for further 3D motion analysis. If the remaining clips in the video are shorter than the sliding window size (for example, four seconds for the MyoGym dataset [47B]) for the classifier, then the occlusion filtering module 338 or the self-occlusion filtering module 342 can discard the whole video clip. While human instance segmentation module 336 and human body-part segmentation module 340 and subsequent filtering modules 338, 342 can reduce the amount of sample data (e.g., 108a) that can be used only to high-quality ones, the virtually unlimited supply of activity videos in public repositories does not result in a practical limitation on the amount of available training data that can be generated by the video pipeline analysis engine 104. FIGS. 4C and 4D each illustrates two examples of occlusion and self-occlusion scenarios, respectively, in which two persons are in a scene overlap and the successful correct detection of poses for the active foreground users.

Foreground (human) motion detection operation(s) (324). In the example shown in FIG. 3B, to perform foreground (human) motion detection operation 324 to detect and eliminate blur-inducing fast motions of humans in a scene that can degrade 2D pose estimation and 3D pose calibration, video pipeline analysis engine 104 includes a scale-invariant joint translation module 344, a scale-invariant bounding box translation module 346, a bounding box IoU changes module 348, and a fast foreground motion filtering module 350.

Video pipeline analysis engine 104 can reduce the impact of motion blur using a robust motion intensity analysis, e.g., based on automatic detection of fast foreground, i.e., human, movements in a scene that can remove minimal to moderate motion blurs, e.g., using deblurring models [74B]. Video pipeline analysis engine 104 can also approximate the intensity of foreground motion (assumed to be caused by the human in the scene) by tracking changes in local joint motion and global body motion. For local joint motion, 2D keypoint detection can be noisy and not consistent across subsequent frames when camera viewpoints are not ideal or if a person is moving fast. Such noisy 2D keypoint detection can propagate its error to 3D pose estimation. Foreground (human) motion detection operation 322 can detect those frames with extreme 2D keypoint location changes to remove erroneous pose detections.

Motion blur can occur when a person in a video is moving faster than the framerate of the recording camera can capture. The effect can be most prominent on the outline of the moving person or any moving object held or attached to the person, which can confuse a pose estimator to erroneous localize certain keypoints. While a typical frame rate of videos of approximately 30 Hz is sufficient for most filming purposes, details of fast motions are often lost at this frame rate resulting in motion blur. Motion blur can blend human boundary pixels with background pixels and makes pose estimation difficult to find correct body keypoints.

Figure 5A:
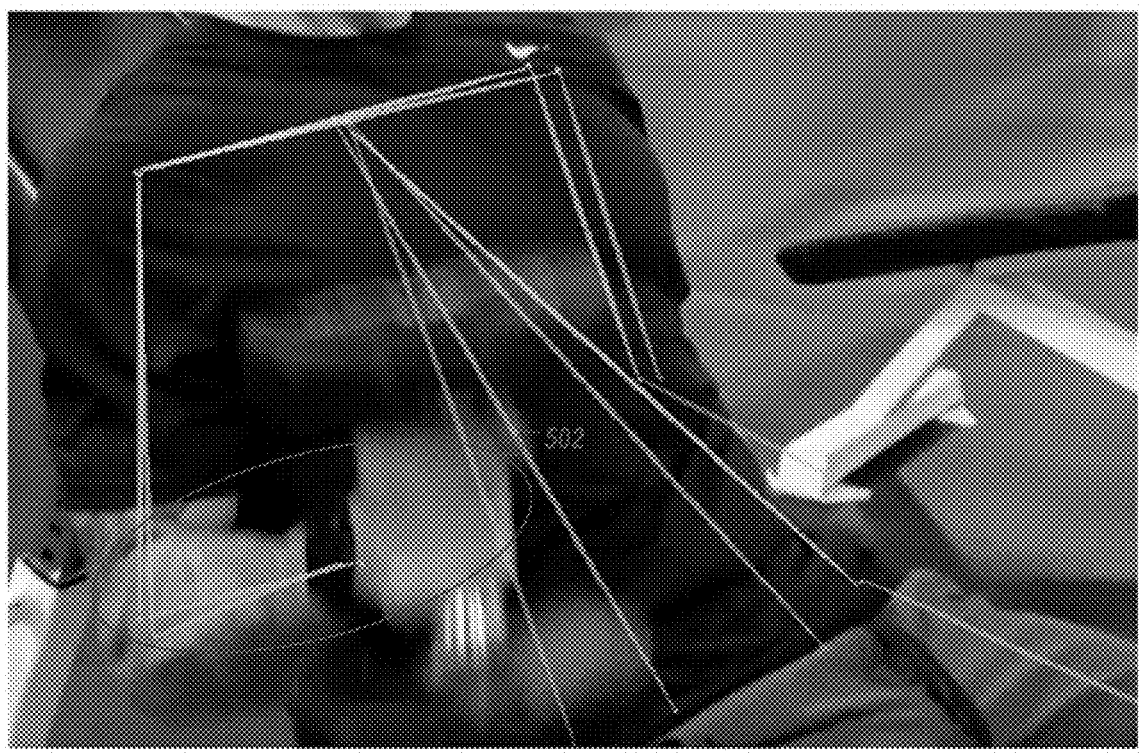
FIGS. 5A-5B each shows examples of motion blur instances in a video data set.
Figure 5B:

FIG. 5A shows the 2D pose estimator can erroneously detect multiple poses from a scene that actually only captures a single, very fast-moving person. In FIG. 5A, strong motion blurs can be seen (see circle region 502) around the arm and torso. Because it can be unclear which pose to track when multiple poses overlap, video pipeline analysis engine 104 can lose track of accurate human motion. Extended periods in a video with such motion blur can lead to errors in keypoint detection that can propagate into the estimated 2D pose and to the subsequent lifted 3D pose estimation. Indeed, errors in 2D and 3D pose estimation can distort the 3D pose calibration by violating the relationship between the 2D poses and lifted 3D poses in the projective space [45B]. The problem of motion blur can be even more prevalent when videos are recorded with hand-held cameras, which can pose further challenges for camera ego-motion estimation. Video pipeline analysis engine 104 can measure camera ego-motion by registering the structural correspondences in the background scene for subsequent frames. However, excessively fast or shaky camera motion, as it is very common in, for example, amateur videos, can generate severe motion blur making pixels in the background blend into one another, thereby losing salient scene structural information. FIG. 5B shows a set of negative effects of strong background motions on the resulting incorrect ego-motion estimates. Motion signal distortions can represent errors that cannot easily be recognized or correctable.

Referring to FIG. 3B, for local joint motions at time t, the scale-invariant joint translation module 344 can measure the scale-invariant translations of joint location, $V_{j_t}$, between subsequent frames for on-body sensor location, $j_t$ and $j_{t+1}$. To evaluate the translation due to body movement, scale-invariant joint translation module 344 can first transform joint coordinates from image pixel coordinates to hip-centered coordinates for each frame, $\bar{J}_t = j_t - o_t$, where of is the hip location at time t. Because the detected scale of a person can change over time due to movements towards or away from the camera, the scale-invariant joint translation module 344 can normalize the joint translation with its bounding box size, $S_t = w_t \times h_t$, where $w_t$ and $h_t$ are width and height of the bounding box in the frame at time t per Equation 8.

$$V_{j_t} = \frac{\|\bar{J}_t - \bar{J}_{t+1}\|_2}{S_t} \quad \text{(Eq. 8)}$$

For global motion measurement, scale-invariant bounding box translation module 346 can track the center location and shape changes of the bounding box over time. For subsequent frames, large translations in the bounding box center can indicate fast motions in the scene space, and a large change in bounding box shape can indicate a fast change in overall pose. For example, bounding box shape and size can have distinctive differences for side and front view, sitting and standing pose, or close and distant person. The translation, $T_{B_t}$, can be calculated by the scale-invariant distance between bounding box centers from subsequent frames, $c_t$ and $c_{t+1}$, normalized by the size of the bounding box, $S_t$, to compensate for the size of a detected person per Equation 9.

$$T_{B_t} = \frac{\|c_t - c_{t+1}\|_2}{S_t} \quad \text{(Eq. 9)}$$

Bounding box IoU changes module 348 can calculate the shape and size change of a bounding box, $T_{B_t}$, through the Intersection over Union (IoU) between bounding box from subsequent frames, $B_t$ and $B_{t+1}$ per Equation 10.

$$J_{B_t} = \frac{|B_t \cap B_{t+1}|}{|B_t \cup B_{t+1}|} \quad \text{(Eq. 10)}$$

Fast foreground motion filtering module 350 can define a tuple of local joint motions, global motion measurement, and change of a bounding box $(V_{j_t}, T_{B_t}, J_{B_t})$ as foreground human motion indicator, which can be tracked for all detected people in a video sequence. Fast foreground motion filtering module 350 can determine the threshold values $(V_{th}, T_{th}, J_{th})$ for acceptable $(V_{j_t}, T_{B_t}, J_{B_t})$ sequences according to the statistics of the training video dataset and target activity classes. Fast foreground motion filtering module 350 can discard frames with extreme values $(V_{j_t} \geq V_{th}, T_{B_t} \geq T_{th}, J_{B_t} \leq J_{th})$. The threshold values should be carefully selected to remove motion blur artifacts or high-frequency noises in pose and bounding box detections and to capture the speed of motions in target activities at the same time. Similar to the occlusion analysis, if the remaining clips in the video are shorter than the sliding window size for the classifier, then the whole video can be discarded.

In alternate embodiments, foreground (human) motion detection operation 324 can employ motion deblurring operation, alone or in combination with the above, to sharpen object boundaries in a video frame, where fast motions were captured, and low frame-rates lead to blurring boundaries. Most contemporary motion deblurring techniques are now based on deep learning methods, e.g., used for generic image restoration tasks [63B, 77B]. Spatio-temporal convolutional neural networks and recurrent neural networks have been used successfully by utilizing both the spatial and temporal information across frames [41B, 113B]. Wang et al. [102B] proposed a pyramidal cascaded network to handle deblurring at multiple resolution scales. Furthermore, Pan et al. [74B] have adopted temporal sharpness priors and optical flow for warping pixels for subsequent frames, which leads to satisfying performance with compact deep learning models.

Background (Camera) Motion Detection (326). In the example shown in FIG. 3B, to perform background (camera) motion detection operation 326, video pipeline analysis engine 104 includes an optical flow estimation module 352, a background motion intensity module 354, and a fast background motion filtering module 356, to ensure that the global body motion estimation includes only the high-quality examples from videos.

Background motion detection operation 326 via modules 352, 354, 356 can select and track the frames with smooth camera motion to avoid erroneous camera motion signals injected into virtual IMU data. Video shots on hand-held cameras can be common on public repositories covering many relevant human activities and can include substantial camera motions, such as shaky frames or quick switches between landscape or portrait views. Within a frame, the region that belongs to humans can be expected to have a high motion signal due to an ongoing activity (which we are interested in capturing). However, for the background region, where typically static objects can be seen, less pixel displacement means smoother camera ego-motion. The optical flow estimation module 352 can detect background regions as those regions that do not include any appearances (bounding boxes) as previously detected in a frame plus the frame boundaries [109B]. Background motion intensity module 354 can then detect frame boundaries as background, and fast background motion filtering module 356 can omit those frames to improve the avoidance of erroneous pose estimations further. Including frame boundaries in the background can further avoid erroneous pose estimations. Keypoint motions detected near the scene boundary are likely to be a body part placed out-of-the-scene, thus not likely to be accurately estimated.

Optical flow can estimate motion descriptions for subsequent frames through pixel displacement information. Specifically, optical flow estimation module 352, e.g., using the optical flow model [57B], can estimate estimates horizontal and vertical pixel displacements, $\vec{o}=(u, v)$, for each pixel. Background motion intensity module 354 can then perform an average L2-norm of pixel displacements in the background, $F_t^{bg}$, to measure the intensity of camera motion at time t per Equation 11.

$$M_t = \frac{1}{N} \sum_{\vec{o} \in F_t^{bg}} \|\vec{o}\|_2 \quad \text{(Eq. 11)}$$

In Equation 11, N is the number of background pixels. From $\mathcal{M} = [M_1, M_2, \ldots, M_T]$, optical flow estimation module 352 can discard entire pose estimations from the frames with excessive background motions.

Figure 5C:
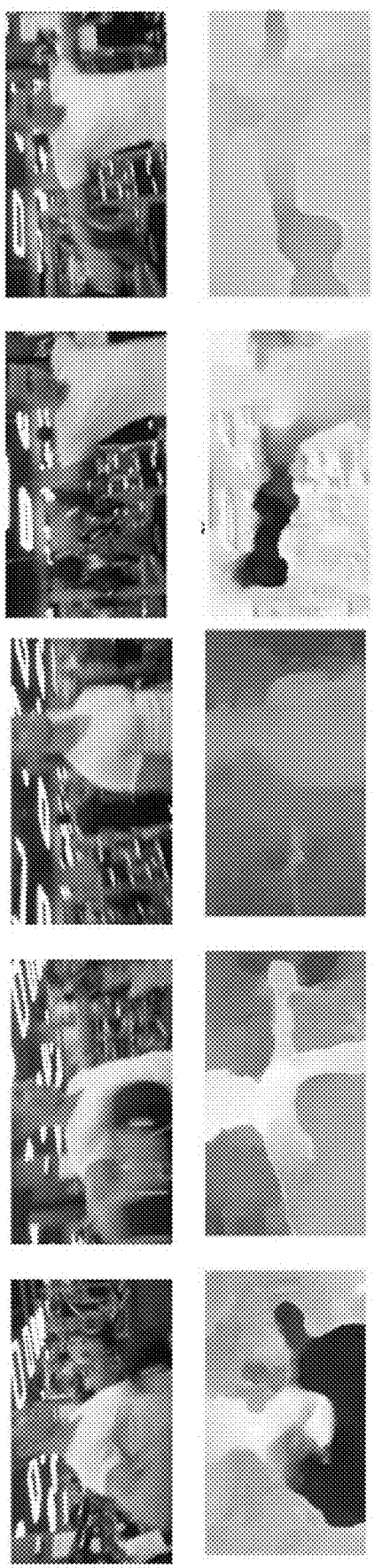
FIG. 5C shows an example implementation of an optical flow and background intensity module configured to detect and exclude frames with motion blur in accordance with an illustrative embodiment.

Subsequently, fast background motion filtering module 356 can discard the frames exhibiting background motion larger than the threshold value, $M_{th} \leq M_t$. Fast background motion filtering module 356 can use the threshold values $M_{th}$ for acceptable background motion sequences according to the statistics of the video dataset and target activity classes. For the activities that are likely to occur, such as gym exercises, low background pixel displacement is expected, such as less than ten pixels. Generally, with a lower threshold, a stationary background scene will be preferred, making camera ego-motion estimation more tractable, thereby improving the motion tracking quality. Yet, this can come with the cost of rejecting the majority of videos. Similar to the foreground motion analysis, finding the appropriate $M_{th}$ for the balance between dataset quantity and quality is beneficial. FIG. 5C shows the optical flow and background intensity, M, for shaky frames. Indeed, it shows a high correlation between the background motion intensity and distortions (sharp changes) in the estimated ego-motion.

3D pose estimation calibration and filtering operation (328)/visual odometry filtering operation (334). In the example in FIG. 3B, video pipeline analysis engine 104 can include 3D pose estimation calibration and filtering operation 328 and/or visual odometry filtering operation 334 to address 3D Pose calibration and camera ego-motion errors, respectively.

After filtering out noisy poses, occluded poses, and fast foreground and background motions, as described above, video pipeline analysis engine 104 can apply 3D pose estimation, calibration [45B], and camera ego-motion estimation for the remaining frames in the pipeline of FIGS. 2A, 2B, 3A to localize the translation and orientation of the 3D pose for each frame. However, even state-of-the-art 3D pose estimation methods, such as Xnect [67B], may produce erroneous results such as flipped joints. Furthermore, the estimated extrinsic camera parameters can represent unrealistic translations or rotations between subsequent frames (e.g., sudden flipping) when the majority of the corresponding 2D and 3D keypoint pairs violate projective relationships [34B]. Consequently, video pipeline analysis engine 104 can adjust erroneous 3D pose calibration results from potentially erroneous 2D and 3D pose estimation.

3D pose estimation calibration and filtering operation 328 can discard frames determined to include unrealistic changes in rotation and translation of estimated 3D joints in a sequence. In particular, 3D pose estimation calibration and filtering operation 328 can measure the orientation trajectory in quaternion representation and find the frames that deviate from the smoothed trajectory obtained through SLERP interpolation [87B]. For translation vectors, 3D pose estimation calibration and filtering operation 328 can use a standard Kalman filter to identify (and eliminate samples with) extreme values. For example, for a gym exercise activity, 3D pose estimation calibration and filtering operation 328 detect outlier poses by interpolating and averaging the pose changes over 0.5-second sequences (considering the speed of the dumbbell exercise) with overlapping sliding windows at each timestep. The sliding window size can be selected to capture target activities without smoothing the motion excessively.

Visual odometry operation 334 can remove potentially erroneous camera ego-motion. When a scene background has a smooth structure, optical flow, and visual odometry models are likely to fail as they largely depend on distinctive scene structural correspondences between the frames [27B, 39B, 100B]. Similar to when filtering out erroneous 3D pose calibrations, visual odometry filtering operation 334 can measure the changes in translation and orientation from the estimated camera ego-motion, e.g., as described in [116B], e.g., by using SLERP [87B] and Kalman filter and discard frames that violate smooth ego-motion transitions. Additionally, visual odometry estimation operation 312 can employ, as the camera ego-motion estimation pipeline, a single end-to-end deep learning network [116B] that is computationally efficient, e.g., described in [21B, 91B]. In alternative embodiments, e.g., as described in relation to FIG. 2B, monocular visual odometry can be used that utilizes a multi-view geometry-based approach [34B] based on camera intrinsic parameter estimation [4B], depth map estimation [26B], and point cloud registration [76B].

EXPERIMENTAL RESULT AND EXAMPLES

As noted above, the exemplary virtual IMU extraction system and method and subsequently trained HAR system and have been evaluated in several studies, (i) a first study that shows proof-of-concept of generating accelerometer data as an example of IMU data from the virtual IMU extraction system at different locations on the body using video data and (ii) a second study that shows the exemplary virtual IMU extraction system and method can generate high-quality virtual IMU data, notably, using weakly labeled video data, for HAR of a number of real-world and practical analysis tasks.

Proof of concept study. The first study performed a series of experiments to evaluate the viability of using an example virtual IMU extraction system 102 to produce virtual IMU data useful for HAR. A video dataset comprising online videos was curated from YouTube to extract virtual IMU data for complex activities. In each experiment, the study compared the performances of models on real IMU data (i.e., the test data is from real IMUs), when trained from real IMUs (R2R), trained from virtual IMUs (V2R), or trained from a mixture of virtual and real (Mix2R) IMU data. Table 1 shows that human activity classifiers trained using virtual IMU data from the virtual IMU extraction system 102 can achieve classifier performance that improves upon classifier trained from real IMU data only. When training purely from virtual IMU data (V2R), it can be observed that the models can recover on average 80% of the R2R performance. Indeed, Table 1 shows that classifiers performance using a mix of both real and virtual IMU data has improved performance to those using only virtual IMU data or real IMU data alone.

TABLE 1

| Model | R2R | V2R | Mix2R |
|---|---|---|---|
| Random Forest | 0.7401 ± 0.0111 | 0.6321 ± 0.122 | 0.7797 ± 0.0105 |
| DeepConvLSTM | 0.7305 ± 0.0073 | 0.5465 ± 0.0082 | 0.7785 ± 0.0068 |

Indeed, the study illustrates that virtual IMU data and real IMU data can be used individually or in combination for the training of HAR system.

Data. The first study used a dataset that covers 15 subjects performing eight locomotion-style activities, including climbing up, climbing down, jumping, lying, running, sitting, standing, and walking. To acquire the real IMU data and video data, each subject performed each of the activities for approximately ten minutes while wearing an IMU sensor, except for jumping (<2 minutes). The videos were recorded using a hand-held device that followed the subject as they performed the activity (e.g., running through the city alongside the subject). The videos do not always present a full-body view of the subject, and the video-taker sometimes made arbitrary changes to the video scene (e.g., he/she might walk past the subject or rotate the camera from landscape to portrait mode halfway). These factors presented extra difficulty in extracting virtual IMU for the full duration of the activities to provide 12 hours of virtual IMU data and 20 hours of available real IMU data. The real and virtual IMU datasets included 221 k and 86 k windows, respectively. In the R2R analysis, the study used IMU data from one subject for validation, another subject for testing, and the rest for training. In the V2R analysis, the study followed the same scheme, except the study used virtual data from subjects 1 to 13 for training. In the Mix2R analysis, the study followed the same scheme but used both real and virtual IMU data.

Method. For the first study, the system employed two machine learning models, Random Forest and DeepConvLSTM [54]. Random forest was trained using ECDF features [25] with 15 components, and DeepConvLSTM was trained on raw data. For DeepConvLSTM, the study trained the model for a maximum of 100 epochs with the Adam optimizer [38], early stopping on the validation set with ten epochs. The study followed standard hyperparameter tuning procedures using grid search on a held-out validation set; learning rate was searched from $10^{-6}$ to $10^{-3}$, and weight decay was searched from $10^{-4}$ to $10^{-3}$. To further regularize the model training, the study additionally employed augmentation techniques from [80] with a probability of application set at either 0 and 0.5 depending on the validation set result. The study evaluated classification performance using mean F1 score with Wilson score interval (95% confidence). All reported F1 scores were an average of three runs initiated with a different random seed. In both cases of DeepConvLSTM and Random Forest, the study reported the highest test F1-score achieved using varying amounts of training data. Complex HAR Scenario Study (Free-Weight Gym Exercises).

A second study was conducted to evaluate complex HAR scenarios in the real-world use of wearable IMUs for HAR deployments. The second study evaluated the overall effectiveness of the virtual IMU extraction system (e.g., 102) as well as individual modules disclosed herein on the performance of the overall system.

Dataset and Experiments. The second study evaluated the classification of free-weight gym activities that are captured with a single, wrist-worn sensor [47B, 48B, 69B, 98B]. Its importance can mainly be attributed to the increasing popularity of smartwatches that represent ideal platforms for capturing relevant movements. Automatic exercise analysis is challenging, mainly because the exercise movements are often very similar to non-exercise-related movements. Furthermore, many exercises can be very similar to each other (i.e., having low inter-class variability) while at the same time exhibiting substantial intra-class variability related to posture and pace changes due to skill level, muscle fatigue, exercise order, or weight change. All of these factors make automated discrimination of the various activities a non-trivial challenge. Previously reported studies showed the difficulty of classifying such subtle differences in limb motions by examining dumbbell exercises (e.g., triceps dumbbell kickback, one-arm dumbbell row, hammer curl, straight-bar bicep curl, etc.) [47B, 48B, 98B].

The study collected 100 videos for each activity from YouTube and manually annotated exercise segments in the video [1B]. The video types ranged from professional instruction videos to amateur videos taken with handheld cameras. To evaluate the virtual IMU dataset extracted using the virtual IMU extraction system (e.g., 102) and subsequently trained HAR system, the study selected 13 dumbbell activity samples from Gym [48] and MyoGym [47] datasets. The Gym and MyoGym datasets cover 36 and 30 different free-weight activities, respectively, with free-hand or gym equipment (e.g., dumbbell, barbell, cable, etc.) recorded with right wrist IMU sensors.

For the experiment setting, the study evaluated target activity recognition using a single wrist-mounted IMU (accelerometer and gyroscope; magnetometer is of limited relevance only in this scenario). To simulate such circumstances, the study utilized a maximum of 60% of the real IMU data that are provided by the individual datasets, which amounts to 23 minutes, 2.5 minutes, and 3.5 minutes per activity for MM-Fit, Gym, and MyoGym, respectively. The study then augmented the training datasets by the automatically generated virtual IMU data, totaling 36 minutes for MM-Fit data and 5 minutes per activity for dumbbell activities. The study used sliding window segmentation as per the evaluation protocols in the original dataset publications: for MM-Fit, windows were 5 seconds long with 2.5 seconds overlap; for Gym, they were 2 seconds long with 0.5 seconds overlap; for MyoGym, the analysis frames were 4 seconds long with 1-second overlap. The study employed the standard Activity Recognition Chain [5B] with ECDF features [30B] and Random Forest classification backends. The study evaluated model performance with mean F1-score and Wilson confidence interval [104]. The study adopted, for the MM-Fit dataset, training, validation, and test split provided by the original MM-Fit dataset. For the Gym dataset, The study used single-session-out cross-validation, as they provide a dataset for two sessions from a single user. For the MyoGym dataset, the study used single-user-out cross-validation for ten users.

For the machine learning evaluation, the study employed, for the noisy pose experiment, the person detection confidence score as 2.8 and joint detection confidence score as 0.74, which was determined through cross-validation on our training video datasets. Other parameters for 2D pose estimation and tracking were set as default parameters from the first study. For occlusion handling, the second study used the binary output (occluded/not occluded) from occlusion detection to discard the occluded poses. The study only accepted those poses, for which the right arm is not occluded. To estimate correct right wrist motion, at least the right arm needs to be visible. More joints, such as a whole upper body, can be optionally included to have a more accurate motion estimation. For foreground motion detection, the study used $V_{th}=0.0006$, $T_{th}=0.0003$, $J_{th}=0.9407$ to cover the 90th percentile of the detected sequences in the collected video dataset. The chosen values were sufficient to capture exercise motions and filter high-frequency noises in pose and bounding box detections simultaneously. For background motion detection, the study used $M_{th}=10$ pixels for removing the frame with excessive motions to keep those frames with as little background motion shaking as possible. For handling 3D pose calibration and camera ego-motion errors, the study removed frames having more than 10 degrees of rotational difference and 0.1 meters of translation difference between original and filtered calibration sequences. It is more likely that a person is exercising in place in a gym.

Ideal condition study. The second study first explored if the virtual IMU extraction system (e.g., 102) and subsequently trained HAR system can be generally applied to free-weight activity classification prior to conducting an in-depth analysis of the system. For the pilot evaluation, the study employed high-quality 3D motion estimation data from ideal video conditions provided by the MM-Fit dataset [90B]. The MM-Fit dataset includes ten exercises with variations in posture levels, including squats, push-ups, sit-ups, and jumping jacks. The dataset consists of activities captured using a variety of sensor modalities, including smartwatches and 3D pose estimation data [64B] that are time-synced with real IMU data. All are recorded in a controlled lab setting. While a single user is performing an exercise, RGB and depth cameras were used to capture the user's motion with the fixed best viewpoint to cover as many keypoints as possible with a simple background, which is the ideal condition for tracking human motion. The virtual IMU dataset extracted from the provided 3D pose estimation data represents an ideal basis for an initial feasibility study for using the exemplary virtual IMU extraction system (e.g., 102) and the subsequently trained HAR system for the free-weight activity classification task.

As a part of the evaluation step, the second study utilized 3D motion estimation data directly provided by the MM-Fit dataset for virtual IMU data extraction and evaluate the trained HAR models on the real IMU test datasets from MM-Fit, Gym, and MyoGym. For the MM-Fit dataset, the study evaluated all 11 different activities. Gym and MyoGym datasets share seven activities with MM-Fit dataset: NULL, Dumbbell Alternate Biceps Curl, Pushups, Overhead Triceps Extension, On-Arm Dumbbell Row, Seated Dumbbell Shoulder Press, and Side Lateral Raise. The model was trained with virtual IMU data from MM-Fit and evaluated for the real IMU data from Gym and MyoGym datasets for seven exercise classes. Before model training, the study calibrated the virtual IMU data for each activity with a real IMU training split, e.g., as described herein in relation to FIGS. 2A, 2B, and 3A. The study also experimented across IMU modalities to explore the effectiveness of our processing pipeline when using either a virtual accelerometer or a gyroscope, or both.

TABLE 2

| | | Training data | | |
|---|---|---|---|---|
| Modality | Dataset | Real IMU | Virtual IMU | Real + Virtual IMU |
| Accelerometer | MM-Fit | 0.5004 ± 0.0016 | 0.5799 ± 0.0016 | 0.6251 ± 0.0015 |
| | Gym | 0.4840 ± 0.0014 | 0.4891 ± 0.0014 | 0.5943 ± 0.0014 |
| | MyoGym | 0.4149 ± 0.0010 | 0.4167 ± 0.0010 | 0.6077 ± 0.0010 |
| Gyroscope | MM-Fit | 0.3611 ± 0.0015 | 0.4580 ± 0.0016 | 0.4332 ± 0.0016 |
| | MyoGym | 0.3235 ± 0.0009 | 0.3911 ± 0.0010 | 0.4598 ± 0.0010 |
| Gyroscope + Accelerometer | MM-Fit | 0.5077 ± 0.0016 | 0.6296 ± 0.0015 | 0.6327 ± 0.0015 |
| | MyoGym | 0.4409 ± 0.0010 | 0.4431 ± 0.0010 | 0.6412 ± 0.0009 |

Table 2 shows the results (mean F1-score) for a classifier using the free-weight activity datasets with different sensor modalities for ideal conditions. MM-Fit was evaluated on a full set of 11 exercise classes, and Gym and MyoGym were evaluated on seven exercises classes shared with the MM-Fit dataset. Indeed, Table 2 shows that across all modality recognition models trained with virtual IMU data can significantly outperform those trained only with real IMU data with 12.8% gains on average. When both real and virtual IMU data were available for model training, the gain increased to 32.3%. This result demonstrates that the exemplary virtual IMU extraction system (e.g., 102) can generate data, namely virtual IMU data, that are meaningful for high-quality motion tracking even when the source and target domains are different (Gym and MyoGym).

Figure 6:
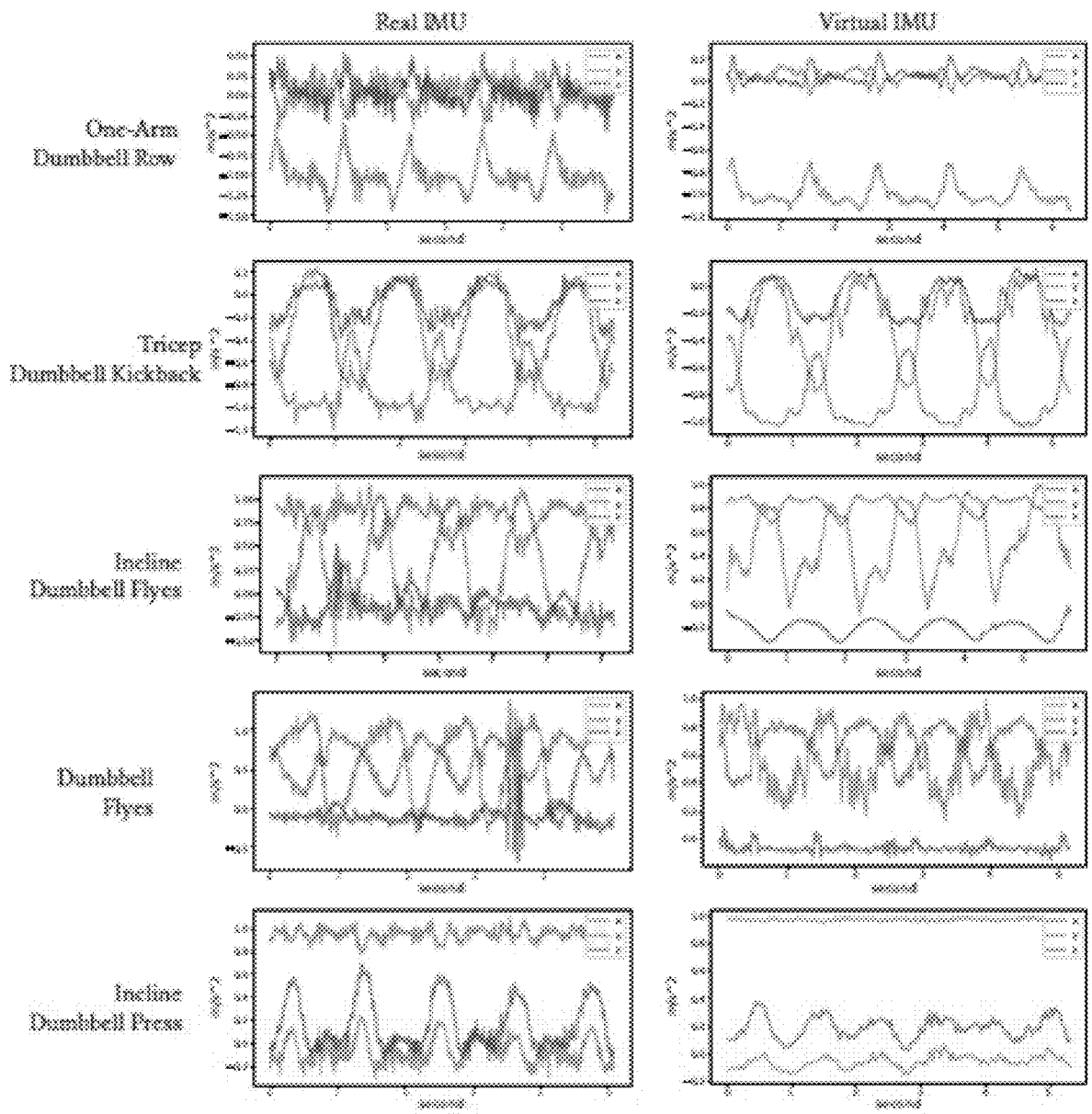
FIG. 6 shows the performance results of a proof-of-concept study of the example human activity recognition (HAR) system of FIG. 1 in accordance with an illustrative embodiment.

Real-world condition. The second study then evaluated the feasibility of using the virtual IMU extraction system (e.g., 102) and subsequently trained HAR system in a real-world scenario with exercise videos retrieved from YouTube. Specifically, the second study evaluated 13 dumbbell activities outlined in Table 3, which were reported to be especially challenging to classify due to only subtle differences in posture and limb motions, regardless of their different effects on muscle groups [47, 48, 98]. FIG. 6 shows the results of some of the generated virtual IMU data for the activity of Table 2 as compared to the real IMU data. The comparison qualitatively shows that the virtual IMU extraction system (e.g., 102) can generate motion signals from video data similar to real IMU data.

TABLE 3

| Name | Muscle Group | Posture | One-arm, both or alternate |
|---|---|---|---|
| One-arm dumbbell row | Middle back | Bent over | One-arm |
| Incline Dumbbell Flyes | Chest | Seated inclined | Both |
| Incline Dumbbell Press | Chest | Seated inclined | Both |
| Dumbbell Flyes | Chest | On back | Both |
| Tricep Dumbbell Kickback | Triceps | Bent Over | One-arm |
| Dumbbell Alternate | Bicep Curl | Biceps Standing | Alternate |
| Incline Hammer Curl | Biceps | Seated inclined | Both |
| Concentration Curl | Biceps | Seated | One-arm |
| Hammer Curl | Biceps | Standing | Alternate |
| Side Lateral Raise | Shoulders | Standing | Both |
| Front Dumbbell Raise | Shoulders | Standing | Alternate |
| Seated Dumbbell Shoulder Press | Shoulders | Seated | Both |
| Lying Rear Delt Raise | Shoulders | On stomach | Both |

Table 4 shows the results (mean F1-score) for a classifier using the free-weight activity datasets with different sensor modalities.

TABLE 4

| Modality | Dataset | Training data | | |
|---|---|---|---|---|
| | | Real IMU | Virtual IMU | Real + Virtual IMU |
| Accelerometer | Gym | 0.6689 ± 0.0029 | 0.5942 ± 0.0031 | 0.7353 ± 0.0028 |
| Accelerometer | MyoGym | 0.5093 ± 0.0027 | 0.5444 ± 0.0027 | 0.6281 ± 0.0026 |
| Gyroscope | MyoGym | 0.3281 ± 0.0025 | 0.3331 ± 0.0025 | 0.3877 ± 0.0026 |
| Gyroscope + Accelerometer | MyoGym | 0.5091 ± 0.0027 | 0.5554 ± 0.0027 | 0.6085 ± 0.0026 |

The second study also evaluated the impact of the various computer vision operations described herein to the overall performance of the trained classifier. Table 5 shows the recognition results (mean F1 score, accelerometer only, Real+Virtual IMU for training) for incrementally adopting the analysis modules for the exemplary virtual IMU extraction system (e.g., 102): noisy pose filtering, occlusion handling, and foreground/background motion handling.

TABLE 5

| Noisy Pose | Occlusion | Foreground | Background | Training data Real IMU Real + Virtual IMU | |
|---|---|---|---|---|---|
| | | | | Gym | MyoGym |
| | | | | 0.6689 ± 0.0029 | 0.5093 ± 0.0027 |
| X | X | X | X | 0.6816 ± 0.0024 | 0.5469 ± 0.0027 |
| ✓ | X | X | X | 0.7131 ± 0.0024 | 0.5631 ± 0.0027 |
| ✓ | ✓ | X | X | 0.7206 ± 0.0024 | 0.5981 ± 0.0026 |
| ✓ | ✓ | ✓ | X | 0.7353 ± 0.0024 | 0.6019 ± 0.0026 |
| ✓ | ✓ | ✓ | ✓ | 0.7475 ± 0.0023 | 0.6282 ± 0.0026 |

In addition, the second study evaluated the use of weakly-labeled virtual IMU data in HAR training in which the weakly-labeled virtual IMU data was generated from weakly-labeled video data. The study also evaluated and compared the performance of the HAR recognition system with varying lengths of video/size of the training virtual IMU data set (generated from virtual IMU extraction system 102) for three different classifiers. In this part of the study, video search queries as target ground-truth labels were used to generate weakly-labeled virtual IMU datasets, whereas from previous parts of the study, manual labels of videos extracted from online video repositories were used. The performance results of HAR system trained from weakly-labeled virtual IMU dataset generated from weakly labeled video data (i.e., in the automated collection and labeling of video data) yields classifier performance with substantial improvements in model performance, showing 0.2+F1 score improvement compared to when only using real IMU dataset for model training. This is significant as the study confirms that available weakly labeled video data and their associated video data, to which there can be 100× more than that of real IMU data, can be extracted/collected and used meaningfully in subsequent HAR training to produce HAR systems with comparable performance to those trained with data from traditional study-based data collection. Indeed, the exemplary virtual IMU extraction system can be used to practically generate virtual IMU dataset with 100× or more in quantity as compared to traditional study-based data collection and labeling approaches.

The exemplary virtual IMU extraction system (e.g., 102) can thus effectively alleviate the problem of small training sets that limits the field of sensor-based human activity recognition. The exemplary HAR system can open up opportunities for entirely different modeling approaches, for example, by introducing much more complex models.

Figure 7:
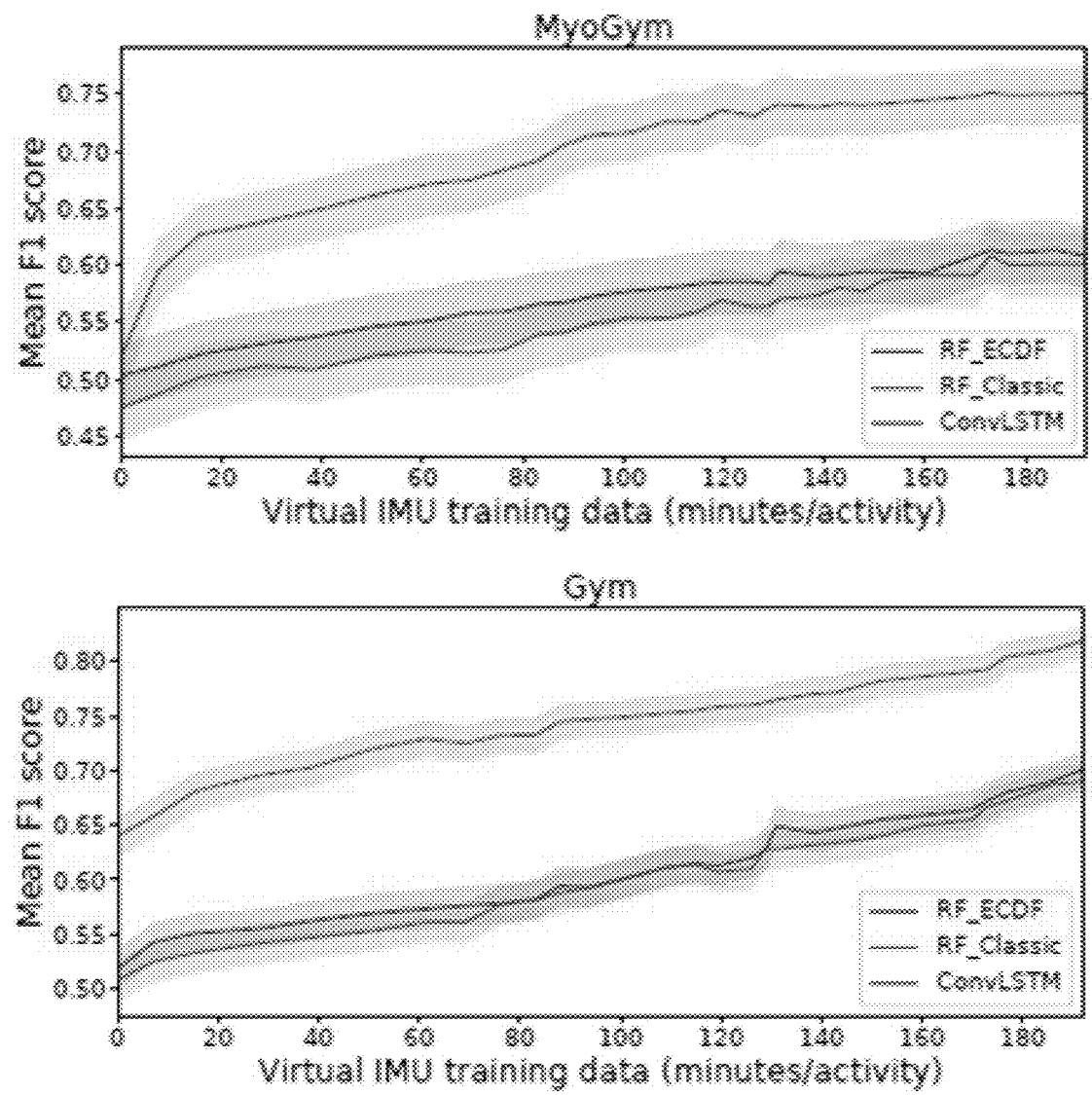
FIG. 7 shows the performance results of a real-world study of the example human activity recognition (HAR) system of FIG. 1 in accordance with an illustrative embodiment.

FIG. 7 specifically shows the mean F1-score performance of the respective three classifiers with varying lengths/size of the training data. Indeed, FIG. 7 shows the classification performance increasing with each longer duration of the training, indicating that the collection of virtual IMU data set can be effectively used as a replacement for most real IMU data collection. The study used ConvLSTM [73], Random Forest with ECDF features [30B], and Random Forest with classical time-series features [10]. Table 5 shows 20 features and their definitions used in the study, which has been used in similar HAR studies [19, 52]. The study implemented this feature extraction using the tsfresh library [10B] and used the provided default hyperparameters.

TABLE 5

| Name | Description |
|---|---|
| Abs energy | $\sum_{t=1}^{T} x_t^2$ |
| Absolute sum of changes | $\sum_{t=1}^{T} |x_{t+1} - x_t|$ |
| Binned entropy | Entropy of the histogram of X |
| C3 | $E[L^2(X) \cdot L(X) \cdot X]$ [86] |
| CID | $\sqrt{\sum_{t=1}^{T-1} (x_t - x_{t-1})^2}$ [2] |
| FFT aggregated | Mean, variance, skewness, kurtosis of the absolute Fourier transform |
| FFT coeffients | Coefficient of discrete Fourier Transform |
| Fourier Entropy | Entropy of the power spectral density of X |
| Kurtosis | Kurtosis of X |
| Maximum | Maximum of X, max(X) |
| Mean | Mean of X, mean(X) = E[X] |
| Mean second derivative central | $\frac{1}{2(T-2)} \sum_{1}^{T-1} \frac{1}{2}(x_{t+2} - 2x_{t+1} + x_t)$ |
| Median | Median of X, median (X) |
| Minimum | Minimum of X, min(X) |
| Number of peaks | Number of peaks in X |
| Skewness | Skewness of X |
| Standard deviation | Standard deviation of X, std(X) |
| Symmetry looking | Boolean variable if \|mean(X) − meian(X)\| < r × (max(X) − min (X)). |
| Variance | Variance of X, var(X) |
| Variation coefficient | std(X)/mean(X) |

Discussion

Human activity recognition. The exemplary virtual IMU extraction system (e.g., 102) can be for any number of HAR applications. On-body sensor-based human activity recognition (HAR) is widely utilized for behavioral analysis, such as user authentication, healthcare, and tracking everyday activities [5, 13, 44, 69, 85]. Its applications include, for example, continuous monitoring of human well-being in everyday life scenarios [1B, 9B, 56B, 85B, 114B]. For this purpose, machine learning (ML) is most often used to segment and classify data streams. These ML models are typically derived through supervised training procedures that often require substantial amounts of labeled sample data. Unlike in other application areas for machine learning methods, such as computer vision or natural language processing, many HAR domains suffer from a severe lack of those annotated training data, which often limits the capabilities of activity recognizers, in contrast to the breakthroughs in other fields, such as speech recognition [30], natural language processing [17], and computer vision [29]. In those domains, it is possible to collect huge amounts of labeled data, the key for deriving robust recognition models that strongly generalize across application boundaries. In contrast, collecting large-scale, labeled data sets has so far been limited in sensor-based human activity recognition. Labeled data in human activity recognition is scarce and hard to come by, as sensor data collection is expensive, and the annotation is time-consuming and sometimes even impossible for privacy or other practical reasons. A model derived from such a sparse dataset is not likely to generalize well. Despite the numerous efforts in improving human activity dataset collection, the scale of typical datasets remains small, thereby only covering limited sets of activities [13, 31, 78, 85]. Even the largest sensor-based activity dataset only spans a few dozen users and relatively short durations [5, 64], which is in stark contrast to the massive datasets in other domains that are often several orders of magnitude larger. For example, Daphnet freezing of gait dataset [5] has 5 hours of sensor data from 10 subjects, and PAMAP2 dataset [64] has 7.5 hours of sensor data from 9 subjects. However, for reference, the "ImageNet" dataset [16] has approximately 14 million images, and the "One billion words" benchmark [14] contains one billion words.

The exemplary virtual IMU extraction system (e.g., 102) and method can alleviate the sparse data problem in sensor-based human activity recognition. In some embodiments, the system is configured to harvest existing video data from large-scale repositories, such as YouTube, and automatically generate data for virtual, body-worn movement sensors (IMUs) that will then be used for deriving sensor-based human activity recognition systems that can be used in real-world settings. Because of the sheer size of common video repositories and the availability of labels in the form of video titles and descriptions, the system can perform more robust and potentially more complex activity recognition models that can be employed in entirely new application scenarios.

In contrast to the generation of virtual IMU data set using the HAR system (e.g., 102), other approaches have proposed the use of freely available online motion capture (Mocap) repositories [51B, 62B]. There, animation-based IMU data are extracted from existing Mocap data and then used for training HAR models [95B, 106B]. Although the online motion capture repositories contain many human motions from diverse people, they are mainly developed for the animation to articulate various poses so that they are limited in capturing diverse activities in the real world. Previous work mainly used animation-based IMU data to pretrain feature learning models. The actual activity classifier was then fine-tuned using the small amount of real IMU data [79B, 106B]. These approaches employ a different technical solution, which does not scale to arbitrary online video.

Other research groups have considered the generation of virtual IMU data. Rey et al. [20B, 83B] also proposed to generate virtual IMU data from videos. Rey et al. used a less sophisticated system that sequenced 2D joint positions to predict individual signals using regressors, either through the norm or through the individual axis. In contrast, the exemplary virtual IMU extraction system (e.g., 102) can directly produce full 9-axis virtual IMU data (accelerometer and gyroscope data, and simulated magnetometer data), providing a more generic pipeline for adapting the virtual IMU dataset that can be applied meaningfully to the training of HAR classifier systems.

It should be appreciated that the logical operations described above and in the appendix can be implemented (1) as a sequence of computer-implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as state operations, acts, or modules. These operations, acts and/or modules can be implemented in software, in firmware, in special purpose digital logic, in hardware, and any combination thereof. It should also be appreciated that more or fewer operations can be performed than shown in the figures and described herein. These operations can also be performed in a different order than those described herein.

A computing device, as referred to herein, may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computing device to provide the functionality of a number of servers that are not directly bound to the number of computers in the computing device. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or maybe hired on an as-needed basis from a third-party provider. Some cloud computing environments may comprise cloud computing resources owned and operated by the enterprise as well as cloud computing resources hired and/or leased from a third-party provider.

In its most basic configuration, a computing device typically includes at least one processing unit and system memory. Depending on the exact configuration and type of computing device, system memory may be volatile (such as random-access memory (RAM)), non-volatile (such as read-only memory (ROM), flash memory, etc.), or some combination of the two. The processing unit may be a standard programmable processor that performs arithmetic and logic operations necessary for the operation of the computing device. As used herein, processing unit and processor refers to a physical hardware device that executes encoded instructions or logic for performing functions on inputs and creating outputs, including, for example, but not limited to, microprocessors (MCUs), microcontrollers, graphical processing units (GPUs), and application-specific circuits (ASICs). Thus, while instructions may be discussed as executed by a processor, the instructions may be executed simultaneously, serially, or otherwise executed by one or multiple processors. The computing device may also include a bus or other communication mechanism for communicating information among various components of the computing device.

The processing unit may be configured to execute program code encoded in tangible, computer-readable media. Tangible, computer-readable media refers to any media that is capable of providing data that causes the computing device (i.e., a machine) to operate in a particular fashion. Various computer-readable media may be utilized to provide instructions to the processing unit for execution. Example tangible, computer-readable media may include, but is not limited to, volatile media, non-volatile media, removable media, and non-removable media implemented in any method or technology for storage of information such as computer-readable instructions, data structures, program modules, or other data. System memory, removable storage, and non-removable storage are all examples of tangible, computer storage media. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

It should be understood that the various techniques described herein may be implemented in connection with hardware or software or, where appropriate, with a combination thereof. Thus, the methods and apparatuses of the presently disclosed subject matter, or certain aspects or portions thereof, may take the form of program code (i.e., instructions) embodied in tangible media, such as diskettes, hard drives, flash drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application programming interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and it may be combined with hardware implementations.

Moreover, the various components may be in communication via wireless and/or hardwire or other desirable and available communication means, systems, and hardware. Moreover, various components and modules may be substituted with other modules or components that provide similar functions.

Although example embodiments of the present disclosure are explained in some instances in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an," and "the" include plural referents unless the context clearly dictates otherwise. Ranges may be expressed herein as from "about" or "5 approximately" one particular value and/or to "about" or "approximately" another particular value. When such a range is expressed, other exemplary embodiments include from the one particular value and/or to the other particular value.

By "comprising" or "containing" or "including" is meant that at least the name compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the present disclosure. Similarly, it is also to be understood that the mention of one or more components in a device or system does not preclude the presence of additional components or intervening components between those components expressly identified.

Some references, which may include various patents, patent applications, and publications, are cited in a reference list and discussed in the disclosure provided herein. The citation and/or discussion of such references is provided merely to clarify the description of the present disclosure and is not an admission that any such reference is "prior art" to any aspects of the present disclosure described herein. In terms of notation, "[n]" corresponds to the nth 10 references in the list. All references cited and discussed in this specification are incorporated herein by reference in their entireties and to the same extent as if each reference was individually incorporated by reference.

The term "about," as used herein, means approximately, in the region of, roughly, or around. When the term "about" is used in conjunction with a numerical range, it modifies that range by extending the boundaries above and below the numerical values set forth. In general, the term "about" is used herein to modify a numerical value above and below the stated value by a variance of 10%. In one aspect, the term "about" means plus or minus 10% of the numerical value of the number with which it is being used. Therefore, about 50% means in the range of 45%-55%. Numerical ranges recited herein by endpoints include all numbers and fractions subsumed within that range (e.g., 1 to 5 includes 1, 1.5, 2, 2.75, 3, 3.90, 4, 4.24, and 5).

Similarly, numerical ranges recited herein by endpoints include subranges subsumed within that range (e.g., 1 to 5 includes 1-1.5, 1.5-2, 2-2.75, 2.75-3, 3-3.90, 3.90-4, 4-4.24, 4.24-5, 2-5, 3-5, 1-4, and 2-4). It is also to be understood that all numbers and fractions thereof are presumed to be modified by the term "about."

The following patents, applications, and publications as listed below and throughout this document are hereby incorporated by reference in their entirety herein.

First Set of References

[1] Carnegie Mellon Motion Capture Database. Retrieved Apr. 25, 2020 from http://mocap.cs.cmu.edu/
[2] T. Alldieck, M. Magnor, B. Bhatnagar, C. Theobalt, and G. Pons-Moll. 2019. Learning to reconstruct people in clothing from a single RGB camera. In Proceedings of the IEEE Conference on Computer Vision and Pattern Recognition. 1175-1186.
[3] M. Andriluka, L. Pishchulin, P. Gehler, and B. Schiele. 2014. 2D Human Pose Estimation: New Benchmark and State of the Art Analysis. In IEEE Conference on Computer Vision and Pattern Recognition (CVPR).
[4] P. Asare, R. Dickerson, X. Wu, J. Lach, and J. Stankovic. 2013. BodySim: A Multi-Domain Modeling and Simulation Framework for Body Sensor Networks Research and Design. ICST.
[5] M. Bächlin, M. Plotnik, and G. Tröster. 2010. Wearable assistant for Parkinson's disease patients with the freezing of gait symptom. IEEE Trans. Inf. Technol. Biomed. 14, 2 (2010), 436-446.
[6] P. J. Besl and N. McKay. 1992. A method for registration of 3-D shapes. IEEE Transactions on Pattern Analysis and Machine Intelligence 14, 2 (feb 1992), 239-256.
[7] A. Bewley, Z. Ge, L. Ott, F. Ramos, and B. Uperoft. 2016. Simple online and realtime tracking. In 2016 IEEE International Conference on Image Processing (ICIP). 3464-3468.
[8] O. Bogdan, V. Eckstein, F. Rameau, and J. Bazin. 2018. DeepCalib: a deep learning approach for automatic intrinsic calibration of wide field-of-view cameras. In Proceedings of the 15th ACM SIGGRAPH European Conference on Visual Media Production, CVMP 2018, London, United Kingdom, Dec. 13-14, 2018. ACM, 6:1-6:10.
[9] F. Caba Heilbron, V. Escorcia, B. Ghanem, and J. Carlos Niebles. 2015. Activitynet: A large-scale video benchmark for human activity understanding. In Proceedings of the ieee conference on computer vision and pattern recognition. 961-970.
[10] Z. Cao, T. Simon, S. Wei, and Y. Sheikh. 2017. Realtime multi-person 2d pose estimation using part affinity fields. In Proceedings of the IEEE Conference on Computer Vision and Pattern Recognition. 7291-7299.
[11] B. Caprile and V. Torre. 1990. Using vanishing points for camera calibration. International Journal of Computer Vision 4, 2 (mar 1990), 127-139.
[12] J. Carreira, E. Noland, C. Hillier, and A. Zisserman. 2019. A short note on the kinetics-700 human action dataset. arXiv preprintarXiv:1907.06987 (2019).
[13] R. Chavarriaga, H. Sagha, and D. Roggen. 2013. The Opportunity challenge: A benchmark database for on-body sensor-based activity recognition. Pattern Recognit. Lett. 34, 15 (2013), 2033-2042.
[14] C. Chelba, T. Mikolov, M. Schuster, Q. Ge, T. Brants, P. Koehn, and T. Robinson. 2013. One-billion-word benchmark for measuring progress in statistical language modeling. arXiv preprint arXiv:1312.3005 (2013).
[15] W. Conover and R. Iman. 1981. Rank transformations as a bridge between parametric and nonparametric statistics. The American Statistician 35, 3 (1981), 124-129.
[16] J. Deng, W. Dong, R. Socher, L. Li, K. Li, and L. Fei-Fei. 2009. Imagenet: A large-scale hierarchical image database. In 2009 IEEE conference on computer vision and pattern recognition. Ieee, 248-255.
[17] J. Devlin, M. Chang, K. Lee, and K. Toutanova. 2018. Bert: Pre-training of deep bidirectional transformers for language understanding. arXiv preprint arXiv: 1810.04805 (2018).
[18] Hassan Ismail Fawaz, Germain Forestier, Jonathan Weber, Lhassane Idoumghar, and Pierre-Alain Muller. 2018. Data augmentation using synthetic data for time series classification with deep residual networks. arXiv preprint arXiv:1808.02455 (2018).
[19] Siwei Feng and Marco F Duarte. 2019. Few-shot learning-based human activity recognition. Expert Systems with Applications 138 (2019), 112782.
[20] Alberto Fernandez, Salvador Garcia, Francisco Herrera, and Nitesh V Chawla. 2018. SMOTE for learning from imbalanced data: progress and challenges, marking the 15-year anniversary. Journal of artificial intelligence research 61 (2018), 863-905.
[21] I. Goodfellow, J. Pouget-Abadie, M. Mirza, B. Xu, D. Warde-Farley, S. Ozair, A. Courville, and Y. Bengio. 2014. Generative adversarial nets. In Advances in neural information processing systems. 2672-2680.
[22] A. Gordon, H. Li, R. Jonschkowski, and A. Angelova. 2019. Depth From Videos in the Wild: Unsupervised Monocular Depth Learning From Unknown Cameras. In 2019 IEEE/CVF International Conference on Computer Vision (ICCV). IEEE.
[23] C. Gu, C. Sun, D. Ross, C. Vondrick, C. Pantofaru, Y. Li, S. Vijayanarasimhan, G. Toderici, S. Ricco, R. Sukthankar, C. Schmid, and J. Malik. 2018. Ava: A video dataset of spatio-temporally localized atomic visual actions. In Proceedings of the IEEE Conference on Computer Vision and Pattern Recognition. 6047-6056.
[24] Yu Guan and Thomas Plotz. 2017. Ensembles of deep lstm learners for activity recognition using wearables. Proceedings of the ACM on Interactive, Mobile, Wearable and Ubiquitous Technologies 1, 2 (2017), 1-28.
[25] N. Hammerla, R. Kirkham, P. Andras, and T. Ploetz. 2013. On preserving statistical characteristics of accelerometry data using their empirical cumulative distribution. In Proceedings of the 2013 international symposium on wearable computers. 65-68.
[26] N. Y. Hammerla, S. Halloran, and T. Plötz. 2016. Deep, convolutional, and recurrent models for human activity recognition using wearables. In IJCAI. AAAI Press, 1533-1540.
[27] Shota Haradal, Hideaki Hayashi, and Seiichi Uchida. 2018. Biosignal data augmentation based on generative adversarial networks. In 201840th Annual International Conference of the IEEE Engineering in Medicine and Biology Society (EMBC). IEEE, 368-371.
[28] H. Haresamudram, D. Anderson, and T. Plotz. 2019. On the role of features in human activity recognition. In Proceedings of the $23^{rd}$ International Symposium on Wearable Computers. 78-88.
[29] K. He, X. Zhang, S. Ren, and J. Sun. 2016. Deep residual learning for image recognition. In Proceedings of the IEEE conference on computer vision and pattern recognition. 770-778.
[30] Geoffrey Hinton, Li Deng, Dong Yu, George E Dahl, Abdel-rahman Mohamed, Navdeep Jaitly, Andrew Senior, Vincent Vanhoucke, Patrick Nguyen, Tara N Sainath, et al. 2012. Deep neural networks for acoustic modeling in speech recognition: The shared views of four research groups. IEEE Signal processing magazine 29, 6 (2012), 82-97.

[31] K. Hovsepian, M. Al'Absi, E. Ertin, T. Kamarck, M. Nakajima, and S. Kumar. 2015. cStress: towards a gold standard for continuous stress assessment in the mobile environment. In Proceedings of the 2015 ACM international joint conference on pervasive and ubiquitous computing. 493-504.

[32] Sergey Ioffe and Christian Szegedy. 2015. Batch normalization: Accelerating deep network training by reducing internal covariate shift. arXiv preprint arXiv:1502.03167 (2015).

[33] I. Joel, A. and Stergios. 2011. A Direct Least-Squares (DLS) method for PnP. In 2011 International Conference on Computer Vision. IEEE.

[34] A. Kanazawa, M. Black, D. Jacobs, and J. Malik. 2018. End-to-end recovery of human shape and pose. In Proceedings of the IEEE Conference on Computer Vision and Pattern Recognition. 7122-7131.

[35] C. Kang, H. Jung, and Y. Lee. 2019. Towards Machine Learning with Zero Real-World Data. In The 5th ACM Workshop on Wearable Systems and Applications. 41-46.

[36] S. Kang, H. Choi, H. Park, B. Choi, H. Im, D. Shin, Y. Jung, J. Lee, H. Park, S. Park, and J. Roh. 2017. The development of an IMU integrated clothes for postural monitoring using conductive yarn and interconnecting technology. Sensors 17, 11 (2017), 2560.

[37] P. Karlsson, B. Lo, and G. Z. Yang. 2014. Inertial sensing simulations using modified motion capture data. In Proceedings of the $11^{th}$ International Conference on Wearable and Implantable Body Sensor Networks (BSN 2014), ETH Zurich, Switzerland. 16-19.

[38] Diederik P Kingma and Jimmy Ba. 2014. Adam: A method for stochastic optimization. arXiv preprint arXiv:1412.6980 (2014).

[39] H. Kuehne, H. Jhuang, E. Garrote, T. Poggio, and T. Serre. 2011. HMDB: a large video database for human motion recognition. In 2011 International Conference on Computer Vision. IEEE, 2556-2563.

[40] Nicholas D. Lane, Ye Xu, Hong Lu, Shaohan Hu, Tanzeem Choudhury, Andrew T. Campbell, and Feng Zhao. 2011. Enabling Large-Scale Human Activity Inference on Smartphones Using Community Similarity Networks (Csn). In Proceedings of the 13th International Conference on Ubiquitous Computing (Beijing, China) (UbiComp âĂŹ11). Association for Computing Machinery, New York, N.Y., USA, 355âĂŞ364. https://doi.org/10.1145/2030112.2030160

[41] G. Laput and C. Harrison. 2019. Sensing Fine-Grained Hand Activity with Smartwatches. In Proceedings of the 2019 CHI Conference on Human Factors in Computing Systems. 1-13.

[42] Arthur Le Guennec, Simon Malinowski, and Romain Tavenard. 2016. Data augmentation for time series classification using convolutional neural networks.

[43] W. Li, Z. Zhang, and Z. Liu. 2010. Action recognition based on a bag of 3D points. In 2010 IEEE Computer Society Conference on Computer Vision and Pattern Recognition—Workshops. 9-14.

[44] D. Liaqat, M. Abdalla, Pegah Abed-Esfahani, Moshe Gabel, Tatiana Son, Robert Wu, Andrea Gershon, Frank Rudzicz, and Eyal De Lara. 2019. WearBreathing: Real World Respiratory Rate Monitoring Using Smartwatches. Proceedings of the ACM on Interactive, Mobile, Wearable and Ubiquitous Technologies 3, 2 (2019), 1-22.

[45] J. Liu, A. Shahroudy, M. Perez, G. Wang, L. Duan, and A. Kot. 2019. NTU RGB+D 120: A Large-Scale Benchmark for 3D Human Activity Understanding. IEEE Transactions on Pattern Analysis and Machine Intelligence (2019). https://doi.org/10.1109/TPAMI.2019.2916873

[46] M. Loper, N. Mahmood, J. Romero, G. Pons-Moll, and M. Black. 2015. SMPL: A skinned multi-person linear model. ACM transactions on graphics (TOG) 34, 6 (2015), 1-16.

[47] N. Mahmood, N. Ghorbani, N. Troje, G. Pons-Moll, and M. Black. 2019. AMASS: Archive of motion capture as surface shapes. In Proceedings of the IEEE International Conference on Computer Vision. 5442-5451.

[48] Akhil Mathur, Tianlin Zhang, Sourav Bhattacharya, Petar Velickovic, Leonid Joffe, Nicholas D Lane, Fahim Kawsar, and Pietro Lió. 2018. Using deep data augmentation training to address software and hardware heterogeneities in wearable and smartphone sensing devices. In 201817th ACM/IEEE International Conference on Information Processing in Sensor Networks (IPSN). IEEE, 200-211.

[49] A. Muhammad Sayem, S. Hon Teay, H. Shahariar, P. Fink, and A. Albarbar. 2020. Review on Smart Electro-Clothing Systems (SeCSs). Sensors 20, 3 (2020), 587.

[50] Vinod Nair and Geoffrey E Hinton. 2010. Rectified linear units improve restricted boltzmann machines. In Proceedings of the $27^{th}$ international conference on machine learning (ICML-10). 807-814.

[51] Augustus Odena, Vincent Dumoulin, and Chris Olah. 2016. Deconvolution and checkerboard artifacts. Distill 1, 10 (2016), e3. [52] F. Ofli, R. Chaudhry, G. Kurillo, R. Vidal, and R. Bajcsy. 2013. Berkeley mhad: A comprehensive multimodal human action database. In 2013 IEEE Workshop on Applications of Computer Vision (WACV). IEEE, 53-60.

[53] A. Oord, S. Dieleman, H. Zen, K. Simonyan, O. Vinyals, A. Graves, N. Kalchbrenner, A. Senior, and K. Kavukcuoglu. 2016. Wavenet: A generative model for raw audio. arXiv preprint arXiv:1609.03499 (2016).

[54] F. J. Ordóñez and D. Roggen. 2016. Deep convolutional and lstm recurrent neural networks for multimodal wearable activity recognition. Sensors 16, 1 (2016), 115.

[55] J. Park, Q. Zhou, and V. Koltun. 2017. Colored Point Cloud Registration Revisited. In 2017 IEEE International Conference on Computer Vision (ICCV). 143-152.

[56] D. Pavllo, C. Feichtenhofer, D. Grangier, and M. Auli. 2019. 3D human pose estimation in video with temporal convolutions and semi-supervised training. In Proceedings of the IEEE Conference on Computer Vision and Pattern Recognition. 7753-7762.

[57] T. Pham and Y. Suh. 2018. Spline Function Simulation Data Generation for Walking Motion Using Foot-Mounted Inertial Sensors. In Sensors. Electronics, 199-210.

[58] T. Plotz, C. Chen, N. Hammerla, and G. Abowd. 2012. Automatic synchronization of wearable sensors and video-cameras for ground truth annotation—a practical approach. In 2012 16th international symposium on wearable computers. IEEE, 100-103.

[59] F. Pomerleau, F. Colas, and R. Siegwart. 2015. A Review of Point Cloud Registration Algorithms for Mobile Robotics. Found. Trends Robot 4, 1 (May 2015), 1âĂŞ104.

[60] G. Pons-Moll, S. Pujades, S. Hu, and M. Black. 2017. ClothCap: Seamless 4D clothing capture and retargeting. ACM Transactions on Graphics (TOG) 36, 4 (2017), 1-15.

[61] G. Pons-Moll, J. Romero, N. Mahmood, and M>Black. 2015. Dyna: A model of dynamic human shape in motion. ACM Transactions on Graphics (TOG) 34, 4 (2015), 1-14.

[62] Giorgia Ramponi, Pavlos Protopapas, Marco Brambilla, and Ryan Janssen. 2018. T-cgan: Conditional generative adversarial network for data augmentation in noisy time series with irregular sampling. arXiv preprint arXiv:1811.08295 (2018).

[63] Khandakar M Rashid and Joseph Louis. 2019. Timeseries data augmentation and deep learning for construction equipment activity recognition. Advanced Engineering Informatics 42 (2019), 100944.

[64] A. Reiss and D. Stricker. 2012. Introducing a new benchmarked dataset for activity monitoring. In 201216th International Symposium on Wearable Computers. IEEE, 108-109.

[65] A. Reiss and D. Stricker. 2013. Personalized mobile physical activity recognition. In Proceedings of the 2013 international symposium on wearable computers. 25-28.

[66] M. Rosca, B. Lakshminarayanan, and S. Mohamed. 2018. Distribution matching in variational inference. arXiv preprint arXiv:1802.06847 (2018).

[67] S. Rusinkiewicz and M. Levoy. [n.d.]. Efficient variants of the ICP algorithm. In Proceedings Third International Conference on 3-D Digital Imaging and Modeling. IEEE Comput. Soc.

[68] Aaqib Saeed, Tanir Ozcelebi, and Johan Lukkien. 2019. Multi-task Self-Supervised Learning for Human Activity Detection. Proceedings of the ACM on Interactive, Mobile, Wearable and Ubiquitous Technologies 3, 2 (2019), 1-30.

[69] P. M. Scholl, M. Wille, and K. Van Laerhoven. 2015. Wearables in the wet lab: a laboratory system for capturing and guiding experiments. In Ubicomp. ACM, 589-599.

[70] S. Shah and J. K. Aggarwal. 1996. Intrinsic parameter calibration procedure for a (high-distortion) fish-eye lens camera with distortion model and accuracy estimation. Pattern Recognition 29, 11 (nov 1996), 1775-1788.

[71] Z. Shen, W. Wang, X. Lu, J. Shen, H. Ling, T. Xu, and L. Shao. 2019. Human-Aware Motion Deblurring. In Proceedings of the IEEE International Conference on Computer Vision. 5572-5581.

[72] Connor Shorten and Taghi M Khoshgoftaar. 2019. A survey on image data augmentation for deep learning. Journal of Big Data 6, 1 (2019), 60.

[73] G. Sigurdsson, G. Varol, X. Wang, I. Laptev, A. Farhadi, and A. Gupta. 2016. Hollywood in Homes: Crowdsourcing Data Collection for Activity Understanding. ArXiv e-prints (2016). arXiv:1604.01753 http://arxiv.org/abs/1604.01753

[74] K. Soomro, A. Zamir, and M. Shah. 2012. UCF101: A dataset of 101 human actions classes from videos in the wild. arXiv preprint arXiv:1212.0402 (2012).

[75] Odongo Steven Eyobu and Dong Seog Han. 2018. Feature representation and data augmentation for human activity classification based on wearable IMU sensor data using a deep LSTM neural network. Sensors 18, 9 (2018), 2892.

[76] T. Sztyler and H. Stuckenschmidt. 2016. On-body localization of wearable devices: An investigation of position-aware activity recognition. In 2016 IEEE International Conference on Pervasive Computing and Communications (PerCom). IEEE, 1-9.

[77] S. Takeda, T. Okita, P. Lago, and S. Inoue. 2018. A multi-sensor setting activity recognition simulation tool. In Proceedings of the 2018 ACM International Joint Conference and 2018 International Symposium on Pervasive and Ubiquitous Computing and Wearable Computers. 1444-1448.

[78] E. Thomaz, I. Essa, and G. Abowd. 2015. A practical approach for recognizing eating moments with wrist-mounted inertial sensing. In Proceedings of the 2015 ACM International Joint Conference on Pervasive and Ubiquitous Computing. 1029-1040.

[79] Matt Trumble, Andrew Gilbert, Charles Malleson, Adrian Hilton, and John Collomosse. 2017. Total Capture: 3D Human Pose Estimation Fusing Video and Inertial Sensors. In 2017 British Machine Vision Conference (BMVC).

[80] Terry T Um, Franz M J Pfister, Daniel Pichler, Satoshi Endo, Muriel Lang, Sandra Hirche, Urban Fietzek, and Dana Kulie. 2017. Data augmentation of wearable sensor data for parkinsonâĂŹs disease monitoring using convolutional neural networks. In Proceedings of the 19th ACM International Conference on Multimodal Interaction. 216-220.

[81] F. Xiao, L. Pei, L. Chu, D. Zou, W. Yu, Y. Zhu, and T. Li. 2020. A Deep Learning Method for Complex Human Activity Recognition Using Virtual Wearable Sensors. arXiv preprint arXiv:2003.01874 (2020).

[82] Jason Yosinski, Jeff Clune, Yoshua Bengio, and Hod Lipson. 2014. How transferable are features in deep neural networks?. In Advances in neural information processing systems. 3320-3328.

[83] A. Young, M. Ling, and D. Arvind. 2011. IMUSim: A simulation environment for inertial sensing algorithm design and evaluation. In Proceedings of the 10th International Conference on Information Processing in Sensor Networks, IPSN 2011, Apr. 12-14, 2011, Chicago, Ill., USA. IEEE, 199-210.

[84] J. Yu and R. Ramamoorthi. 2019. Robust Video Stabilization by Optimization in CNN Weight Space. In Proceedings of the IEEE Conference on Computer Vision and Pattern Recognition. 3800-3808.

[85] M. Zhang and A. A. Sawchuk. 2012. USC-HAD: a daily activity dataset for ubiquitous activity recognition using wearable sensors. In Ubicomp.

[86] Q. Zhang and R. Pless. [n.d.]. Extrinsic calibration of a camera and laser range finder (improves camera calibration). In 2004 IEEE/RSJ International Conference on Intelligent Robots and Systems (IROS) (IEEE Cat. No. 04CH37566). IEEE.

[87] Z. Zhao, Y. Chen, J. Liu, Z. Shen, and M. Liu. 2011. Cross-people mobile-phone based activity recognition. In Twenty-second international joint conference on artificial intelligence.

[88] T. Zhou, M. Brown, Noah S., and D. Lowe. 2017. Unsupervised learning of depth and ego-motion from video. In Proceedings of the IEEE Conference on Computer Vision and Pattern Recognition. 1851-1858.

[89] H. Zhuang. 1995. A self-calibration approach to extrinsic parameter estimation of stereo cameras. Robotics and Autonomous Systems 15, 3 (August 1995), 189-197.

Second Set of References

[1B] M. Bachlin, M. Plotnik, and G. Tröster. 2010. Wearable assistant for Parkinson's disease patients with the freezing of gait symptom. IEEE Trans. Inf. Technol. Biomed. 14, 2 (2010), 436-446.

[2B] G. Batista, E. J. Keogh, O. M. Tataw, and V. De Souza. 2014. CID: an efficient complexity-invariant distance for time series. Data Mining and Knowledge Discovery 28, 3 (2014), 634-669.

[3B] A. Bewley, Z. Ge, L. Ott, F. Ramos, and B. Uperoft. 2016. Simple online and realtime tracking. In IEEE International Conference on Image Processing (ICIP). 3464-3468.

[4B] O. Bogdan, V. Eckstein, F. Rameau, and J. Bazin. 2018. DeepCalib: a deep learning approach for automatic intrinsic calibration of wide field-of-view cameras. In Proceedings of the ACM SIGGRAPH European Conference on Visual Media Production. ACM, 6:1-6:10.

[5B] A. Bulling, U. Blanke, and B. Schiele. 2014. A tutorial on human activity recognition using body-worn inertial sensors. ACM CSUR 46, 3 (2014), 33.

[6B] Z. Cao, G. Hidalgo Martinez, T. Simon, S. Wei, and Y. A. Sheikh. 2019. OpenPose: Realtime Multi-Person 2D Pose Estimation using Part Affinity Fields. IEEE Transactions on Pattern Analysis and Machine Intelligence (2019).

[7B] J. Carreira, P. Agrawal, K. Fragkiadaki, and J. Malik. 2016. Human pose estimation with iterative error feedback. In Proceedings of the IEEE conference on computer vision and pattern recognition. 4733-4742.

[8B] Larry Chan, Vedant Das Swain, Christina Kelley, Kaya de Barbaro, Gregory D. Abowd, and Lauren Wilcox. 2018. Students' Experiences with Ecological Momentary Assessment Tools to Report on Emotional Well-Being. IMWUT 2,1, Article 3 (March 2018), 20 pages.

[9B] R. Chavarriaga, H. Sagha, and D. Roggen. 2013. The Opportunity challenge: A benchmark database for on-body sensor-based activity recognition. Pattern Recognition Letter 34, 15 (2013), 2033-2042.

[10B] M. Christ, A. W. Kempa-Liehr, and M. Feindt. 2016. Distributed and parallel time series feature extraction for industrial big data applications. https://tsfresh.readthedocs.io. arXiv preprint arXiv:1610.07717 (2016).

[11B] Blender Online Community. 2018. Blender—a 3D modelling and rendering package. Blender Foundation, Stichting Blender Foundation, Amsterdam. http://www.blender.org

[12B] W. Conover and R. Iman. 1981. Rank transformations as a bridge between parametric and nonparametric statistics. The American Statistician 35, 3 (1981), 124-129.

[13B] S. Consolvo and M. Walker. 2003. Using the experience sampling method to evaluate ubicomp applications. IEEE Pervasive Computing 2, 2 (2003), 24-31. https://doi.org/10.1109/MPRV.2003.1203750

[14B] Jifeng Dai, Kaiming He, Yi Li, Shaoqing Ren, and Jian Sun. 2016. Instance-sensitive fully convolutional networks. In European Conference on Computer Vision. Springer, 534-549.

[15B] Jifeng Dai, Kaiming He, and Jian Sun. 2015. Convolutional feature masking for joint object and stuff segmentation. In Proceedings of the IEEE conference on computer vision and pattern recognition. 3992-4000.

[16B] Alexey Dosovitskiy, Philipp Fischer, Eddy Ilg, Philip Hausser, Caner Hazirbas, Vladimir Golkov, Patrick Van Der Smagt, Daniel Cremers, and Thomas Brox. 2015. Flownet: Learning optical flow with convolutional networks. In Proceedings of the IEEE international conference on computer vision. 2758-2766.

[17B] Hao-Shu Fang, Shuqin Xie, Yu-Wing Tai, and Cewu Lu. 2017. RMPE: Regional Multi-person Pose Estimation. In ICCV.

[18B] H. Fawaz, G. Forestier, J. Weber, L. Idoumghar, and P. Muller. 2018. Data augmentation using synthetic data for time series classification with deep residual networks. arXiv preprint arXiv:1808.02455 (2018).

[19B] D. Figo, P. C. Diniz, D. R. Ferreira, and J. M. Cardoso. 2010. Preprocessing techniques for context recognition from accelerometer data. Pers. Ubiquitous Comput. 14, 7 (2010), 645-662.

[20B] Vitor Fortes Rey, Kamalveer Kaur Garewal, and Paul Lukowicz. 2020. Yet it moves: Learning from Generic Motions to Generate IMU data from YouTube videos. arXiv e-prints (2020), arXiv-2011.

[21B] Andreas Geiger, Philip Lenz, and Raquel Urtasun. 2012. Are we ready for Autonomous Driving? The KITTI Vision Benchmark Suite. In Conference on Computer Vision and Pattern Recognition (CVPR).

[22B] Ross Girshick, Forrest Iandola, Trevor Darrell, and Jitendra Malik. 2015. Deformable part models are convolutional neural networks. In Proceedings of the IEEE conference on Computer Vision and Pattern Recognition. 437-446.

[23B] Ke Gong, Yiming Gao, Xiaodan Liang, Xiaohui Shen, Meng Wang, and Liang Lin. 2019. Graphonomy: Universal human parsing via graph transfer learning. In Proceedings of the IEEE/CVF Conference on Computer Vision and Pattern Recognition. 7450-7459.

[24B] Ke Gong, Xiaodan Liang, Yicheng Li, Yimin Chen, Ming Yang, and Liang Lin. 2018. Instance-level human parsing via part grouping network. In Proceedings of the European Conference on Computer Vision (ECCV). 770-785.

[25B] I. Goodfellow, J. Pouget-Abadie, M. Mirza, B. Xu, D. Warde-Farley, S. Ozair, A. Courville, and Y. Bengio. 2014. Generative adversaria networks. arXiv preprint arXiv:1406.2661 (2014).

[26B] A. Gordon, H. Li, R. Jonschkowski, and A. Angelova. 2019. Depth From Videos in the Wild: Unsupervised Monocular Depth Learning From Unknown Cameras. In IEEE International Conference on Computer Vision (ICCV). IEEE.

[27B] Tobias Gruber, Mario Bijelic, Felix Heide, Werner Ritter, and Klaus Dietmayer. 2019. Pixel-accurate depth evaluation in realistic driving scenarios. In 2019 International Conference on 3D Vision (3DV). IEEE, 95-105.

[28B] Shuosen Guan, Haoxin Li, and Wei-Shi Zheng. 2019. Unsupervised learning for optical flow estimation using pyramid convolution lstm. In 2019 IEEE International Conference on Multimedia and Expo (ICME). IEEE, 181-186.

[29B] John K Haas. 2014. A history of the unity game engine. (2014).

[30B] N. Hammerla, R. Kirkham, P. Andras, and T. Ploetz. 2013. On preserving statistical characteristics of accelerometry data using their empirical cumulative distribution. In Proceedings of the ACM International Symposium on Wearable Computers. 65-68.

[31B] S. Haradal, H. Hayashi, and S. Uchida. 2018. Biosignal data augmentation based on generative adversarial networks. In Annual International Conference of the IEEE Engineering in Medicine and Biology Society (EMBC). IEEE, 368-371.

[32B] Bharath Hariharan, Pablo Arbeláez, Ross Girshick, and Jitendra Malik. 2014. Simultaneous detection and segmentation. In European Conference on Computer Vision. Springer, 297-312.

[33B] Bharath Hariharan, Pablo Arbeláez, Ross Girshick, and Jitendra Malik. 2015. Hypercolumns for object segmentation and fine-grained localization. In Proceedings of the IEEE conference on computer vision and pattern recognition. 447-456.

[34B] R. I. Hartley and A. Zisserman. 2004. Multiple View Geometry in Computer Vision (second ed.). Cambridge University Press, ISBN: 0521540518.

[35B] Haoyu He, Jing Zhang, Qiming Zhang, and Dacheng Tao. 2020. Grapy-ML: Graph Pyramid Mutual Learning for Cross-dataset Human Parsing. In Proceedings of the AAAI Conference on Artificial Intelligence.

[36B] Kaiming He, Georgia Gkioxari, Piotr Dollar, and Ross Girshick. 2017. Mask r-cnn. In Proceedings of the IEEE international conference on computer vision. 2961-2969.

[37B] K. He, X. Zhang, S. Ren, and J. Sun. 2016. Deep residual learning for image recognition. In The IEEE Conference on Computer Vision and Pattern Recognition (CVPR). 770-778.

[38B] G V Horn and Pietro Perona. 2017. The devil is in the tails: Fine-grained classification in the wild. arXiv preprint arXiv:1709.014502 (2017).

[39B] H. Huang, Y. Sun, and M. Liu. 2019. Reliable Monocular Ego-Motion Estimation System in Rainy Urban Environments. In 2019 IEEE Intelligent Transportation Systems Conference (ITSC). 1290-1297. https://doi.org/10.1109/ITSC.2019.8916977

[40B] Junhwa Hur and Stefan Roth. 2019. Iterative residual refinement for joint optical flow and occlusion estimation. In Proceedings of the IEEE/CVF Conference on Computer Vision and Pattern Recognition. 5754-5763.

[41B] Tae Hyun Kim, Kyoung Mu Lee, Bernhard Scholkopf, and Michael Hirsch. 2017. Online video deblurring via dynamic temporal blending network. In Proceedings of the IEEE International Conference on Computer Vision. 4038-4047.

[42B] Eddy Ilg, Nikolaus Mayer, Tonmoy Saikia, Margret Keuper, Alexey Dosovitskiy, and Thomas Brox. 2017. Flownet 2.0: Evolution of optical flow estimation with deep networks. In Proceedings of the IEEE conference on computer vision and pattern recognition. 2462-2470.

[43B] Joel Janai, Fatma Guney, Anurag Ranjan, Michael Black, and Andreas Geiger. 2018. Unsupervised learning of multi-frame optical flow with occlusions. In Proceedings of the European Conference on Computer Vision (ECCV). 690-706.

[44B] J Yu Jason, Adam W Harley, and Konstantinos G Derpanis. 2016. Back to basics: Unsupervised learning of optical flow via brightness constancy and motion smoothness. In European Conference on Computer Vision. Springer, 3-10.

[45B] I. Joel, A. and Stergios. 2011. A Direct Least-Squares (DLS) method for PnP. In IEEE International Conference on Computer Vision (ICCV). IEEE.

[46B] C. Kang, H. Jung, and Y. Lee. 2019. Towards Machine Learning with Zero Real-World Data. In The ACM Workshop on Wearable Systems and Applications. 41-46.

[47B] H. Koskimaki, P. Siirtola, and J. Röning. 2017. MyoGym: Introducing an Open Gym Data Set for Activity Recognition Collected Using Myo Armband. In Proceedings of the 2017 ACM International Joint Conference on Pervasive and Ubiquitous Computing and Proceedings of the 2017 ACM International Symposium on Wearable Computers. ACM, 537-546.

[48B] H. Koskimaki and P. Siirtola. 2014. Recognizing gym exercises using acceleration data from wearable sensors. In 2014 IEEE Symposium on Computational Intelligence and Data Mining (CIDM). 321-328. https://doi.org/10.1109/CIDM.2014.7008685

[49B] Hyeokhyen Kwon, Gregory D. Abowd, and Thomas Plotz. 2019. Handling Annotation Uncertainty in Human Activity Recognition. In Proceedings of the 23rd International Symposium on Wearable Computers (ISWC '19). ACM, 109-117.

[50B] H. Kwon, C. Tong, H. Haresamudram, Y. Gao, G. D. Abowd, N. D. Lane, and T. Plotz. 2020. IMUTube: Automatic Extraction of Virtual on-Body Accelerometry from Video for Human Activity Recognition. Proc. ACM Interact. Mob. Wearable Ubiquitous Technol. 4, 3, Article 87 (September 2020), 29 pages.

[51B] Carnegie Mellon Graphics Lab. 2008. Carnegie Mellon Motion Capture Database. http://mocap.cs.cmu.edu/

[52B] O. D. Lara and M. A Labrador. 2012. A survey on human activity recognition using wearable sensors. IEEE communications surveys & tutorials 15, 3 (2012), 1192-1209.

[53B] A. Le Guennec, S. Malinowski, and R. Tavenard. 2016. Data Augmentation for Time Series Classification using Convolutional Neural Networks. In ECML/PKDD Workshop on Advanced Analytics and Learning on Temporal Data.

[54B] X. Li, J. Luo, and R. Younes. 2020. ActivityGAN: Generative Adversarial Networks for Data Augmentation in Sensor-Based Human Activity Recognition (UbiComp-ISWC '20). ACM, 249-254.

[55B] Yi Li, Haozhi Qi, Jifeng Dai, Xiangyang Ji, and Yichen Wei. 2017. Fully convolutional instance-aware semantic segmentation. In Proceedings of the IEEE conference on computer vision and pattern recognition. 2359-2367.

[56B] D. Liaqat, M. Abdalla, Pegah Abed-Esfahani, Moshe Gabel, Tatiana Son, Robert Wu, Andrea Gershon, Frank Rudzicz, and Eyal De Lara. 2019. WearBreathing: Real World Respiratory Rate Monitoring Using Smartwatches. Proceedings of the ACM on interactive, mobile, wearable and ubiquitous technologies (IMWUT) 3, 2 (2019), 1-22.

[57B] Liang Liu, Jiangning Zhang, Ruifei He, Yong Liu, Yabiao Wang, Ying Tai, Donghao Luo, Chengjie Wang, Jilin Li, and Feiyue Huang. 2020. Learning by Analogy: Reliable Supervision from Transformations for Unsupervised Optical Flow Estimation. In IEEE Conference on Computer Vision and Pattern Recognition (CVPR).

[58B] Pengpeng Liu, Irwin King, Michael R Lyu, and Jia Xu. 2019. Ddflow: Learning optical flow with unlabeled data distillation. In Proceedings of the AAAI Conference on Artificial Intelligence, Vol. 33. 8770-8777.

[59B] Pengpeng Liu, Michael Lyu, Irwin King, and Jia Xu. 2019. Selflow: Self-supervised learning of optical flow. In Proceedings of the IEEE/CVF Conference on Computer Vision and Pattern Recognition. 4571-4580.

[60B] Shu Liu, Jiaya Jia, Sanja Fidler, and Raquel Urtasun. 2017. Sgn: Sequential grouping networks for instance segmentation. In Proceedings of the IEEE International Conference on Computer Vision. 3496-3504.

[61B] Ziwei Liu, Zhongqi Miao, Xiaohang Zhan, Jiayun Wang, Boqing Gong, and Stella X Yu. 2019. Large-scale long-tailed recognition in an open world. In Proceedings of the IEEE/CVF Conference on Computer Vision and Pattern Recognition. 2537-2546.

[62B] N. Mahmood, N. Ghorbani, N. Troje, G. Pons-Moll, and M. Black. 2019. AMASS: Archive of motion capture as surface shapes. In IEEE International Conference on Computer Vision (ICCV). 5442-5451.

[63B] Xiao-Jiao Mao, Chunhua Shen, and Yu-Bin Yang. 2016. Image restoration using very deep convolutional encoder-decoder networks with symmetric skip connections. arXiv preprint arXiv:1603.09056 (2016).

[64B] J. Martinez, R. Hossain, J. Romero, and J. Little. 2017. A simple yet effective baseline for 3d human pose estimation. In IEEE International Conference on Computer Vision (ICCV). 2640-2649.

[65B] A. Mathur, T. Zhang, S. Bhattacharya, P. Velickovic, L. Joffe, N. Lane, F. Kawsar, and P. Lió. 2018. Using deep data augmentation training to address software and hardware heterogeneities in wearable and smartphone sensing devices. In IEEE International Conference on Information Processing in Sensor Networks (IPSN). IEEE, 200-211.

[66B] Nikolaus Mayer, Eddy Ilg, Philip Hausser, Philipp Fischer, Daniel Cremers, Alexey Dosovitskiy, and Thomas Brox. 2016. A large dataset to train convolutional networks for disparity, optical flow, and scene flow estimation. In Proceedings of the IEEE conference on computer vision and pattern recognition. 4040-4048.

[67B] D. Mehta, O. Sotnychenko, F. Mueller, W. Xu, M. Elgharib, P. Fua, H. Seidel, H. Rhodin, G. Pons-Moll, and C. Theobalt. 2020. XNect: Real-Time Multi-Person 3D Motion Capture with a Single RGB Camera. ToG. 39, 4, Article 82 (July 2020), 17 pages.

[68B] Simon Meister, Junhwa Hur, and Stefan Roth. 2018. Unflow: Unsupervised learning of optical flow with a bidirectional census loss. In Proceedings of the AAAI Conference on Artificial Intelligence, Vol. 32.

[69B] Dan Morris, T Scott Saponas, Andrew Guillory, and Ilya Kelner. 2014. RecoFit: using a wearable sensor to find, recognize, and count repetitive exercises. In Proceedings of the SIGCHI Conference on Human Factors in Computing Systems. 3225-3234.

[70B] Saypraseuth Mounsaveng, David Vazquez, Ismail Ben Ayed, and Marco Pedersoli. 2019. Adversarial learning of general transformations for data augmentation. arXiv preprint arXiv:1909.09801 (2019).

[71B] A. Newell, K. Yang, and J. Deng. 2016. Stacked hourglass networks for human pose estimation. In European conference on computer vision. Springer, 483-499.

[72B] Xuecheng Nie, Jiashi Feng, and Shuicheng Yan. 2018. Mutual Learning to Adapt for Joint Human Parsing and Pose Estimation. In Proceedings of the European Conference on Computer Vision (ECCV).

[73B] F. J. Ordóñez and D. Roggen. 2016. Deep convolutional and lstm recurrent neural networks for multimodal wearable activity recognition. Sensors 16, 1 (2016), 115.

[74B] Jinshan Pan, Haoran Bai, and Jinhui Tang. 2020. Cascaded Deep Video Deblurring Using Temporal Sharpness Prior. In IEEE/CVF Conference on Computer Vision and Pattern Recognition (CVPR).

[75B] George Papandreou, Tyler Zhu, Liang-Chieh Chen, Spyros Gidaris, Jonathan Tompson, and Kevin Murphy. 2018. Personlab: Person pose estimation and instance segmentation with a bottom-up, part-based, geometric embedding model. In Proceedings of the European Conference on Computer Vision (ECCV). 269-286.

[76B] J. Park, Q. Zhou, and V. Koltun. 2017. Colored Point Cloud Registration Revisited. In IEEE International Conference on Computer Vision (ICCV). 143-152.

[77B] Deepak Pathak, Philipp Krahenbuhl, Jeff Donahue, Trevor Darrell, and Alexei A Efros. 2016. Context encoders: Feature learning by inpainting. In Proceedings of the IEEE conference on computer vision and pattern recognition. 2536-2544.

[78B] D. Pavllo, C. Feichtenhofer, D. Grangier, and M. Auli. 2019. 3D human pose estimation in video with temporal convolutions and semi-supervised training. In The IEEE Conference on Computer Vision and Pattern Recognition (CVPR). 7753-7762.

[79B] L. Pei, S. Xia, L. Chu, F. Xiao, Q. Wu, W. Yu, and R. Qiu. 2021. MARS: Mixed Virtual and Real Wearable Sensors for Human Activity Recognition with Multi-Domain Deep Learning Model. IEEE Internet of Things Journal (2021).

[80B] L. Pishchulin, E. Insafutdinov, S. Tang, B. Andres, M. Andriluka, P. Gehler, and B. Schiele. 2016. Deepcut: Joint subset partition and labeling for multi person pose estimation. In Proceedings of the IEEE conference on computer vision and pattern recognition. 4929-4937.

[81B] Joseph Redmon and Ali Farhadi. 2018. YOLOv3: An Incremental Improvement. arXiv (2018).

[82B] A. Reiss and D. Stricker. 2012. Introducing a new benchmarked dataset for activity monitoring. In Proceedings of the ACM International Symposium on Wearable Computers. IEEE, 108-109.

[83B] V. Rey, P. Hevesi, O. Kovalenko, and P. Lukowicz. 2019. Let there be IMU data: generating training data for wearable, motion sensor based activity recognition from monocular RGB videos. In Adjunct Proceedings of the ACM International Joint Conference on Pervasive and Ubiquitous Computing and Proceedings of the ACM International Symposium on Wearable Computers. 699-708.

[84B] Daniel J. Rough and Aaron Quigley. 2020. End-User Development of Experience Sampling Smartphone Apps—Recommendations and Requirements. IMWUT 4,2, Article 56 (June 2020), 19 pages.

[85B] P. M. Scholl, M. Wille, and K. Van Laerhoven. 2015. Wearables in the wet lab: a laboratory system for capturing and guiding experiments. In Proceedings of the International Conference on Ubiquitous Computing. ACM, 589-599.

[86B] T. Schreiber and A. Schmitz. 1997. Discrimination power of measures for nonlinearity in a time series. Physical Review E 55, 5 (1997), 5443.

[87B] K. Shoemake. 1985. Animating rotation with quaternion curves. In Proceedings of the 12th annual conference on Computer graphics and interactive techniques. 245-254.

[88B] C. Shorten and T. Khoshgoftaar. 2019. A survey on image data augmentation for deep learning. Journal of Big Data 6, 1 (2019), 60.

[89B] K. Simonyan and A. Zisserman. 2014. Very deep convolutional networks for large-scale image recognition. arXiv:1409.1556 (2014).

[90B] D. Strömbäck, S. Huang, and V. Radu. 2020. MM-Fit: Multimodal Deep Learning for Automatic Exercise Logging across Sensing Devices. IMWUT 4,4, Article 168 (December 2020), 22 pages.

[91B] J. Sturm, N. Engelhard, F. Endres, W. Burgard, and D. Cremers. 2012. A Benchmark for the Evaluation of RGB-D SLAM Systems. In Proc. of the International Conference on Intelligent Robot Systems (IROS).

[92B] S. Suh, H. Lee, J. Jo, P. Lukowicz, and Y. Lee. 2019. Generative oversampling method for imbalanced data on bearing fault detection and diagnosis. Applied Sciences 9, 4 (2019), 746.

[93B] Deqing Sun, Xiaodong Yang, Ming-Yu Liu, and Jan Kautz. 2018. Pwc-net: Cnns for optical flow using pyramid, warping, and cost volume. In Proceedings of the IEEE conference on computer vision and pattern recognition. 8934-8943.

[94B] T. Sztyler and H. Stuckenschmidt. 2016. On-body localization of wearable devices: An investigation of position-aware activity recognition. In IEEE International Conference on Pervasive Computing and Communications (PerCom). IEEE, 1-9.

[95B] S. Takeda, T. Okita, P. Lago, and S. Inoue. 2018. A multi-sensor setting activity recognition simulation tool. In Proceedings of the ACM International Joint Conference and International Symposium on Pervasive and Ubiquitous Computing and Wearable Computers. 1444-1448.

[96B] Subarna Tripathi, Maxwell Collins, Matthew Brown, and Serge Belongie. 2017. Pose2instance: Harnessing keypoints for person instance segmentation. arXiv preprint arXiv:1704.01152 (2017).

[97B] T. Um, F. Pfister, D. Pichler, S. Endo, M. Lang, S. Hirche, U. Fietzek, and D. Kulie. 2017. Data augmentation of wearable sensor data for parkinson's disease monitoring using convolutional neural networks. In Proceedings of the ACM International Conference on Multimodal Interaction. 216-220.

[98B] Terry Taewoong Um, Vahid Babakeshizadeh, and Dana Kulie. 2017. Exercise motion classification from large-scale wearable sensor data using convolutional neural networks. In 2017 IEEE/RSJ International Conference on Intelligent Robots and Systems (IROS). IEEE, 2385-2390.

[99B] Niels van Berkel, Jorge Goncalves, Simo Hosio, and Vassilis Kostakos. 2017. Gamification of Mobile Experience Sampling Improves Data Quality and Quantity. IMWUT 1, 3, Article 107 (September 2017), 21 pages.

[100B] Madhu Vankadari, Sourav Garg, Anima Majumder, Swagat Kumar, and Ardhendu Behera. 2020. Unsupervised monocular depth estimation for night-time images using adversarial domain feature adaptation. In European Conference on Computer Vision. Springer, 443-459.

[101B] A. Vaswani, N. Shazeer, N. Parmar, J. Uszkoreit, L. Jones, A. N. Gomez, L. Kaiser, and I. Polosukhin. 2017. Attention is all you need. arXiv:1706.03762 (2017).

[102B] Xintao Wang, Kelvin C K Chan, Ke Yu, Chao Dong, and Chen Change Loy. 2019. Edvr: Video restoration with enhanced deformable convolutional networks. In Proceedings of the IEEE/CVF Conference on Computer Vision and Pattern Recognition Workshops. 0-0.

[103B] Yang Wang, Yi Yang, Zhenheng Yang, Liang Zhao, Peng Wang, and Wei Xu. 2018. Occlusion aware unsupervised learning of optical flow. In Proceedings of the IEEE Conference on Computer Vision and Pattern Recognition. 4884-4893.

[104B] E. Wilson. 1927. Probable inference, the law of succession, and statistical inference. J. Amer. Statist. Assoc. 22, 158 (1927), 209-212.

[105B] Chaowei Xiao, Jun-Yon Zhu, Bo Li, Warren He, Mingyan Liu, and Dawn Song. 2018. Spatially transformed adversarial examples. arXiv preprint arXiv:1801.02612 (2018).

[106B] F. Xiao, L. Pei, L. Chu, D. Zou, W. Yu, Y. Zhu, and T. Li. 2020. A Deep Learning Method for Complex Human Activity Recognition Using Virtual Wearable Sensors. arXiv preprint arXiv:2003.01874 (2020).

[107B] Tete Xiao, Yingcheng Liu, Bolei Zhou, Yuning Jiang, and Jian Sun. 2018. Unified perceptual parsing for scene understanding. In Proceedings of the European Conference on Computer Vision (ECCV). 418-434.

[108B] Qizhe Xie, Zihang Dai, Eduard Hovy, Minh-Thang Luong, and Quoc V Le. 2019. Unsupervised data augmentation for consistency training. arXiv preprint arXiv:1904.12848 (2019).

[109B] Angela Yao, Dominique Uebersax, Juergen Gall, and Luc Van Gool. 2010. Tracking people in broadcast sports. In Joint Pattern Recognition Symposium. Springer, 151-161.

[110B] S. Yao, Y. Zhao, H. Shao, C. Zhang, A. Zhang, S. Hu, D. Liu, S. Liu, Lu Su, and T. Abdelzaher. 2018. Sensegan: Enabling deep learning for internet of things with a semi-supervised framework. Proceedings of the ACM on interactive, mobile, wearable and ubiquitous technologies (IMWUT) 2, 3 (2018), 1-21.

[111B] Zhichao Yin and Jianping Shi. 2018. Geonet: Unsupervised learning of dense depth, optical flow and camera pose. In Proceedings of the IEEE conference on computer vision and pattern recognition. 1983-1992.

[112B] A. Young, M. Ling, and D. Arvind. 2011. IMUSim: A simulation environment for inertial sensing algorithm design and evaluation. In Proceedings of the International Conference on Information Processing in Sensor Networks (IPSN). IEEE, 199-210.

[113B] Kaihao Zhang, Wenhan Luo, Yiran Zhong, Lin Ma, Wei Liu, and Hongdong Li. 2018. Adversarial spatio-temporal learning for video deblurring. IEEE Transactions on Image Processing 28, 1 (2018), 291-301.

[114B] M. Zhang and A. A. Sawchuk. 2012. USC-HAD: a daily activity dataset for ubiquitous activity recognition using wearable sensors. In Proceedings of the International Conference on Ubiquitous Computing.

[115B] Song-Hai Zhang, Ruilong Li, Xin Dong, Paul Rosin, Zixi Cai, Xi Han, Dingcheng Yang, Haozhi Huang, and Shi-Min Hu. 2019. Pose2seg: Detection free human instance segmentation. In Proceedings of the IEEE/CVF Conference on Computer Vision and Pattern Recognition. 889-898.

[116B] Wang Zhao, Shaohui Liu, Yezhi Shu, and Yong-Jin Liu. 2020. Towards Better Generalization: Joint Depth-Pose Learning without PoseNet. In Proceedings of IEEE Conference on Computer Vision and Pattern Recognition (CVPR).

[117B] Kaiyang Zhou, Yongxin Yang, Andrea Cavallaro, and Tao Xiang. 2019. Omni-Scale Feature Learning for Person Re-Identification. In ICCV.

[118B] Bingke Zhu, Yingying Chen, Ming Tang, and Jinqiao Wang. 2018. Progressive cognitive human parsing. In Proceedings of the AAAI Conference on Artificial Intelligence, Vol. 32.

[119B] Yuliang Zou, Zelun Luo, and Jia-Bin Huang. 2018. Df-net: Unsupervised joint learning of depth and flow using cross-task consistency.

In Proceedings of the European conference on computer vision (ECCV). 36-53.

What is claimed is:

1. A system comprising:
at least one processor configured to execute an automated processing pipeline comprising:
a two-dimensional skeletal estimator configured to determine skeletal-associated points of a body of a person in a plurality of frames of a video data set;
a three-dimensional skeletal estimator configured to generate 3D motion estimation of 3D joints of the skeletal-associated points;
an inertial measurement unit (IMU) extractor configured to determine motion values at one or more 3D joints of the skeletal-associated points; and
a sensor emulator configured to modify the determined motion values at one or more 3D joints of the skeletal-associated points according to an IMU sensor profile to generate virtual IMU sensor values including at least acceleration data and gyroscope data, wherein the virtual IMU sensor values are outputted for the one or more 3D joints of the skeletal-associated points.

2. The system of claim 1, wherein the virtual IMU sensor values are used to train a human activity recognition classifier.

3. The system of claim 1, wherein the automated processing pipeline further comprises:

a three-dimensional skeletal calibrator configured to determine and apply a translation factor and a rotation factor using determined camera intrinsic parameters of a scene and estimated perspective projection.

4. The system of claim 1, wherein the automated processing pipeline further comprises:

a camera ego-motion estimator configured to reconstruct a 3D scene reconstruction by generating a 3D point cloud of a scene and determining a depth map of objects in the scene, the camera ego-motion estimator being configured to determine camera ego-motion between two consecutive frame point clouds.

5. The system of claim 1, wherein the automated processing pipeline further comprises:

a three-dimensional skeletal calibration filter configured to exclude frames, provided to the IMU extractor, determined to include changes in a rotation factor or a translation factor that exceed a threshold.

6. The system of claim 5, wherein the automated processing pipeline further comprises:

a noisy pose filter configured to detect the person in the plurality of frames of the video data set prior and to exclude a frame, provided to the IMU extractor, of the video data set from the two-dimensional skeletal estimator prior to the determining of the skeletal-associated points.

7. The system of claim 1, wherein the automated processing pipeline further comprises:

a two-dimensional skeletal filter configured to interpolate and smooth the determined skeletal-associated points to add missing skeletal-associated points to each frame.

8. The system of claim 1, wherein the automated processing pipeline further comprises:

a two-dimensional skeletal tracker configured to establish and maintain correspondences of each person, including the person and a second person, across frames.

9. The system of claim 1, wherein the automated processing pipeline further comprises:

an occlusion detector configured (i) to identify a mask of a segmented human instance and (ii) exclude a frame, provided to the three-dimensional skeletal estimator if an on-body sensor location overlaps with an occluded body part segment of a person or a mask associated with a second person.

10. The system of claim 1, wherein the automated processing pipeline further comprises:

a foreground motion filter configured to determine local joint motions, global motion measurements, and changes of a bounding box across frames of the video data set and excluding a frame, provided to the three-dimensional skeletal estimator, if the determined local joint motions, global motion measurements, or changes of a bounding box exceeds a predefined threshold.

11. The system of claim 1, wherein the automated processing pipeline further comprises:

a motion intensity filter configured to (i) estimate pixel displacement associated parameters, (ii) determine a background motion measure of the estimated pixel displacement, and (iii) exclude a frame having the background motion measure exceeding a pre-defined threshold value.

12. The system of claim 1, wherein the automated processing pipeline further comprises:

a motion translator configured to translate the determined motion values at the one or more 3D joints to a body coordinate system.

13. The system of claim 1, wherein the virtual IMU sensor values comprise tri-axial accelerometer data.

14. The system of claim 1, wherein the video data set is obtained from an online video-sharing website for a given activity defined by a description of the online video-sharing website of the video data set.

15. The system of claim 14 further comprising:

a deep neural network configured to receive and train using (i) virtual IMU sensor values generated from the video data set are obtained from the online video-sharing website and (ii) a label associated with given activity defined by the description of the online video-sharing website of the video data set.

16. The system of claim 1 further comprising:

a query configured to receive a request comprising (i) a queryable activity and (ii) a queryable body location for the virtual IMU sensor values, wherein the queryable activity comprises a search string to apply to an online video-sharing website.

17. The system of claim 16 further comprising:

a deep neural network configured to receive and train using (i) virtual IMU sensor values generated from video data set are obtained from the online video-sharing website and (ii) a label associated with given activity defined by the description of the online video-sharing website of the video data set.

18. The system of claim 1, wherein the virtual IMU sensor values are used to analyze and evaluate the performance of an IMU sensor for the one or more 3D joints.

19. A method of operating an automated processing pipeline comprising:

determining, by a processor and via a two-dimensional skeletal estimator, skeletal-associated points of a body of a person in a plurality of frames of a video data set;

generating, by the processor and via a three-dimensional skeletal estimator, 3D motion estimation of 3D joints of the skeletal-associated points;

determining, by the processor and via an IMU extractor, motion values at one or more 3D joints of the skeletal-associated points;

modifying, by the processor and via a sensor emulator, the determined motion values at one or more 3D joints of the skeletal-associated points according to an IMU sensor profile to generate virtual IMU sensor values including at least acceleration data and gyroscope data; and outputting, by the processor, the virtual IMU sensor values for the one or more 3D joints of the skeletal-associated points.

20. A non-transitory computer-readable medium having instructions stored thereon, wherein execution of the instructions by a processor, cause the processor to:

determine skeletal-associated points of a body of a person in a plurality of frames of a video data set;

generate 3D motion estimation of 3D joints of the skeletal-associated points;

determine motion values at one or more 3D joints of the skeletal-associated points;

modify the determined motion values at one or more 3D joints of the skeletal-associated points according to an IMU sensor profile to generate virtual IMU sensor values including at least acceleration data and gyroscope data; and
output the virtual IMU sensor values for the one or more 3D joints of the skeletal-associated points.

\* \* \* \* \*